United States Patent
Tellakula et al.

(10) Patent No.: US 12,461,832 B2
(45) Date of Patent: Nov. 4, 2025

(54) DURABLE HANDLE MANAGEMENT FOR FAILOVER IN DISTRIBUTED FILE SERVERS

(71) Applicant: Nutanix, Inc., San Jose, CA (US)

(72) Inventors: Ashok Tellakula, Bangalore (IN); Atul Kumar, Noida (IN); Hemanth Kumar Thummala, San Jose, CA (US); Manoj Premanand Naik, San Jose, CA (US); Saji Kumar Vijaya Kumari Rajendran Nair, Cupertino, CA (US)

(73) Assignee: Nutanix, Inc., San Jose, CA (US)

( * ) Notice: Subject to any disclaimer, the term of this patent is extended or adjusted under 35 U.S.C. 154(b) by 34 days.

(21) Appl. No.: 18/393,187

(22) Filed: Dec. 21, 2023

(65) Prior Publication Data

US 2025/0103452 A1    Mar. 27, 2025

(30) Foreign Application Priority Data

Sep. 27, 2023   (IN) .............................. 202311064865

(51) Int. Cl.
   *G06F 11/20*   (2006.01)
   *G06F 16/176*  (2019.01)

(52) U.S. Cl.
   CPC ...... *G06F 11/2053* (2013.01); *G06F 16/1774* (2019.01); *G06F 2201/85* (2013.01)

(58) Field of Classification Search
   CPC ....... G06F 11/20; G06F 11/2053; G06F 16/17
   See application file for complete search history.

(56) References Cited

U.S. PATENT DOCUMENTS

| | | |
|---|---|---|
| 5,095,421 A | 3/1992 | Freund |
| 5,276,867 A | 1/1994 | Kenley et al. |
| 5,317,728 A | 5/1994 | Tevis et al. |
| 5,533,036 A | 7/1996 | Blake et al. |
| 5,596,754 A | 1/1997 | Lomet |
| 5,664,144 A | 9/1997 | Yanai et al. |
| 5,870,555 A | 2/1999 | Pruett et al. |
| 5,873,085 A | 2/1999 | Enoki et al. |
| 5,920,872 A | 7/1999 | Grewell et al. |
| 5,924,096 A | 7/1999 | Draper et al. |

(Continued)

FOREIGN PATENT DOCUMENTS

| | | |
|---|---|---|
| CN | 103746997 A | 4/2014 |
| CN | 105100210 A | 11/2015 |

(Continued)

OTHER PUBLICATIONS

US 10,514,899 B2, 12/2019, Bafna et al. (withdrawn)

(Continued)

*Primary Examiner* — Kamini B Patel
(74) *Attorney, Agent, or Firm* — Stoel Rives LLP

(57) ABSTRACT

Examples of systems described herein may manage durable handles for seamless failover. Durable handles may be stored in a persistent volume group. The persistent volume group may be moved, together with all or a portion of file share data, to another computing node responsive to an indication of a failure event. To accommodate asynchronous write shares, asynchronous write operations may also be provided to the target computing node. The asynchronous write operations may be processed before reconnecting clients to the file share.

22 Claims, 10 Drawing Sheets

(56) References Cited

U.S. PATENT DOCUMENTS

| | | |
|---|---|---|
| 6,055,543 A | 4/2000 | Christensen et al. |
| 6,085,234 A | 7/2000 | Pitts et al. |
| 6,098,066 A | 8/2000 | Snow et al. |
| 6,101,508 A | 8/2000 | Wolff |
| 6,108,654 A | 8/2000 | Chan et al. |
| 6,144,983 A | 11/2000 | Klots et al. |
| 6,212,531 B1 | 4/2001 | Blea et al. |
| 6,289,356 B1 | 9/2001 | Hitz et al. |
| 6,341,340 B1 | 1/2002 | Tsukerman et al. |
| 6,412,034 B1 | 6/2002 | Chan |
| 6,442,602 B1 | 8/2002 | Choudhry |
| 6,473,849 B1 | 10/2002 | Keller et al. |
| 6,539,381 B1 | 3/2003 | Prasad et al. |
| 6,539,446 B1 | 3/2003 | Chan |
| 6,944,785 B2 * | 9/2005 | Gadir ................ G06F 11/2023 714/4.11 |
| 6,963,914 B1 | 11/2005 | Breitbart et al. |
| 6,968,345 B1 | 11/2005 | Muhlestein |
| 7,120,631 B1 | 10/2006 | Vahalia et al. |
| 7,159,056 B2 | 1/2007 | Goldick |
| 7,162,467 B2 | 1/2007 | Eshleman et al. |
| 7,337,290 B2 | 2/2008 | Rajamani et al. |
| 7,356,679 B1 | 4/2008 | Le et al. |
| 7,366,738 B2 | 4/2008 | Yorke et al. |
| 7,383,463 B2 | 6/2008 | Hayden et al. |
| 7,409,511 B2 | 8/2008 | Edwards et al. |
| 7,526,622 B1 | 4/2009 | Bonwick et al. |
| 7,571,290 B1 | 8/2009 | Ranade et al. |
| 7,606,868 B1 | 10/2009 | Le et al. |
| 7,702,843 B1 | 4/2010 | Chen et al. |
| 7,707,618 B1 | 4/2010 | Cox et al. |
| 7,725,671 B2 | 5/2010 | Prahlad et al. |
| 7,752,492 B1 | 7/2010 | Armangau et al. |
| 7,774,391 B1 | 8/2010 | Le et al. |
| 7,805,469 B1 | 9/2010 | Nagaralu et al. |
| 7,805,511 B1 | 9/2010 | Panicker et al. |
| 7,840,533 B2 | 11/2010 | Prahlad et al. |
| 7,877,463 B2 * | 1/2011 | Lentini ................ H04L 67/02 709/219 |
| 7,890,529 B1 | 2/2011 | Srinivasan et al. |
| 7,937,453 B1 | 5/2011 | Hayden et al. |
| 8,095,810 B2 | 1/2012 | Matsuzawa et al. |
| 8,095,931 B1 | 1/2012 | Chen et al. |
| 8,145,947 B1 | 3/2012 | Hayden et al. |
| 8,352,482 B2 | 1/2013 | Hansen |
| 8,352,608 B1 | 1/2013 | Keagy et al. |
| 8,359,594 B1 | 1/2013 | Davidson et al. |
| 8,365,167 B2 | 1/2013 | Beaty et al. |
| 8,407,448 B1 | 3/2013 | Hayden et al. |
| 8,447,728 B2 | 5/2013 | Prahlad et al. |
| 8,473,462 B1 | 6/2013 | Banerjee |
| 8,484,163 B1 | 7/2013 | Yucel et al. |
| 8,484,356 B1 | 7/2013 | Douglis et al. |
| 8,539,076 B2 | 9/2013 | Nakano et al. |
| 8,543,790 B2 | 9/2013 | Chen et al. |
| 8,549,518 B1 | 10/2013 | Aron et al. |
| 8,595,595 B1 | 11/2013 | Grcanac et al. |
| 8,601,473 B1 | 12/2013 | Aron et al. |
| 8,620,870 B2 | 12/2013 | Dwarampudi et al. |
| 8,635,351 B2 | 1/2014 | Astete et al. |
| 8,646,089 B2 | 2/2014 | Jayanthi et al. |
| 8,688,660 B1 | 4/2014 | Sivasubramanian et al. |
| 8,725,679 B2 | 5/2014 | Nair et al. |
| 8,751,515 B1 | 6/2014 | Xing et al. |
| 8,762,335 B2 | 6/2014 | Prahlad et al. |
| 8,805,951 B1 | 8/2014 | Faibish et al. |
| 8,812,566 B2 | 8/2014 | Aizman et al. |
| 8,838,923 B2 | 9/2014 | Prahlad et al. |
| 8,850,130 B1 | 9/2014 | Aron et al. |
| 8,863,124 B1 | 10/2014 | Aron |
| 8,914,429 B2 | 12/2014 | Pitts |
| 8,935,563 B1 | 1/2015 | Rajaa et al. |
| 8,943,203 B1 | 1/2015 | Lent et al. |
| 8,949,557 B2 | 2/2015 | Kamei et al. |
| 8,966,188 B1 | 2/2015 | Bardale |
| 8,983,952 B1 | 3/2015 | Zhang et al. |
| 8,996,783 B2 | 3/2015 | Huang et al. |
| 9,009,106 B1 | 4/2015 | Aron et al. |
| 9,043,567 B1 | 5/2015 | Modukuri et al. |
| 9,060,014 B2 | 6/2015 | Crowley |
| 9,069,708 B2 | 6/2015 | Gill et al. |
| 9,152,628 B1 | 10/2015 | Stacey et al. |
| 9,154,535 B1 | 10/2015 | Harris |
| 9,165,003 B1 | 10/2015 | Tummala et al. |
| 9,171,019 B1 | 10/2015 | Donlan |
| 9,201,698 B2 | 12/2015 | Ashok et al. |
| 9,201,704 B2 | 12/2015 | Chang et al. |
| 9,201,887 B1 * | 12/2015 | Earl ................ G06F 9/45533 |
| 9,213,513 B2 | 12/2015 | Hartz et al. |
| 9,229,850 B1 | 1/2016 | Wang et al. |
| 9,244,674 B2 | 1/2016 | Waterman et al. |
| 9,244,969 B1 | 1/2016 | Love et al. |
| 9,250,823 B1 | 2/2016 | Kamat et al. |
| 9,256,475 B1 | 2/2016 | Aron et al. |
| 9,256,612 B1 | 2/2016 | Bhatt et al. |
| 9,268,586 B2 | 2/2016 | Voccio et al. |
| 9,268,947 B1 | 2/2016 | Jarlstrom et al. |
| 9,274,817 B1 | 3/2016 | Fan et al. |
| 9,286,298 B1 | 3/2016 | Gillett |
| 9,292,327 B1 | 3/2016 | Von Thenen et al. |
| 9,336,132 B1 | 5/2016 | Aron et al. |
| 9,348,702 B2 | 5/2016 | Hsu et al. |
| 9,405,482 B2 | 8/2016 | Varadharajan et al. |
| 9,405,566 B2 | 8/2016 | Chawla et al. |
| 9,411,628 B2 | 8/2016 | Bezbaruah et al. |
| 9,430,646 B1 | 8/2016 | Mushtaq et al. |
| 9,448,887 B1 | 9/2016 | Dayan et al. |
| 9,465,953 B2 | 10/2016 | Sharma et al. |
| 9,497,257 B1 | 11/2016 | Love et al. |
| 9,513,946 B2 | 12/2016 | Sevigny et al. |
| 9,519,596 B2 | 12/2016 | Coppola et al. |
| 9,535,907 B1 | 1/2017 | Stringham |
| 9,563,555 B2 | 2/2017 | Flynn et al. |
| 9,571,561 B2 | 2/2017 | Jang |
| 9,590,843 B2 | 3/2017 | Cui et al. |
| 9,600,307 B1 | 3/2017 | Pulkayath et al. |
| 9,602,341 B1 | 3/2017 | Degwekar et al. |
| 9,613,064 B1 | 4/2017 | Chou et al. |
| 9,619,257 B1 | 4/2017 | Aron et al. |
| 9,632,892 B1 | 4/2017 | Sledz et al. |
| 9,634,990 B2 | 4/2017 | Lee |
| 9,639,428 B1 | 5/2017 | Boda et al. |
| 9,652,265 B1 | 5/2017 | Narayanasamy et al. |
| 9,658,899 B2 | 5/2017 | Jenkins |
| 9,690,670 B1 | 6/2017 | Paulzagade et al. |
| 9,733,958 B2 | 8/2017 | Cui et al. |
| 9,740,436 B2 | 8/2017 | Fiebrich-Kandler et al. |
| 9,740,472 B1 | 8/2017 | Sohi et al. |
| 9,740,723 B2 | 8/2017 | Prahlad et al. |
| 9,747,287 B1 | 8/2017 | Bhardwaj et al. |
| 9,760,447 B2 | 9/2017 | Durge et al. |
| 9,772,866 B1 | 9/2017 | Aron et al. |
| 9,798,486 B1 | 10/2017 | Singh |
| 9,832,136 B1 | 11/2017 | Gibson |
| 9,846,706 B1 | 12/2017 | Basov et al. |
| 9,853,978 B2 | 12/2017 | Tellvik et al. |
| 9,870,291 B2 | 1/2018 | Bezbaruah et al. |
| 9,893,988 B2 | 2/2018 | Agarwal et al. |
| 9,922,201 B2 | 3/2018 | Von Muhlen et al. |
| 9,940,154 B2 | 4/2018 | Ramani et al. |
| 9,940,460 B1 | 4/2018 | Derbeko et al. |
| 9,946,573 B2 | 4/2018 | McDermott |
| 9,959,054 B1 | 5/2018 | Vankamamidi et al. |
| 9,961,145 B1 | 5/2018 | Faibish et al. |
| 9,965,357 B1 | 5/2018 | Earl et al. |
| 10,009,215 B1 | 6/2018 | Shorey |
| 10,019,159 B2 | 7/2018 | Wires et al. |
| 10,050,862 B2 | 8/2018 | Nambiar et al. |
| 10,069,909 B1 | 9/2018 | Chopra et al. |
| 10,078,583 B1 | 9/2018 | Wallace |
| 10,083,022 B2 | 9/2018 | Fukui et al. |
| 10,084,873 B2 | 9/2018 | Dornemann |
| 10,095,506 B2 | 10/2018 | Venkatesh et al. |
| 10,101,989 B2 | 10/2018 | Sinha et al. |

(56) References Cited

U.S. PATENT DOCUMENTS

| | | | |
|---|---|---|---|
| 10,108,502 B1 * | 10/2018 | Gopinath | G06F 11/1451 |
| 10,114,706 B1 | 10/2018 | Chougala et al. | |
| 10,127,059 B2 | 11/2018 | Astete et al. | |
| 10,140,115 B2 | 11/2018 | Fukui et al. | |
| 10,152,233 B2 | 12/2018 | Xu et al. | |
| 10,210,048 B2 | 2/2019 | Sancheti | |
| 10,248,657 B2 | 4/2019 | Prahlad et al. | |
| 10,262,023 B1 | 4/2019 | Kuang et al. | |
| 10,311,153 B2 | 6/2019 | Mason, Jr. et al. | |
| 10,333,901 B1 | 6/2019 | Bauman et al. | |
| 10,362,092 B1 | 7/2019 | Parthasarathy | |
| 10,367,753 B2 | 7/2019 | Schultze et al. | |
| 10,379,759 B2 | 8/2019 | Bhardwaj et al. | |
| 10,382,963 B2 | 8/2019 | Jassal et al. | |
| 10,394,412 B2 | 8/2019 | Torman et al. | |
| 10,394,547 B2 | 8/2019 | Fukui et al. | |
| 10,409,653 B2 | 9/2019 | von Muhlen et al. | |
| 10,419,426 B2 | 9/2019 | Bakshan et al. | |
| 10,452,456 B2 | 10/2019 | von Muhlen et al. | |
| 10,496,321 B2 | 12/2019 | Varadharajan et al. | |
| 10,523,592 B2 | 12/2019 | Byers et al. | |
| 10,530,742 B2 | 1/2020 | Shah et al. | |
| 10,540,164 B2 | 1/2020 | Bafna et al. | |
| 10,540,165 B2 | 1/2020 | Bafna et al. | |
| 10,540,166 B2 | 1/2020 | Arikatla et al. | |
| 10,542,049 B2 | 1/2020 | Cui et al. | |
| 10,552,266 B1 | 2/2020 | Kogtev et al. | |
| 10,572,317 B2 | 2/2020 | von Muhlen et al. | |
| 10,579,443 B2 | 3/2020 | von Muhlen et al. | |
| 10,594,730 B1 | 3/2020 | Summers et al. | |
| 10,635,544 B1 | 4/2020 | Kitson | |
| 10,642,507 B2 | 5/2020 | Gupta et al. | |
| 10,642,800 B2 | 5/2020 | Gummaraju et al. | |
| 10,678,651 B1 | 6/2020 | Borodin et al. | |
| 10,705,889 B2 | 7/2020 | von Muhlen et al. | |
| 10,719,305 B2 | 7/2020 | Sinha et al. | |
| 10,719,306 B2 | 7/2020 | Deshmukh et al. | |
| 10,719,307 B2 | 7/2020 | Kanada et al. | |
| 10,728,090 B2 | 7/2020 | Deshmukh et al. | |
| 10,789,138 B2 | 9/2020 | Wang et al. | |
| 10,809,998 B2 | 10/2020 | Venkatesh et al. | |
| 10,824,455 B2 | 11/2020 | Arikatla et al. | |
| 10,831,465 B2 | 11/2020 | Sharpe et al. | |
| 10,838,708 B2 | 11/2020 | Sinha et al. | |
| 10,949,192 B2 | 3/2021 | Venkatesh et al. | |
| 10,949,387 B1 | 3/2021 | Grider | |
| 11,010,011 B2 | 5/2021 | Varadharajan et al. | |
| 11,025,626 B1 | 6/2021 | Todd et al. | |
| 11,074,138 B2 | 7/2021 | Alonzo et al. | |
| 11,086,826 B2 | 8/2021 | Thummala et al. | |
| 11,106,442 B1 | 8/2021 | Gupta et al. | |
| 11,106,447 B2 | 8/2021 | Gupta et al. | |
| 11,144,407 B1 * | 10/2021 | Shankar | G06F 11/1469 |
| 11,194,680 B2 | 12/2021 | Konka et al. | |
| 11,204,710 B2 | 12/2021 | Varadharajan et al. | |
| 11,218,418 B2 | 1/2022 | Gupta et al. | |
| 11,281,484 B2 | 3/2022 | Bafna et al. | |
| 11,288,239 B2 | 3/2022 | Bafna | |
| 11,294,777 B2 | 4/2022 | Venkatesh et al. | |
| 11,310,286 B2 | 4/2022 | Cui et al. | |
| 11,474,796 B1 | 10/2022 | Mather | |
| 11,489,839 B2 | 11/2022 | Sankavaram et al. | |
| 11,537,384 B2 | 12/2022 | Sharpe et al. | |
| 11,544,049 B2 | 1/2023 | Gopalapura Venkatesh et al. | |
| 11,546,337 B2 | 1/2023 | Le et al. | |
| 11,550,557 B2 | 1/2023 | Sharpe et al. | |
| 11,550,558 B2 | 1/2023 | Bafna et al. | |
| 11,550,559 B2 | 1/2023 | Bafna et al. | |
| 11,562,034 B2 | 1/2023 | Arikatla et al. | |
| 11,563,800 B1 | 1/2023 | Trendafilov et al. | |
| 11,568,073 B2 | 1/2023 | Nair et al. | |
| 11,579,861 B2 | 2/2023 | Sharpe et al. | |
| 11,609,826 B2 | 3/2023 | Alonzo et al. | |
| 11,645,065 B2 | 5/2023 | Gupta et al. | |
| 11,669,320 B2 | 6/2023 | Gopalapura Venkatesh et al. | |
| 11,675,746 B2 | 6/2023 | Thummala et al. | |
| 11,775,397 B2 | 10/2023 | Venkatesh et al. | |
| 11,922,157 B2 | 3/2024 | Sharpe et al. | |
| 11,922,203 B2 | 3/2024 | Bafna et al. | |
| 11,947,952 B2 | 4/2024 | Gopalapura Venkatesh et al. | |
| 11,954,078 B2 | 4/2024 | Bafna et al. | |
| 11,966,729 B2 | 4/2024 | Sharpe et al. | |
| 11,966,730 B2 | 4/2024 | Sharpe et al. | |
| 12,014,166 B2 | 6/2024 | Gupta et al. | |
| 12,131,192 B2 | 10/2024 | Venkatesh et al. | |
| 12,135,963 B2 | 11/2024 | Sharpe et al. | |
| 12,153,913 B2 | 11/2024 | Bafna et al. | |
| 12,217,039 B2 | 2/2025 | Gopalapura Venkatesh et al. | |
| 2001/0047400 A1 | 11/2001 | Coates et al. | |
| 2002/0069196 A1 | 6/2002 | Betros et al. | |
| 2002/0120763 A1 | 8/2002 | Miloushev et al. | |
| 2003/0014442 A1 | 1/2003 | Shiigi et al. | |
| 2003/0033308 A1 | 2/2003 | Patel et al. | |
| 2003/0115218 A1 | 6/2003 | Bobbitt et al. | |
| 2003/0163597 A1 | 8/2003 | Hellman et al. | |
| 2003/0195942 A1 | 10/2003 | Muhlestein et al. | |
| 2004/0054777 A1 | 3/2004 | Ackaouy et al. | |
| 2004/0111608 A1 | 6/2004 | Oom et al. | |
| 2004/0133606 A1 | 7/2004 | Miloushev et al. | |
| 2004/0199734 A1 | 10/2004 | Rajamani et al. | |
| 2004/0210591 A1 | 10/2004 | Hirschfeld et al. | |
| 2004/0225742 A1 | 11/2004 | Loaiza et al. | |
| 2004/0267832 A1 | 12/2004 | Wong et al. | |
| 2005/0120160 A1 | 6/2005 | Plouffe et al. | |
| 2005/0120180 A1 | 6/2005 | Schornbach et al. | |
| 2005/0125503 A1 | 6/2005 | Iyengar et al. | |
| 2005/0193221 A1 | 9/2005 | Yoneyama | |
| 2005/0193245 A1 | 9/2005 | Hayden et al. | |
| 2005/0226059 A1 | 10/2005 | Kavuri et al. | |
| 2005/0228798 A1 | 10/2005 | Shepard et al. | |
| 2006/0010227 A1 | 1/2006 | Atluri | |
| 2006/0047685 A1 | 3/2006 | Dearing et al. | |
| 2006/0080445 A1 | 4/2006 | Chang et al. | |
| 2006/0112222 A1 | 5/2006 | Barrall | |
| 2006/0167921 A1 | 7/2006 | Grebus et al. | |
| 2006/0206901 A1 | 9/2006 | Chan | |
| 2006/0224918 A1 | 10/2006 | Koike | |
| 2006/0225065 A1 | 10/2006 | Chandhok et al. | |
| 2006/0253856 A1 | 11/2006 | Hu et al. | |
| 2006/0271510 A1 | 11/2006 | Harward et al. | |
| 2006/0271931 A1 | 11/2006 | Harris et al. | |
| 2007/0022129 A1 | 1/2007 | Bahar et al. | |
| 2007/0038913 A1 | 2/2007 | Allen et al. | |
| 2007/0041556 A1 | 2/2007 | Rana et al. | |
| 2007/0055703 A1 | 3/2007 | Zimran et al. | |
| 2007/0100905 A1 | 5/2007 | Masters et al. | |
| 2007/0171921 A1 | 7/2007 | Wookey et al. | |
| 2007/0179995 A1 | 8/2007 | Prahlad et al. | |
| 2007/0300220 A1 | 12/2007 | Seliger et al. | |
| 2008/0040483 A1 | 2/2008 | Nakatani et al. | |
| 2008/0059474 A1 | 3/2008 | Lim | |
| 2008/0071804 A1 | 3/2008 | Gunda | |
| 2008/0071997 A1 | 3/2008 | Loaiza et al. | |
| 2008/0098194 A1 | 4/2008 | Hashimoto et al. | |
| 2008/0104349 A1 | 5/2008 | Maruyama et al. | |
| 2008/0104589 A1 | 5/2008 | Mccrory et al. | |
| 2008/0133486 A1 | 6/2008 | Fitzgerald et al. | |
| 2008/0134178 A1 | 6/2008 | Fitzgerald et al. | |
| 2008/0168154 A1 | 7/2008 | Skyrm et al. | |
| 2008/0189468 A1 | 8/2008 | Schmidt et al. | |
| 2008/0195827 A1 | 8/2008 | Saika | |
| 2008/0201414 A1 | 8/2008 | Amir et al. | |
| 2008/0201457 A1 | 8/2008 | London | |
| 2008/0263113 A1 | 10/2008 | Krishnaiyer et al. | |
| 2008/0270677 A1 | 10/2008 | Kolakowski | |
| 2008/0271017 A1 | 10/2008 | Herington | |
| 2008/0320499 A1 | 12/2008 | Suit | |
| 2008/0320583 A1 | 12/2008 | Sharma et al. | |
| 2009/0006801 A1 | 1/2009 | Shultz et al. | |
| 2009/0100248 A1 | 4/2009 | Kami | |
| 2009/0150885 A1 | 6/2009 | Safari et al. | |
| 2009/0158082 A1 | 6/2009 | Jain et al. | |
| 2009/0171971 A1 | 7/2009 | Goddard et al. | |
| 2009/0182860 A1 | 7/2009 | Hwang et al. | |

(56) References Cited

U.S. PATENT DOCUMENTS

| | | |
|---|---|---|
| 2009/0193272 A1 | 7/2009 | Matsuzawa et al. |
| 2009/0216975 A1 | 8/2009 | Halperin et al. |
| 2009/0248847 A1 | 10/2009 | Sutoh et al. |
| 2009/0248870 A1 | 10/2009 | Kamei et al. |
| 2009/0249470 A1 | 10/2009 | Litvin et al. |
| 2009/0254572 A1 | 10/2009 | Redlich et al. |
| 2009/0271412 A1 | 10/2009 | Lacapra et al. |
| 2009/0287887 A1 | 11/2009 | Matsuki et al. |
| 2009/0288084 A1 | 11/2009 | Astete et al. |
| 2010/0023521 A1 | 1/2010 | Arcese et al. |
| 2010/0070725 A1 | 3/2010 | Prahlad et al. |
| 2010/0082716 A1 | 4/2010 | Agetsuma et al. |
| 2010/0082774 A1 | 4/2010 | Pitts |
| 2010/0095289 A1 | 4/2010 | Nguyen et al. |
| 2010/0138921 A1 | 6/2010 | Na et al. |
| 2010/0174745 A1 | 7/2010 | Ryan et al. |
| 2010/0214908 A1 | 8/2010 | Ralev |
| 2010/0241785 A1 | 9/2010 | Chen et al. |
| 2010/0250824 A1 | 9/2010 | Belay |
| 2010/0275205 A1 | 10/2010 | Nakajima |
| 2010/0299377 A1 | 11/2010 | Rimer et al. |
| 2010/0306256 A1 | 12/2010 | Blackman |
| 2011/0022694 A1 | 1/2011 | Dalal et al. |
| 2011/0022695 A1 | 1/2011 | Dalal et al. |
| 2011/0022812 A1 | 1/2011 | Van et al. |
| 2011/0022883 A1 | 1/2011 | Hansen |
| 2011/0047340 A1 | 2/2011 | Olson et al. |
| 2011/0078318 A1 | 3/2011 | Desai et al. |
| 2011/0119668 A1 | 5/2011 | Calder et al. |
| 2011/0119763 A1 | 5/2011 | Wade et al. |
| 2011/0125835 A1 | 5/2011 | Soltis |
| 2011/0137879 A1 | 6/2011 | Dubey et al. |
| 2011/0153561 A1 | 6/2011 | Sawdon et al. |
| 2011/0161299 A1 | 6/2011 | Prahlad et al. |
| 2011/0179414 A1 | 7/2011 | Goggin et al. |
| 2011/0184993 A1 | 7/2011 | Chawla et al. |
| 2011/0185292 A1 | 7/2011 | Chawla et al. |
| 2011/0225574 A1 | 9/2011 | Khalidi et al. |
| 2011/0238949 A1 | 9/2011 | Archer et al. |
| 2011/0239039 A1 | 9/2011 | Dieffenbach et al. |
| 2011/0239213 A1 | 9/2011 | Aswani et al. |
| 2011/0251992 A1 | 10/2011 | Bethlehem et al. |
| 2011/0252208 A1 | 10/2011 | Ali et al. |
| 2011/0255538 A1 | 10/2011 | Srinivasan et al. |
| 2011/0265076 A1 | 10/2011 | Thorat et al. |
| 2011/0271279 A1 | 11/2011 | Pate |
| 2011/0276578 A1 | 11/2011 | Allalouf et al. |
| 2011/0276963 A1 | 11/2011 | Wu et al. |
| 2011/0283277 A1 | 11/2011 | Castillo et al. |
| 2011/0289561 A1 | 11/2011 | Ivanov et al. |
| 2011/0296069 A1 | 12/2011 | Tarta et al. |
| 2011/0307729 A1 | 12/2011 | Matsuzawa et al. |
| 2011/0320690 A1 | 12/2011 | Petersen et al. |
| 2012/0017114 A1 | 1/2012 | Timashev et al. |
| 2012/0023495 A1 | 1/2012 | Machida |
| 2012/0030456 A1 | 2/2012 | Wu et al. |
| 2012/0054736 A1 | 3/2012 | Arcese et al. |
| 2012/0081395 A1 | 4/2012 | Adi et al. |
| 2012/0084381 A1 | 4/2012 | Alladi et al. |
| 2012/0151249 A1 | 6/2012 | Swan et al. |
| 2012/0166866 A1 | 6/2012 | Rao et al. |
| 2012/0185437 A1 | 7/2012 | Pavlov et al. |
| 2012/0209983 A1 | 8/2012 | Bronner et al. |
| 2012/0210066 A1 | 8/2012 | Joshi et al. |
| 2012/0233463 A1 | 9/2012 | Holt et al. |
| 2012/0254445 A1 | 10/2012 | Kawamoto et al. |
| 2012/0254567 A1 | 10/2012 | Umbehocker |
| 2012/0266162 A1 | 10/2012 | Baron |
| 2012/0272237 A1 | 10/2012 | Baron |
| 2012/0290630 A1 | 11/2012 | Aizman et al. |
| 2012/0304247 A1 | 11/2012 | Badger et al. |
| 2012/0310881 A1 | 12/2012 | Shadmon |
| 2012/0310892 A1 | 12/2012 | Dam et al. |
| 2012/0324183 A1 | 12/2012 | Chiruvolu et al. |
| 2012/0331119 A1 | 12/2012 | Bose et al. |
| 2013/0046740 A1 | 2/2013 | Li et al. |
| 2013/0047160 A1 | 2/2013 | Conover |
| 2013/0054979 A1 | 2/2013 | Basmov et al. |
| 2013/0055018 A1 | 2/2013 | Joshi et al. |
| 2013/0061110 A1 | 3/2013 | Zvibel |
| 2013/0061167 A1 | 3/2013 | Rhodes et al. |
| 2013/0066930 A1 | 3/2013 | Kamei et al. |
| 2013/0117744 A1 | 5/2013 | Klein et al. |
| 2013/0132674 A1 | 5/2013 | Sundrani |
| 2013/0151888 A1 | 6/2013 | Bhattiprolu et al. |
| 2013/0152085 A1 | 6/2013 | D'Amore et al. |
| 2013/0174165 A1 | 7/2013 | Chopra |
| 2013/0185716 A1 | 7/2013 | Yin et al. |
| 2013/0198738 A1 | 8/2013 | Reddin et al. |
| 2013/0212345 A1 | 8/2013 | Nakajima |
| 2013/0227379 A1 | 8/2013 | Gupta et al. |
| 2013/0227552 A1 | 8/2013 | Reddin et al. |
| 2013/0227566 A1 | 8/2013 | Higuchi et al. |
| 2013/0232491 A1 | 9/2013 | Radhakrishnan et al. |
| 2013/0246705 A1 | 9/2013 | Diare |
| 2013/0247036 A1 | 9/2013 | Fujiwara |
| 2013/0262396 A1 | 10/2013 | Kripalani et al. |
| 2013/0282994 A1 | 10/2013 | Wires et al. |
| 2013/0283267 A1 | 10/2013 | Cooper et al. |
| 2013/0297869 A1 | 11/2013 | Mills et al. |
| 2014/0006465 A1 | 1/2014 | Davis et al. |
| 2014/0006708 A1 | 1/2014 | Huynh et al. |
| 2014/0025796 A1 | 1/2014 | Mbhor et al. |
| 2014/0059392 A1 | 2/2014 | Ren et al. |
| 2014/0075029 A1 | 3/2014 | Lipchuk et al. |
| 2014/0095544 A1 | 4/2014 | Eshel et al. |
| 2014/0095555 A1 | 4/2014 | Kim et al. |
| 2014/0095816 A1 | 4/2014 | Hsu et al. |
| 2014/0108587 A1 | 4/2014 | Goldberg et al. |
| 2014/0115182 A1 | 4/2014 | Sabaa et al. |
| 2014/0123138 A1 | 5/2014 | Lee et al. |
| 2014/0146055 A1 | 5/2014 | Bala et al. |
| 2014/0149794 A1 | 5/2014 | Shetty et al. |
| 2014/0149983 A1 | 5/2014 | Bonilla et al. |
| 2014/0164449 A1 | 6/2014 | Kim et al. |
| 2014/0173199 A1 | 6/2014 | Gupta et al. |
| 2014/0181048 A1 | 6/2014 | Varadharajan et al. |
| 2014/0181116 A1 | 6/2014 | Wang |
| 2014/0181438 A1 | 6/2014 | Varadharajan et al. |
| 2014/0188808 A1 | 7/2014 | Wolf et al. |
| 2014/0189429 A1 | 7/2014 | Gill et al. |
| 2014/0189677 A1 | 7/2014 | Curzi et al. |
| 2014/0189685 A1 | 7/2014 | Kripalani |
| 2014/0189686 A1 | 7/2014 | Masters et al. |
| 2014/0196038 A1 | 7/2014 | Kottomtharayil et al. |
| 2014/0201725 A1 | 7/2014 | Tian et al. |
| 2014/0207824 A1 | 7/2014 | Brandwine et al. |
| 2014/0230024 A1 | 8/2014 | Uehara et al. |
| 2014/0237464 A1 | 8/2014 | Waterman et al. |
| 2014/0250300 A1 | 9/2014 | Runkis et al. |
| 2014/0279909 A1 | 9/2014 | Sudarsanam et al. |
| 2014/0298185 A1 | 10/2014 | Chen et al. |
| 2014/0310710 A1 | 10/2014 | Lubsey et al. |
| 2014/0359612 A1 | 12/2014 | D'Amato et al. |
| 2014/0365549 A1 | 12/2014 | Jenkins |
| 2015/0006788 A1 | 1/2015 | Liu et al. |
| 2015/0007180 A1 | 1/2015 | Sharp et al. |
| 2015/0026682 A1 | 1/2015 | Singh et al. |
| 2015/0032690 A1 | 1/2015 | Hoque et al. |
| 2015/0039735 A1 | 2/2015 | Zeyliger et al. |
| 2015/0039837 A1 | 2/2015 | Quan et al. |
| 2015/0058475 A1 | 2/2015 | Earl et al. |
| 2015/0074536 A1 | 3/2015 | Varadharajan et al. |
| 2015/0074659 A1 | 3/2015 | Madsen et al. |
| 2015/0081644 A1 | 3/2015 | Pitts |
| 2015/0095597 A1 | 4/2015 | Ayanam et al. |
| 2015/0095788 A1 | 4/2015 | Thiele et al. |
| 2015/0106802 A1 | 4/2015 | Ivanov et al. |
| 2015/0120925 A1 | 4/2015 | Das |
| 2015/0142745 A1 | 5/2015 | Tekade et al. |
| 2015/0142747 A1 | 5/2015 | Zou |
| 2015/0143164 A1 | 5/2015 | Veerla et al. |
| 2015/0172412 A1 | 6/2015 | Escriva et al. |
| 2015/0178019 A1 | 6/2015 | Hegdal et al. |

(56) References Cited

U.S. PATENT DOCUMENTS

| | | |
|---|---|---|
| 2015/0186635 A1 | 7/2015 | Nakhjiri et al. |
| 2015/0193144 A1 | 7/2015 | Bilas et al. |
| 2015/0205639 A1 | 7/2015 | Matsumoto et al. |
| 2015/0213032 A1 | 7/2015 | Powell et al. |
| 2015/0220324 A1 | 8/2015 | Arcese et al. |
| 2015/0242291 A1 | 8/2015 | Chang et al. |
| 2015/0248402 A1 | 9/2015 | Patterson, III et al. |
| 2015/0256617 A1 | 9/2015 | Klose et al. |
| 2015/0278046 A1 | 10/2015 | Zellermayer et al. |
| 2015/0293830 A1 | 10/2015 | Bhide et al. |
| 2015/0293896 A1 | 10/2015 | Runkis et al. |
| 2015/0301903 A1 | 10/2015 | Mutha et al. |
| 2015/0309825 A1 | 10/2015 | Farkas et al. |
| 2015/0324217 A1 | 11/2015 | Shilmover et al. |
| 2015/0326531 A1 | 11/2015 | Cui et al. |
| 2015/0331757 A1 | 11/2015 | Durge et al. |
| 2015/0355862 A1 | 12/2015 | Hayes et al. |
| 2015/0356125 A1 | 12/2015 | Golander et al. |
| 2015/0378761 A1 | 12/2015 | Sevigny et al. |
| 2015/0378853 A1 | 12/2015 | Sevigny et al. |
| 2016/0011898 A1 | 1/2016 | Lee et al. |
| 2016/0070492 A1 | 3/2016 | Cherubini et al. |
| 2016/0077988 A1 | 3/2016 | Tipton et al. |
| 2016/0078068 A1 | 3/2016 | Agrawal et al. |
| 2016/0085480 A1 | 3/2016 | Chiu et al. |
| 2016/0085574 A1 | 3/2016 | Dornemann et al. |
| 2016/0087861 A1 | 3/2016 | Kuan et al. |
| 2016/0100016 A1* | 4/2016 | Mu .................. H04L 63/10 709/219 |
| 2016/0110214 A1 | 4/2016 | Vincent et al. |
| 2016/0110267 A1 | 4/2016 | Earl et al. |
| 2016/0124663 A1 | 5/2016 | Mitkar et al. |
| 2016/0124665 A1 | 5/2016 | Jain et al. |
| 2016/0162371 A1 | 6/2016 | Prabhu et al. |
| 2016/0171241 A1 | 6/2016 | Yun |
| 2016/0179416 A1 | 6/2016 | Mutha et al. |
| 2016/0179419 A1 | 6/2016 | Yamaguchi et al. |
| 2016/0180107 A1 | 6/2016 | Panchbudhe et al. |
| 2016/0188232 A1 | 6/2016 | Ramachandran et al. |
| 2016/0188407 A1 | 6/2016 | Bronnikov et al. |
| 2016/0202916 A1 | 7/2016 | Cui et al. |
| 2016/0203008 A1 | 7/2016 | Cui et al. |
| 2016/0216993 A1 | 7/2016 | Beckwith et al. |
| 2016/0224363 A1 | 8/2016 | Joy |
| 2016/0274926 A1 | 9/2016 | Narasimhamurthy et al. |
| 2016/0301766 A1 | 10/2016 | Ionescu et al. |
| 2016/0306558 A1 | 10/2016 | Varadharajan et al. |
| 2016/0306751 A1 | 10/2016 | Amarendran et al. |
| 2016/0314046 A1 | 10/2016 | Kumarasamy |
| 2016/0316003 A1 | 10/2016 | Snider et al. |
| 2016/0328007 A1 | 11/2016 | Aranjani et al. |
| 2016/0328226 A1 | 11/2016 | Arya et al. |
| 2016/0335134 A1 | 11/2016 | Gupta et al. |
| 2016/0359697 A1 | 12/2016 | Scheib et al. |
| 2016/0371020 A1 | 12/2016 | Sarkar et al. |
| 2016/0378528 A1 | 12/2016 | Zamir |
| 2016/0378616 A1 | 12/2016 | Wigmore et al. |
| 2017/0004131 A1 | 1/2017 | Ben Dayan et al. |
| 2017/0005990 A1 | 1/2017 | Birger et al. |
| 2017/0012904 A1 | 1/2017 | Matzek et al. |
| 2017/0024152 A1 | 1/2017 | Bhagi et al. |
| 2017/0024224 A1 | 1/2017 | Bakke et al. |
| 2017/0039078 A1 | 2/2017 | Chen et al. |
| 2017/0039082 A1 | 2/2017 | Ganesan et al. |
| 2017/0039218 A1 | 2/2017 | Prahlad et al. |
| 2017/0041296 A1 | 2/2017 | Ford et al. |
| 2017/0048223 A1 | 2/2017 | Anantha Padmanaban et al. |
| 2017/0068469 A1 | 3/2017 | Shankar et al. |
| 2017/0075921 A1 | 3/2017 | Benton et al. |
| 2017/0090776 A1 | 3/2017 | Kowles |
| 2017/0091047 A1 | 3/2017 | Bangalore et al. |
| 2017/0091262 A1 | 3/2017 | Beard et al. |
| 2017/0109184 A1 | 4/2017 | Ramani et al. |
| 2017/0123890 A1 | 5/2017 | Haridas et al. |
| 2017/0155691 A1 | 6/2017 | Knauft et al. |
| 2017/0160983 A1 | 6/2017 | Fiske et al. |
| 2017/0177638 A1 | 6/2017 | Bhosale et al. |
| 2017/0193021 A1 | 7/2017 | Deng et al. |
| 2017/0206074 A1 | 7/2017 | Arcese et al. |
| 2017/0206207 A1 | 7/2017 | Bondurant et al. |
| 2017/0220661 A1 | 8/2017 | Cao et al. |
| 2017/0228300 A1 | 8/2017 | Thomas et al. |
| 2017/0235507 A1 | 8/2017 | Sinha et al. |
| 2017/0235562 A1 | 8/2017 | Bafna et al. |
| 2017/0235563 A1 | 8/2017 | Bafna et al. |
| 2017/0235589 A1 | 8/2017 | Gopalapura Venkatesh et al. |
| 2017/0235590 A1 | 8/2017 | Sinha et al. |
| 2017/0235591 A1 | 8/2017 | Kanada et al. |
| 2017/0235653 A1 | 8/2017 | Arikatla et al. |
| 2017/0235654 A1 | 8/2017 | Deshmukh et al. |
| 2017/0235751 A1 | 8/2017 | Gupta et al. |
| 2017/0235758 A1 | 8/2017 | Gopalapura Venkatesh et al. |
| 2017/0235760 A1 | 8/2017 | Sharpe et al. |
| 2017/0235761 A1 | 8/2017 | Bafna et al. |
| 2017/0235762 A1 | 8/2017 | Sharpe et al. |
| 2017/0235763 A1 | 8/2017 | Gopalapura Venkatesh et al. |
| 2017/0235764 A1 | 8/2017 | Sharpe et al. |
| 2017/0235950 A1 | 8/2017 | Gopalapura Venkatesh et al. |
| 2017/0242599 A1 | 8/2017 | Patnaik et al. |
| 2017/0242871 A1 | 8/2017 | Kilaru et al. |
| 2017/0262346 A1 | 9/2017 | Pradhan et al. |
| 2017/0264684 A1 | 9/2017 | Spillane et al. |
| 2017/0277556 A1 | 9/2017 | Ishii et al. |
| 2017/0277903 A1 | 9/2017 | Christodorescu et al. |
| 2017/0279674 A1 | 9/2017 | Zhu |
| 2017/0286228 A1 | 10/2017 | Redko et al. |
| 2017/0302589 A1 | 10/2017 | Leafe et al. |
| 2017/0302731 A1 | 10/2017 | Cu |
| 2017/0329554 A1 | 11/2017 | Voigt et al. |
| 2018/0004766 A1 | 1/2018 | Darling |
| 2018/0062993 A1 | 3/2018 | Wu et al. |
| 2018/0107838 A1 | 4/2018 | Amarendran et al. |
| 2018/0129426 A1 | 5/2018 | Aron et al. |
| 2018/0143845 A1 | 5/2018 | Chawla et al. |
| 2018/0143880 A1 | 5/2018 | Dornemann |
| 2018/0145960 A1 | 5/2018 | Bakshan et al. |
| 2018/0157521 A1 | 6/2018 | Arikatla et al. |
| 2018/0157522 A1 | 6/2018 | Bafna et al. |
| 2018/0157561 A1 | 6/2018 | Venkatesh et al. |
| 2018/0157677 A1 | 6/2018 | Bafna et al. |
| 2018/0157752 A1 | 6/2018 | Arikatla et al. |
| 2018/0157860 A1 | 6/2018 | Nair et al. |
| 2018/0159729 A1 | 6/2018 | Deshmukh et al. |
| 2018/0159826 A1 | 6/2018 | Yisan et al. |
| 2018/0173731 A1 | 6/2018 | Nazari et al. |
| 2018/0181266 A1 | 6/2018 | von Muhlen et al. |
| 2018/0181448 A1 | 6/2018 | von Muhlen et al. |
| 2018/0181449 A1 | 6/2018 | von Muhlen et al. |
| 2018/0181587 A1 | 6/2018 | von Muhlen et al. |
| 2018/0181723 A1 | 6/2018 | von Muhlen et al. |
| 2018/0196719 A1 | 7/2018 | Glass |
| 2018/0205787 A1 | 7/2018 | Ben Dayan et al. |
| 2018/0225204 A1 | 8/2018 | Choudhari et al. |
| 2018/0278602 A1 | 9/2018 | Koushik et al. |
| 2018/0332105 A1 | 11/2018 | Huang et al. |
| 2018/0357251 A1 | 12/2018 | Kumarasamy et al. |
| 2019/0026101 A1 | 1/2019 | Venkatesh et al. |
| 2019/0034240 A1 | 1/2019 | Nabi et al. |
| 2019/0079747 A1 | 3/2019 | Sinha et al. |
| 2019/0087279 A1 | 3/2019 | Kumar et al. |
| 2019/0087280 A1 | 3/2019 | Kumar et al. |
| 2019/0087281 A1 | 3/2019 | Kumar et al. |
| 2019/0087282 A1 | 3/2019 | Kumar et al. |
| 2019/0087285 A1 | 3/2019 | Kumar et al. |
| 2019/0087286 A1 | 3/2019 | Kumar et al. |
| 2019/0129808 A1 | 5/2019 | Acharya et al. |
| 2019/0196718 A1 | 6/2019 | Pai et al. |
| 2019/0207925 A1 | 7/2019 | Anantha Padmanaban et al. |
| 2019/0286330 A1 | 9/2019 | Varadharajan et al. |
| 2019/0332683 A1 | 10/2019 | Thummala et al. |
| 2019/0339883 A1 | 11/2019 | Aron et al. |
| 2020/0007530 A1 | 1/2020 | Mohamad Abdul et al. |
| 2020/0034069 A1 | 1/2020 | Batra et al. |
| 2020/0036647 A1 | 1/2020 | Gupta et al. |

(56) References Cited

U.S. PATENT DOCUMENTS

| | | | |
|---|---|---|---|
| 2020/0042537 A1* | 2/2020 | Kaushik | G06F 11/2097 |
| 2020/0050522 A1* | 2/2020 | Coleman | G06F 11/2041 |
| 2020/0081704 A1 | 3/2020 | Bafna et al. | |
| 2020/0081733 A1 | 3/2020 | Buck et al. | |
| 2020/0106669 A1 | 4/2020 | Dhillon et al. | |
| 2020/0125426 A1 | 4/2020 | von Muhlen et al. | |
| 2020/0125580 A1 | 4/2020 | Shao | |
| 2020/0137157 A1 | 4/2020 | Joseph et al. | |
| 2020/0274869 A1 | 8/2020 | Tahenakos et al. | |
| 2020/0387575 A1 | 12/2020 | Palekar et al. | |
| 2021/0049240 A1 | 2/2021 | Earl et al. | |
| 2021/0081358 A1 | 3/2021 | Khurana et al. | |
| 2021/0141630 A1 | 5/2021 | Sharpe et al. | |
| 2021/0165759 A1 | 6/2021 | Bar-Nissan et al. | |
| 2021/0200641 A1 | 7/2021 | Bafna et al. | |
| 2021/0224233 A1 | 7/2021 | Bafna et al. | |
| 2021/0247973 A1 | 8/2021 | Gupta et al. | |
| 2021/0334178 A1 | 10/2021 | Yang et al. | |
| 2021/0344772 A1 | 11/2021 | Arikatla et al. | |
| 2021/0349859 A1 | 11/2021 | Bafna et al. | |
| 2021/0365257 A1 | 11/2021 | Venkatesh et al. | |
| 2021/0382636 A1 | 12/2021 | Perumal et al. | |
| 2021/0390080 A1 | 12/2021 | Tripathi et al. | |
| 2021/0397587 A1 | 12/2021 | Thummala et al. | |
| 2021/0406136 A1 | 12/2021 | Venkatesh et al. | |
| 2022/0004377 A1 | 1/2022 | Sharpe et al. | |
| 2022/0147342 A1 | 5/2022 | Sharpe et al. | |
| 2022/0147495 A1 | 5/2022 | Sharpe et al. | |
| 2022/0155964 A1 | 5/2022 | Varadharajan et al. | |
| 2022/0156107 A1 | 5/2022 | Bafna et al. | |
| 2022/0229687 A1 | 7/2022 | Singhal et al. | |
| 2022/0300335 A1 | 9/2022 | Venkatesh et al. | |
| 2022/0350591 A1 | 11/2022 | Bafna et al. | |
| 2022/0350592 A1 | 11/2022 | Gopalapura Venkatesh et al. | |
| 2023/0185944 A1 | 6/2023 | Nair et al. | |
| 2023/0237102 A1 | 7/2023 | Arikatla et al. | |
| 2023/0289170 A1 | 9/2023 | Sharpe et al. | |
| 2023/0325173 A1 | 10/2023 | Gupta et al. | |
| 2024/0103985 A1 | 3/2024 | Venkatesh et al. | |
| 2025/0097231 A1 | 3/2025 | Lai et al. | |

FOREIGN PATENT DOCUMENTS

| | | |
|---|---|---|
| CN | 106357744 A | 1/2017 |
| CN | 110516005 A | 11/2019 |
| CN | 110519112 A | 11/2019 |
| CN | 110569269 A | 12/2019 |
| CN | 111259376 A | 6/2020 |
| CN | 109076126 B | 9/2020 |
| EP | 1062581 B1 | 10/2003 |
| EP | 1214663 B1 | 6/2006 |
| EP | 1979814 | 10/2008 |
| WO | 2010050944 A1 | 5/2010 |
| WO | 2012126177 A2 | 9/2012 |
| WO | 2016018446 A1 | 2/2016 |
| WO | 2018014650 A1 | 1/2018 |

OTHER PUBLICATIONS

US 11,048,595 B2, 06/2021, Venkatesh et al. (withdrawn) VSphere/7.0/com.vmware.vsphere.vsan.doc/GUID-6D9184A4-23BB-411B-983B-D2A9BC6A33E6.html, Jul. 21, 2020.

"Recovering a vSAN disk group from a failed ESXi host", VirtualSlices; retrieved from: https://www.virtualslices.com/2019/09/recovering-vsan-disk-group-from-a-failed-esxi-host/, Sep. 12, 2019.

"Scale-Out File Server for application data overview", Microsoft; retrieved from: https://learn.microsoft.com/en-us/windows-server/failover-clustering/sofs-overview, Oct. 10, 2022.

"Setting up and Using Acropolis File Services (AFS) on Nutanix AOS 5.0", Virtual Dennis - Sharing Technical Tips Learned the Hard Way, Dec. 30, 2016, pp. all.

"Simple File Manager for Amazon EFS", https://docs.aws.amazon.com/pdfs/solutions/latest/simple-file-manager-for-amazon-efs/simple-file-manager-for-amazon-efs.pdf#welcome, 2023, pp. 1-23.

"Snapshot Files", VMWare Docs; retrieved from: https://docs.vmware.com/en/VMware-vSphere/7.0/com.vmware.vsphere.vm_admin.doc/GUID-38F4D574-ADE7-4B80-AEAB-7EC502A379F4.html, Jul. 29, 2022.

"Stretched Cluster SPBM Policies—What are my options?", VMware; The Cloud Platform Tech Zone; https://core.vmware.com/blog/stretched-cluster-spbm-policies-what-are-my-options, Jun. 14, 2021.

"Synchronize the Contents of a Subscribed Library", VMWare Docs; retrieved from: https://docs.vmware.com/en/VMware-vSphere/8.0/vsphere-vm-administration/GUID-9DE2BD8F-E499-4F1E-956B-67212DE593C6.html#GUID-9DE2BD8F-E499-4F1E-956B-67212DE593C6, Jul. 6, 2022.

"TAM Lab 087—Setup and Use vSAN File Services", Youtube.com; retrieved from: https://www.youtube.com/watch?v=4vW6vWhwtu4, Mar. 25, 2021.

"VSAN 2-NODE Cluster Guide", VMwareStorage; https://web.archive.org/web/20221127090148/https://core.vmware.com/resource/vsan-2-node-cluster-guide; dated Jun. 2020; printed Nov. 21, 2022, Jun. 2020.

"VSAN 7 U1 File Services", VMware Virtual Blocks Blog; https://blogs.vmware.com/virtualblocks/2020/09/17/vsan-7-u1-file-services/, Sep. 17, 2020.

"VSAN 7 U1 File Services", Youtube; https://www.youtube.com/watch?v=UvSpiDqh3Bk, Sep. 17, 2020.

"VSAN 7 U1 File Services Performance and Capacity Monitoring", Youtube.com; retrieved from: https://www.youtube.com/watch?v=Vk8_4Q_jhv8&t=22s, Sep. 17, 2020.

"VSAN 7.0 U2 Proof of Concept Guide", VMwareStorage; https://core.vmware.com/resource/vsan-70-u2-proof-concept-guide, Apr. 2021, 1-259.

"VSAN 7.0 U2 Proof of Concept Guide", VMwareStorage; https://images.core.vmware.com/sites/default/files/resource/vsan_70_u2_proof_of_concept_guide_noindex.pdf, Apr. 2021, pp. 1-267.

"VSAN Concepts", Retrieved from: https://web.archive.org/web/20230324204509/https://docs.vmware.com/en/VMware-vSphere/8.0/vsan-administration/GUID-ACC10393-47F6-4C5A-85FC-88051C1806A0.html, Jul. 5, 2022.

"VSAN Disaster Recovery", VMware; The Cloud Platform Tech Zone; https://core.vmware.com/resource/vsan-disaster-recovery, Aug. 2020.

"VSAN Distributed File System Snapshot", VMWare docs; retrieved from: https://docs.vmware.com/en/VMware-vSphere/7.0/com.vmware.vsphere.vsan.doc/GUID-EAF180D7-BB7C-4F1F-ACAF-33A3C25C1FAF.html, May 23, 2023.

"Active Directory Overview", https://www.manageengine.com/products/ad-manager/help/technology/windows_active_directory_structure.html, Retrieved Aug. 11, 2023, pp. 1-2.

"Administering VMware vSAN", Update 2, VMware vSphere 7.0, VMware vSAN 7.0; https://docs.vmware.com/en/VMware-vSphere/7.0/vsan-702-administration-guide.pdf, Apr. 16, 2021.

"Administering VMware vSAN", Update 2, VMware vSphere 8.0, VMware vSAN 8.0; retrieved from: https://docs.vmware.com/en/VMware-vSphere/8.0/vsan-802-administration-guide.pdf, Sep. 2023.

"Administering VMware vSan", Update 3; VMware vSphere 7.0, VMware vSAN 7.0; https://docs.vmware.com/en/VMware-vSphere/7.0/vsan-703-administration-guide.pdf, Nov. 8, 2021, 1-126.

"Administering VMware vSAN—Update 1 VMware vSphere 8.0 VMware vSAN 8.0", https://docs.vmware.com/en/VMware-vSphere/8.0/vsan-801-administration-guide.pdf, 2015, pp. 1-151.

"Administering VMware vSAN—VMware vSphere 7.0", Update 1; docs.vmware.com/en/VMware-vSphere/7.0/vsan-701-administration-guide.pdf, 2015-2020, pp. 1-114.

"Architecting VMware vSAN 6.2 for VMware Cloud Providers", VMware vCloud Architecture Toolkit; retrieved: https://download3.vmware.com/vcat/vmw-vcloud-architecture-toolkit-spv1-webworks/index.html#page/Storage%20and%20Availability/Architecting%20VMware%20vSAN%206.2/Architecting%20Virtual%20SAN%206.2.2.010.html, Jan. 2018.

"Assign Roles and Permissions using the vSphere Client", Youtube; https://www.youtube.com/watch?v=ZwRheTljapY, Oct. 16, 2018.

(56) References Cited

OTHER PUBLICATIONS

"Backing up vSAN File Shares", VMware—The Cloud Platform Tech Zone; retrieved from: https://core.vmware.com/blog/backing-vsan-file-shares, Jun. 18, 2021.
"Backup Using vSAN File Share Snapshots", YouTube; retrieved from: https://www.youtube.com/watch?v=06Tr8f0LTZY, Jun. 22, 2021.
"Backup vSAN 7 File Share with Veeam Backup & Replication 10", Sysadmin Stories, https://www.sysadminstories.com/2020/06/backup-vsan-7-file-share-with-veeam.html, Jun. 2, 2020, pp. 1-7.
"Changing the ESXi Host Name using vSphere Web Client", Pavanas Blog; retrieved from: https://pchawda.wordpress.com/category/esxi/page/3/, May 11, 2016.
"Characteristics of a vSAN Cluster", VMWare Docs; retrieved from: https://docs.vmware.com/en/VMware-vSphere/7.0/com.vmware.vsphere.vsan-planning.doc/GUID-C0818534-7B96-43E4-93BB-7955449852DE.html, May 31, 2019, pp. 1-2.
"Citrix XenDesktop 7.1 on Microsoft Hyper-V Server 2012 R2 on Nutanix Virtual Computing Platform", Citrix APAC Solutions, Jun. 25, 2014, pp. 1-94.
"Clustered Data Ontap 8.2 File Access Management Guide for CIFS", NetApp; (year 2014), Feb. 2014, pp. all.
"Configure File Services", VMWare Docs; Retrieved from https://web.archive.org/web/20230301213242/https://docs.vmware.com/en/VMware-vSphere/7.0/com.vmware.vsphere.vsan.doc/GUID-CA9CF043-9434-454E-86E7-DCA9AD9B0C09.html, Nov. 7, 2021,.
"Configure File Services", retrieved from: https://docs.vmware.com/en/VMware-vSphere/7.0/com.vmware.vsphere.vsan.doc/GUID-CA9CF043-9434-454E-86E7-DCA9AD9B0C09.html, Updated May 25, 2023.
"Configure Native File Services on vSAN 7.0!!", Native File Services on vSAN 7.0; My Cloud Arena Blog; https://mycloudarena.blogspot.com/2020/04/configure-native-file-services-on-vsan.html, Apr. 10, 2020.
"Configure VMware File Sharing with VMware vSAN File Service running on top of vSAN object storage", Youtube; https://www.youtube.com/watch?v=8rdaZIInJAg, Apr. 2, 2022.
"Configuring a VMware ESXi Cluster", Nakivo Blog; retrieved from: https://www.nakivo.com/blog/configuring-vmware-esxi-cluster/, Jun. 1, 2023.
"Configuring vSan File Service", retrieved from: https://wuchikin.wordpress.com/2023/02/04/configuring-vsan-file-service, Feb. 4, 2023.
"Copy-on-write and Redirect-on-write", Mohan Kumar Blog; retrieved from: https://mohankumar-k.blogspot.com/2018/05/copy-on-write-and-redirect-on-write.html, May 31, 2018.
"Create a File Share", VMware Docs; https://docs.vmware.com/en/VMware-vSphere/7.0/com.vmware.vsphere.vsan.doc/GUID-4D24850D-0C85-4C5F-8CD7-93EB5D1A61C5.html, Aug. 17, 2021.
"Create a Library", VMWare Docs; retrieved from: https://docs.vmware.com/en/VMware-vSphere/6.5/com.vmware.vsphere.vm_admin.doc/GUID-2A0F1C13-7336-45CE-B211-610D39A6E1F4.html, Jul. 22, 2019.
"Create a vSAN File Share", VMware Docs; retrieved from: https://docs.vmware.com/en/VMware-vSphere/8.0/vsan-administration/GUID-4D24850D-0C85-4C5F-8CD7-93EB5D1A61C5.html, Jul. 10, 2023.
"How NFS Referrals Work", From: Managing Network File Systems in Oracle® Solaris 11.2; Oracle.com; retrieved from: https://docs.oracle.com/cd/E36784_01/html/E36825/gjuaj.html#scrolltoc, Jul. 2014.
"How to Configure vSAN File Service—VMware vSAN 7.0", VMware Arena; https://www.vmwarearena.com/configure-vsan-file-service/, Jul. 27, 2020.
"How to Configure vSAN File Services in vSAN 7.0 | What's new with vSAN 7.0", YouTube; retrieved from: https://www.youtube.com/watch?v=ApLO1EhjMQY, Jul. 20, 2020.
"How to configure vSphere 7 Content Library", 4sysops—The online community for SysAdmins and DevOps; retrieved from: https://4sysops.com/archives/how-to-configure-vsphere-7-content-library/, Mar. 19, 2021.
"How to Create a NFS File Share from vSAN Datastore | vSAN 7.0", Youtube; https://www.youtube.com/watch?v=Qrl_XKTv8O8&t=445s, Jul. 27, 2020.
"How to Create a NFS File Share from vSAN Datastore | vSAN 7.0", Youtube; https://youtu.be/i7fj4lHWwv8, Jul. 27, 2020.
"How to Efficiently Deploy Virtual Machines from VMware vSphere Content Library", VMware VROOM! Performance Blog; retrieved from: https://blogs.vmware.com/performance/2015/07/efficiently-deploy-vms-vmware-vsphere-content-library.html, Jul. 9, 2015.
"How to Populate Libraries with Content", VMWare Docs; retrieved from: https://docs.vmware.com/en/VMware-vSphere/8.0/vsphere-vm-administration/GUID-B413FBAE-8FCB-4598-A3C2-8B6DDA772D5C.html, Jul. 5, 2022.
"How to troubleshoot the 'Autolocation' feature in Clustered Data ONTAP", NetApp https://kb.netapp.com/app/answers/answer_view/a_id/1030857/loc/en_US#_highlight, Sep. 19, 2019, pp. all.
"VSAN Health Service—File Service—File Server Health (77165)", VMware Knowledge Base; https://kb.vmware.com/s/article/77165, Feb. 24, 2023.
"VSAN Health Service—File Service—File Server Health (77165)", VMware, Knowledge Base; https://kb.vmware.com/s/article/77165, May 15, 2021, pp. 1-5.
"VSAN Monitoring and Troubleshooting—VMware vSphere 7.0", https://docs.vmware.com/, Sep. 2018, 1-61.
"VSAN Networking Terms and Definitions", VMWare Docs; retrieved from: https://docs.vmware.com/en/VMware-vSphere/7.0/vsan-network-design-guide/GUID-725668B0-B1B9-48A0-AB4F-A6386C7D649E.html, Dec. 10, 2019.
"VSAN NFS Share Configuration in VMware vSphere 7.0", retreieved from https://www.virtualizationhowto.com/2020/07/vsan-nfs-share-configuration-in-vmware-vsphere-7-0/, Jul. 24, 2020.
"VSAN NFSv3 v NFSv4 balancing", Youtube; https://www.youtube.com/watch?v=3jWkgfhcg6M&t=3s, Mar. 18, 2020.
"VSAN Performance Graphs in the vSphere Web Client (2144493)", Nov. 9, 2020, 1-42.
"VSAN Planning and Deployment", Update 2 VMWare vSphere 6.7; VMware vSAN 6.7; https://docs.vmware.com/en/VMware-vSphere/6.7/vsan-673-planning-deployment-guide.pdf, Aug. 20, 2019, pp. 1-85.
"VSAN Scalable File Services", It Should Just Work; retrieved from: https://www.isjw.uk/post/events/vmworld-2018/vsan-scalable-file-services/, Nov. 22, 2018.
"VSphere Availability—VMware vSphere 6.7", https://docs.vmware.com/, Jan. 11, 2019, 1-105.
"VSphere Content Library: Architecture, Working, API Explorer | Perfect for Home Lab Setup!", YouTube; retrieved from: https://youtu.be/FHEbndspyUo, Apr. 12, 2022.
"VSphere ESX Agent Manager", VMWare Docs; retrieved from: https://docs.vmware.com/en/VMware-vSphere/7.0/com.vmware.vsphere.monitoring.doc/GUID-D56ABFF4-4529-409C-9AA2-8D8D4E235601.html, Aug. 22, 2020.
"VSphere ESX Agent Manager API Reference Documentation", VMware.com; vSphere ESX Agent Manager API | Version 7.0; obtained from: https://vdc-download.vmware.com/vmwb-repository/dcr-public/6bcc7a1f-e8e0-4cfb-a558-40147eac92f8/11fdf031-6e51-4b38-9768-3b9dace19188/doc/index.html, 2020.
"VSphere Replication", VMware; https://www.vmware.com/in/products/vsphere/replication.html, Retrieved Mar. 30, 2023.
"VSphere Replication enhancements in vSAN 7.0", YouTube; https://www.youtube.com/watch?v=cjZUkxrYW1M; screen capture at 1:45, Mar. 2020.
"VSphere Replication Target Storage Consumption", VMware vSphere Blog; https://blogs.vmware.com/vsphere/2015/04/vsphere-replication-target-storage-consumption.html, Apr. 17, 2015.
"VSphere Replication Technical Overview", VMwareBC/DR; https://core.vmware.com/resource/vsphere-replication-technical-overview, Aug. 2020.
"VSphere Storage", VMWare Update 2, VMware vSphere 6.7, VMWare EXSi 6.7, vCenter Server 6.7; retrieved from: https://docs.vmware.com/en/VMware-vSphere/6.7/vsphere-esxi-vcenter-server-672-storage-guide.pdf, Apr. 11, 2019.

(56) References Cited

OTHER PUBLICATIONS

Epping, , "Introducing vSAN File Services as part of vSAN 7.0", retrieved from: https://www.yellow-bricks.com/2020/03/17/introducing-vsan-file-services-as-part-of-vsan-7-0/, Mar. 17, 2020.
Epping, , "Scaling out a vSAN Cluster with File Services enabled", Youtube.com; retrieved from: https://www.youtube.com/watch?v=1fkPGIOPQ6E, Apr. 10, 2020.
Epping, , "Scaling out your vSAN File Services Cluster", YellowBricks Blog; retrieved from: https://www.yellow-bricks.com/2020/04/10/scaling-out-your-vsan-file-services-cluster/, Apr. 10, 2020.
Epping, , "vSAN File Services and Stretched Clusters!", Yellow Bricks blog; https://www.yellow-bricks.com/2021/03/29/vsan-file-services-and-stretched-clusters/, Mar. 29, 2021.
Epping, , "vSAN File Services considerations", YellowBricks blog; retrieved from: https://www.yellow-bricks.com/2020/04/15/vsan-file-services-considerations/, Apr. 15, 2020.
Feroce, Danilo , "Leveraging VMware vSAN for Highly Available Management Clusters", VMware, Inc., Version 2.9, VMware, Inc.; https://www.vmware.com/content/dam/digitalmarketing/vmware/en/pdf/vcat/vmware-leveraging-virtual-san-for-ha-management-clusters.pdf, Jan. 2018, 1-22.
Flecha, , "Understanding vSAN Architecture: Disk Groups", VMware Virtual Blocks Blog; https://blogs.vmware.com/virtualblocks/2019/04/18/vsan-disk-groups/, Apr. 18, 2019.
Flecha, , "vSAN 7 Update 2 File Services", VMware Virtual Blocks Blog; https://blogs.vmware.com/virtualblocks/2021/03/17/vsan-7-update- 2-file-services/, Mar. 17, 2021.
Fojta, Tomas , "Quotas and Quota Policies in VMware Cloud Director", Tom Fojta's Blog; retrieved from: https://fojta.wordpress.com/2020/11/06/quotas-and-quota-policies-in-vmware-cloud-director/, Nov. 6, 2020, 1-4.
"Overview of file sharing using the SMB 3protocol in Windows Server", https://learn.microsoft.com/en-us/windows-server/storage/file-server/file-server-smb-overview, Jan. 27, 2023, pp. 1-7.
"Using Microsoft Windows file shares", https://docs.aws.amazon.com/fsx/latest/WindowsGuide/using-file-shares.html, 2023, pp. 1-14.
Adam, Michael , "Samba's Way Toward SMB 3.0", vol. 38, No. 1 | https://www.usenix.org/system/files/login/articles/03adam_016-025_online.pdf, Feb. 2013, pp. 16-25.
Poitras, Steven , "The Nutanix Bible", https://nutanixbible.com/, Apr. 9, 2019, pp. all.
Poitras, Steven , "The Nutanix Bible", http://stevenpoitras.com/the-nutanix-bible/ (Publication date based on indicated capture date by Archive.org; first publication date unknown), Jan. 11, 2014, pp. all.
Poitras, Steven , "The Nutanix Bible", https://nutanixbible.com/, Jan. 12, 2016, pp. all.
Poitras, Steven , "The Nutanix Bible", https://nutanixbible.com/, Jan. 3, 2017, pp. all.
Poitras, Steven , "The Nutanix Bible", https://nutanixbible.com/, Jan. 3, 2018, pp. all.
Poitras, Steven , "The Nutanix Bible", http://stevenpoitras.com/the-nutanix-bible/ (Publication date based on indicated capture date by Archive.org; first publication date unknown), Jan. 7, 2015, pp. all.
Poitras, Steven , "The Nutanix Bible", https://nutanixbible.com/, Jan. 8, 2019, pp. all.
Poitras, Steven , "The Nutanix Bible", https://nutanixbible.com/, Jul. 25, 2019, pp. all.
Poitras, Steven , "The Nutanix Bible", http://stevenpoitras.com/the-nutanix-bible/ (Publication date based on indicated capture date by Archive.org; first publication date unknown), Jun. 20, 2014, pp. all.
Poitras, Steven , "The Nutanix Bible", https://www.nutanixbible.com, Jun. 23, 2023, pp. 1-263.
Poitras, Steven , "The Nutanix Bible", https://nutanixbible.com/, Jun. 25, 2018, pp. all.
Poitras, Steven , "The Nutanix Bible", https://nutanixbible.com/, Jun. 8, 2017, pp. all.
Poitras, Steven , "The Nutanix Bible", http://stevenpoitras.com/the-nutanix-bible/ (Publication date based on indicated capture date by Archive.org; first publication date unknown), Jun. 9, 2015, pp. all.
Poitras, Steven , "The Nutanix Bible", https://nutanixbible.com/, Jun. 9, 2016, pp. all.
Poitras, Steven , "The Nutanix Bible", https://nutanixbible.com/, Mar. 2, 2020, pp. all.
Poitras, Steven , "The Nutanix Bible", https://nutanixbible.com/, Mar. 2, 2021, pp. all.
Poitras, Steven , "The Nutanix Bible", http://stevenpoitras.com/the-nutanix-bible/ (Publication date based on indicated capture date by Archive.org; first publication date unknown), Oct. 15, 2013, pp. all.
Poitras, Steven , "The Nutanix Bible", https://nutanixbible.com/, Sep. 1, 2020, pp. all.
Poitras, Steven , "The Nutanix Bible", https://nutanixbible.com/, Sep. 17, 2019, pp. all.
Poitras, Steven , "The Nutanix Bible", https://nutanixbible.com/, Sep. 3, 2021, pp. all.
Poitras, Steven , "The Nutanix Bible", https://nutanixbible.com/, Sep. 4, 2015, pp. all.
Poitras, Steven , "The Nutanix Bible—Classic Edition", https://nutanixbible.com/ (Mar. 1, 2023), Mar. 1, 2023, pp. all.
Poitras, Steven , "The Nutanix Bible—Classic Edition", https://nutanixbible.com/ (Sep. 9, 2022), Sep. 9, 2022, pp. all.
[Published as US 20180157860 A1 on Jun. 7, 2018] U.S. Appl. No. 15/829,602 entitled "Handling Permissions for Virtualized File Servers", filed Dec. 1, 2017.
[Published as US 20220004377 A1 on Jan. 6, 2022] U.S. Appl. No. 17/448,315 titled "Virtualized File Server" filed Sep. 21, 2021.
[Published as US 20220147342 A1 on May 12, 2022] U.S. Appl. No. 17/585,403 titled "Virtualized File Server Smart Data Ingestion" filed Jan. 27, 2022.
[Published as US 20220147495 A1 on May 12, 2022] U.S. Appl. No. 17/580,555 titled "Virtualized File Server" filed Jan. 20, 2022.
[Published as US 20220156107 A1 on May 19, 2022] U.S. Appl. No. 17/648,796 titled "Virtualized Server Systems and Methods Including Scaling of File System Virtual Machines" filed Jan. 24, 2022.
[Published as US-2022-0147495-A1] U.S. Appl. No. 17/580,555 titled "Virtualized File Server" filed Jan. 20, 2022, pp. all pages of the application as filed.
[Published as US-2022-0156107-A1] U.S. Appl. No. 17/648,796 titled "Virtualized Server Systems and Methods Including Scaling of File System Virtual Machines" filed Jan. 24, 2022, pp. all pages of the application as filed.
[Published as US-2022-0350591-A1] U.S. Appl. No. 17/865,907 titled "Virtualized File Server Deployment" filed Jul. 15, 2022.
[Published as US-2022-0350592-A1] U.S. Appl. No. 17/866,225 titled Virtualized File Server Disaster Recovery filed Jul. 15, 2022.
[Published as US-2023-00256425-A1] U.S. Appl. No. 17/581,418 titled "File Server Managers and Systems for Managing Virtualized File Servers" filed Jan. 21, 2022.
[Published as US-2023-0237102-A1] U.S. Appl. No. 18/069,920 titled "Transparent Referrals for Distributed File Servers" filed Dec. 21, 2022.
[Published as US-2023-0289170-A1] U.S. Appl. No. 18/054,490 titled "Virtualized File Server Distribution Across Clusters" filed Nov. 10, 2022.
[Published as US-20230325173-A1] U.S. Appl. No. 18/183,142 titled "Virtualized File Server User Views" filed Mar. 13, 2023.
[Published as US-2024-0103985-A1] U.S. Appl. No. 18/450,319 titled "Disaster Recovery for Distributed File Servers, Including Metadata Fixers" filed Aug. 15, 2023.
[Published US-2022-0147342-A1] U.S. Appl. No. 17/585,403 titled "Virtualized File Server Smart Data Ingestion" filed Jan. 27, 2022, pp. all pages of the application as filed.
U.S. Appl. No. 18/306,595 titled Self-Healing Virtualized File Server filed Apr. 25, 2023.
U.S. Appl. No. 18/468,558 titled "File Server Managers Including API-Level Permissions Examination" filed Sep. 15, 2023.
U.S. Appl. No. 18/497,919 titled "Virtualized Server Systems and Methods Including Scaling of File System Virtual Machines" filed Oct. 30, 2023.
U.S. Appl. No. 18/607,168 titled "Virtualized File Server" filed Mar. 15, 2024.

(56) References Cited

OTHER PUBLICATIONS

U.S. Appl. No. 18/393,105 titled "Virtualized File Server Smart Data Ingestion" filed Dec. 21, 2023.
Isilon OneFS, Version 8.0.1; Web Administration Guide, Oct. 2016.
[Published as US 20170235760 A1 on Aug. 17, 2017] U.S. Appl. No. 15/422,220, entitled "Virtualized File Server" filed Feb. 1, 2017, pp. all.
[Published as US 2018/0157521 on Jun. 7, 2018] U.S. Appl. No. 15/829,781, entitled "Virtualized Server Systems and Methods Including Load Balancing for Virtualized File Servers", filed Dec. 1, 2017, pp. all.
[Published as US 2018/0157522 on Jun. 7, 2018] U.S. Appl. No. 15/833,391, entitled "Virtualized Server Systems and Methods Including Scaling of File System Virtual Machines", filed Dec. 6, 2017, pp. all.
[Published as US 2018/0157561 on Jun. 7, 2018] U.S. Appl. No. 15/832,310 entitled "Disaster Recovery for Distributed File Servers, Including Metadata Fixers", filed Dec. 5, 2017, pp. all.
[Published as US 2018/0157677 on Jun. 7, 2018] U.S. Appl. No. 15/833,255, entitled "Cloning Virtualized File Servers", filed Dec. 6, 2017, pp. all.
[Published as US 20180159729 A1 on Jun. 7, 2018] U.S. Appl. No. 15/829,340, entitled "Configuring Network Segmentation for a Virtualization Environment", filed Dec. 1, 2017, pp. all.
[Published as US 2019/0026101 on Jan. 27, 2019] U.S. Appl. No. 16/140,250 titled "Virtualized File Server Data Sharing" filed Sep. 24, 2018, pp. all.
[Published as US 2019/0079747 on Mar. 14, 2019] U.S. Appl. No. 16/160,618 titled "Virtualized File Server Backup to Cloud" filed Oct. 15, 2018, pp. all.
[Published as US US 2018/0157752 on Jun. 7, 2018] U.S. Appl. No. 15/829,731, entitled "Transparent Referrals for Distributed File Servers", filed Dec. 1, 2017, pp. all.
[Published as US-2022-0300335-A1] U.S. Appl. No. 17/443,009, titled "Scope-Based Distributed Lock Infrastructure for Virtualized File Server" filed Jul. 19, 2021, pp. all.
Dell EMC; Dell EMC Isilon OneFS Operating System; Scale-out NAS to maximize the data capital and business value of your unstructured data, 2020, pp. all.
Dell EMC; White Paper; Dell EMC Isilon OneFS Operating System; Powering the Isilon Scale-Out Storage Platform, Dec. 2019, pp. all.
""Eam-snapshot" snapshot on Service VMs (2150695)", VMWare Customer Connect; retrieved from: https://kb.vmware.com/s/article/2150695, Jan. 17, 2018.
"3.2.4.1Data Integrity (Software Checksum)", VMWare; retrieved from: https://download3.vmware.com/vcat/vmw-vcloud-architecture-toolkit-spv1-webworks/index.html#page/Storage%20and%20Availability/Architecting%20VMware%20vSAN%206.2/Architecting%20Virtual%20SAN%206.2.2 023.html, Jun. 2018.
"Access control list (ACL)", TechTarget; Definition; retrieved from: https://www.techtarget.com/searchnetworking/definition/access-control-list-ACL, Dec. 2022.
"Active Directory file permissions management", https://www.manageengine.com/products/ad-manager/active-directory-file-permissions-management.html, Retrieved Aug. 11, 2023, pp. 1-2.
"Create a vSAN File Share in vSAN File Service—VMware vSAN 7.0", VMware Arena; https://www.vmwarearena.com/create-a-vsan-file-share/, May 8, 2020.
"Creating and Managing Protection Groups", VMWare Docs; retrieved from: https://docs.vmware.com/en/Site-Recovery-Manager/8.5/com.vmware.srm.admin.doc/GUID-294475D7-B136-4492-8F8E-522B8EDA26EA.html, Mar. 31, 2020.
"Creating and Using Content Library", VMware vSphere Blog; retrieved from: https://blogs.vmware.com/vsphere/2020/01/creating-and-using-content-library.html, Jan. 22, 2020.
"Creating ReadWriteMany Persistent Volumes in vSphere with Tanzu", VMware Docs; https://docs.vmware.com/en/VMware-vSphere/7.0/vmware-vsphere-with-tanzu/GUID-82AC812A-40E3-4563-9329-747634E1AB6E.html, Jan. 6, 2023.

"Data Object—VsanFileServiceDomainConfig(vim.vsan.FileServiceDomainConfig)", VMWare; retrieved from: https://vdc-download.vmware.com/vmwb-repository/dcr-public/90ec343b-df7c-493e-9979-36ea55765102/8753fd1e-fcab-4bd4-9cde-a364851f31a6/vim.vsan.FileServiceDomainConfig.html, Mar. 15, 2021.
"Data Object—VsanFileServiceIpConfig(vim.vsan.FileServiceIpConfig)", retrieved from: https://vdc-download.vmware.com/vmwb-repository/dcr-public/90ec343b-df7c-493e-9979-36ea55765102/8753fd1e-fcab-4bd4-9cde-a364851f31a6/vim.vsan.FileServiceIpConfig.html, Mar. 15, 2021.
"Data Placement Optimizations in vSAN 6.7", VMWare Virtual Blocks Blog; retrieved from https://blogs.vmware.com/virtualblocks/2018/07/09/data-placement-optimizations-in-vsan-6-7/, Jul. 9, 2018.
"Data Protection and Backup Architecture", VMWare Docs; retrieved from: https://docs.vmware.com/en/VMware-Validated-Design/5.1/sddc-architecture-and-design/GUID-69105DDF-AC6D-4787-8E2E-6D887AFDDB9A.html, Jul. 30, 2019.
"Data Protection for VMware vSAN", VMwareStorage; retrieved from https://core.vmware.com/resource/data-protection-vmware-vsan, Aug. 2020.
"Define an ACL Rule for a Resource Class Action", VMWare; retrieved from: https://vdc-download.vmware.com/vmwb-repository/dcr-public/6ac8164c-8844-4188-ac1b-cd59721c06b8/7d36e490-310e-4485-91cc-c3abb23b0d32/GUID-8B3EADBC-352A-4450-923B-FB3BF65192D1.html, retrieved Jan. 24, 2023.
"Deploy a Virtual Machine from an OVF or OVA File in the VMware Host Client", VMWare Docs; retrieved from: https://docs.vmware.com/en/VMware-vSphere/7.0/com.vmware.vsphere.hostclient.doc/GUID-8ABDB2E1-DDBF-40E3-8ED6-DC857783E3E3.html, Oct. 22, 2021.
"Deploy an OVF or OVA Template", VMWare Docs; retrieved from: https://docs.vmware.com/en/VMware-vSphere/7.0/com.vmware.vsphere.vm_admin.doc/GUID-17BEDA21-43F6-41F4-8FB2-E01D275FE9B4.html, Jul. 29, 2022.
"Designing and Sizing Virtual SAN Fault Domains", VMware Docs; https://docs.vmware.com/en/VMware-vSphere/6.5/com.vmware.vsphere.virtualsan.doc/GUID-FE7DBC6F-C204-4137-827F-7E04FE88D968.html, May 31, 2019.
"Designing and Sizing Virtual SAN Fault Domains", Administering VMware Virtual SAN; VMware vSphere 6.5; vSAN 6.6; https://docs.vmware.com/en/VMware-vSphere/6.5/virtual-san-66-administration-guide.pdf, captured Aug. 20, 2021, 2017, p. 34.
"Distributed File System (DFS) Functions", https://learn.microsoft.com/en-us/windows/win32/dfs/distributed-file-system-dfs-functions, Jan. 7, 2021, pp. 1.
"Distributed File Systems: What Is DFS?", Nutanix; retrieved from: https://www.nutanix.com/info/distributed-file-systems, 2022.
"EMC Isilon OneFS Operating System; Powering scale-out storage for the new world of Big Data in the enterprise", www.EMC.com, Feb. 2020, pp. all.
"Enable vSAN File Service", VMWare Docs; retrieved from: https://docs.vmware.com/en/VMware-vSphere/8.0/vsan-administration/GUID-D288E157-17F4-4428-AB21-21FAE0FE29CB.html, Aug. 11, 2022.
"Enable vSan File Service", VMware Docs; retrieved from: https://docs.vmware.com/en/VMware-vSphere/8.0/vsan-administration/GUID-D288E157-17F4-4428-AB21-21FAEOFE29CB.html, Aug. 22, 2023.
"Enabling or disabling SMB automatic node referrals", NetApp https://docs.netapp.com/ontap-9/index.jsp?topic=%2Fcom.netapp.doc.cdot-famg-cifs%2FGUID-AC7E8515-3A4C-4BB5-A8C8-38B565C952E0.html, Sep. 19, 2019, pp. all.
"ESXi System Storage Overview", VMWare Docs; https://docs.vmware.com/en/VMware-vSphere/7.0/com.vmware.esxi.install.doc/GUID-474D003B-C6FB-465D-BC1B-5FD30F8E2209.html, Nov. 23, 2022.
"ESXi System Storage Overview", VMware Docs; https://docs.vmware.com/en/VMware-vSphere/7.0/com.vmware.esxi.upgrade.doc/GUID-474D003B-C6FB-465D-BC1B-5FD30F8E2209.html, Feb. 27, 2023.

(56) References Cited

OTHER PUBLICATIONS

"Export an OVF Template", VMWare Docs; retrieved from: https://docs.vmware.com/en/VMware-vSphere/7.0/com.vmware.vsphere.vm_admin.doc/GUID-B05A4E9F-DD21-4397-95A1-00125AFDA9C8.html, Feb. 10, 2021.

"File and Storage Services Overview", https://learn.microsoft.com/en-us/previous-versions/windows/it-pro/windows-server-2012-r2-and-2012/hh831487(v=ws.11), Dec. 29, 2016, pp. 1-6.

"File Permission Management using ADManager Plus in Active Directory Environments", https://www.manageengine.com/products/ad-manager/usecases/business-enterprise-file-permission-management.html, Retrieved Aug. 11, 2023, pp. 1.

"File server management", https://www.manageengine.com/products/ad-manager/help/user_management/file-server-management/active-directory-file-server-management.html, Retrieved Aug. 11, 2023, pp. 1.

"File Server Permission Management Plugin tenfold", https://www.tenfold-security.com/en/fileserver-access-rights, Retrieved Aug. 9, 2023, pp. 1-8.

"File service is comparatively overloaded on this host. What to do?", Spiceworks; retrieved from https://community.spiceworks.com/topic/2327167-file-service-is-comparatively-overloaded-on-this-host-what-to-do, Aug. 2, 2021.

"File system ACL", IBM; retrieved from: https://www.ibm.com/docs/en/spectrum-scale/4.2.2?topic=STXKQY_4.2.2/com.ibm.spectrum.scale.v4r22.doc/bl1hlp_accessfilesystemacl.html, Mar. 2, 2021.

"Guaranteeing throughput with QoS", NetApp https://docs.netapp.com/ontap-9/index.jsp?topic=%2Fcom.netapp.doc.pow-perf-mon%2FGUID-77DF9BAF-4ED7-43F6-AECE-95DFB0680D2F.html, Sep. 19, 2019, pp. all.

"High Availability and Data Protection With Dell Emc Isilon Scale-Out NAS", Dell: Dell Inc., Jul. 2018, pp. all.

"How it Works", https://docs.informatica.com/data-integration/b2b-data-exchange/10-2-1/user-guide/services-overview/managed-file-transfer-gateway/how-it-works.html, 2023, pp. 1.

"How to Troubleshoot the 'Autolocation' feature in Clustered Data ONTAP—Results", NetApp https://kb.netapp.com/app/results/kw/autolocation/, Sep. 19, 2019, pp. all.

"How to View and Close Open Files in Windows Server SMB Share?", WindowsOS Hub; retrieved from: https://web.archive.org/web/20221020230615/https://woshub.com/managing-open-files-windows-server-share/, Aug. 13, 2020.

"Hybrid Cloud Storage with Cloudian HyperStore and Amazon S3", Cloudian Inc.; www.cloudian.com, 2014, pp. all.

"Improving client response time by providing SMB automatic node referrals with Auto Location", NetApp https://library.netapp.com/ecmdocs/ECMP1196891/html/GUID-0A5772A4-A6D7-4A00-AC2A-92B868C5B3B5.html, Sep. 19, 2019, pp. all.

"Local Storage", VMware Docs; https://docs.vmware.com/en/VMware-vSphere/7.0/com.vmware.vsphere.storage.doc/GUID-5F08F7A7-6D8E-45A6-B408-278B3A4C7D4C.html, May 31, 2019.

"Manage SMB File Share", VMware Docs; https://docs.vmware.com/en/VMware-vSphere/8.0/vsan-administration/GUID-10BCE603-6C73-4D8C-ABEF-7EF4BB210ABF.html, Aug. 24, 2022.

"Manage storage using REST APIs", https://thinksystem.lenovofiles.com/storage/help/topic/um-9.11_api-automation/api-automation.pdf, Retrieved Jun. 15, 2023, pp. 1-92.

"Managed File Transfer Gateway", https://docs.informatica.com/data-integration/b2b-data-exchange/10-2-1/user-guide/services-overview/managed-file-transfer-gateway.html, 2023, pp. 1.

"Managing Content Library Subscriptions", VMware vSphere Blog; retrieved from: https://blogs.vmware.com/vsphere/2020/02/managing-content-library-subscriptions.html, Feb. 4, 2020.

"Managing Fault Domains in vSAN Clusters", VMware Docs; https://docs.vmware.com/en/VMware-vSphere/7.0/com.vmware.vsphere.vsan.doc/GUID-8491C4B0-6F94-4023-8C7A-FD7B40D0368D.html, Aug. 27, 2021.

"Managing File Servers", https://www.manageengine.com/products/ad-manager/help/user_management/file-server-management/active-directory-manage-file-servers.html, Retrieved Aug. 11, 2023, pp. 1-2.

"Managing Permissions in the VMware Host Client", VMWare Docs; retrieved from: https://docs.vmware.com/en/VMware-vSphere/7.0/com.vmware.vsphere.hostclient.doc/GUID-8F7CEFFA-B91A-4DE8-94A4-5A9257A04539.html, May 31, 2019.

"Managing vSAN File Service", VMware; Retrieved from: https://vdc-repo.vmware.com/vmwb-repository/dcr-public/17672097-a5cb-4bf6-939a-0c978d2533bd/4e563514-0b9b-4720-9df1-280f1c183fbe/GUID-DA2CDA86-4EA8-484B-8378-B424F8DD36AB.html, retrieved Jan. 9, 2024.

"Managing Workloads", NetApp https://docs.netapp.com/ontap-9/index.jsp?topic=%2Fcom.netapp.doc.pow-perf-mon%2FGUID-13D35FC5-AF37-4BBD-8A8E-B10B41451A16.html, Sep. 19, 2019, pp. all.

"Managing Your Data on vSAN with SPBM", VMware Blog; https://blogs.vmware.com/virtualblocks/2018/11/30/managing-your-data-on-vsan-with-spbm/, Nov. 30, 2018.

"NAS & File Server Consolidation", https://www.nasuni.com/nas-file-server-silo-consolidation/, Retrieved Jun. 15, 2023, pp. 1-3.

"NAS Backup Support", Veeam Help center; retrieved from: https://helpcenter.veeam.com/archive/backup/100/vsphere/file_share_support.html#file_proxy, Jul. 9, 2021.

"Nasuni File Data Platform", https://info.nasuni.com/hubfs/Nasuni.com-assets/Data-Sheets/Nasuni-Corp-Data-Sheet-Nasuni-Solution-Overview.pdf, Retrieved Jun. 15, 2023, pp. 1-3.

"Network File System (NFS) Version 4 Minor Version 1 Protocol", Internet Engineering Task Force (IETF); retrieved from: https://datatracker.ietf.org/doc/rfc8881/, Aug. 2020.

"New VMware Icons Visio Stencil Download", VM Today; obtained from: https://web.archive.org/web/20230130190532/https://vmtoday.com/2012/09/new-vmware-icons-visio-stencil-download/, Sep. 16, 2012.

"Nutanix AFS—Introduction & Steps For Setting Up", Retrieved from https://virtualbuildingblocks.com/2018/01/03/nutanix-afs-introduction-steps-for-setting-up/ (Year: 2018), Jan. 3, 2018, 1-23.

"Nutanix Files Guide", Nutanix, Sep. 14, 2018, pp. all.

"On-Demand, Pay-As-You-Go Disaster Recovery with VMware Cloud on AWS", Dell Technologies; retrieved from: https://www.delltechnologies.com/en-rs/collaterals/unauth/briefs-handouts/solutions/h18138-cloud-dr-with-vmware-cloud-on-aws.pdf, 2022.

"Open Virtualization Format White Paper", DMTF Informational, Version 2.0.0; Distributed Management Task Force, Inc. (DMTF); obtained from https://www.dmtf.org/sites/default/files/standards/documents/DSP2017_2.0.0.pdf, Apr. 14, 2014.

"Overview of the vSphere Auto Deploy Process by Using the vSphere Client", VMWare Docs; retrieved from: https://docs.vmware.com/en/VMware-vSphere/7.0/com.vmware.esxi.install.doc/GUID-33565F1C-5132-4953-8957-8982E87D86D7.html, Feb. 11, 2020.

- "OVF and OVA File Formats and Templates", VMWare Docs; retrieved from: https://docs.vmware.com/en/VMware-vSphere/7.0/com.vmware.vsphere.vm_admin.doc/GUID-AE61948B-C2EE-436E-BAFB-3C7209088552.html, Aug. 3, 2022.

"Path Failover and Virtual Machines", vSphere Storage; Update 2; VMware vSphere 7.0; VMware ESXi 7.0; vCenter Server 7.0; https://docs.vmware.com/en/VMware-vSphere/7.0/vsphere-esxi-vcenter-server-702-storage-guide.pdf, Jun. 25, 2021, pp. 238.

"Place a Member of vSAN Cluster in Maintenance Mode", retrieved from: https://docs.vmware.com/en/VMware-vSphere/6.7/com.vmware.vsphere.virtualsan.doc/GUID-521EA4BC-E411-47D4-899A-5E0264469866.html, Nov. 8, 2021.

"POSIX™ 1003.1 Frequently Asked Questions (FAQ Version 1.18)", retrieved from: https://www.opengroup.org/austin/papers/posix_faq.html, Jun. 13, 2020.

"Preparing Storage Systems for Snapmirror Replication", NetApp ; NetApp, Apr. 2005, pp. all.

"Product : VMware, vSAN [SDS]/7.0 U1, Enterprise", WhatMatrix.com; retrieved from: https://www.whatmatrix.com/virtual-details-popup/SDS-and-HCI/VMware/vSAN-SDS-/70U1/Enterprise/DataServices/FileServices/FileserverType, retrieved Nov. 1, 2023.

(56) References Cited

OTHER PUBLICATIONS

"Protect Your Data With NetApp Element Software", Solution Brief; NetApp, 2018, pp. all.
"Rebalance file servers manually in vSAN 7.0", VMware Customer Connect; retrieved from: https://kb.vmware.com/s/article/80481, Oct. 6, 2020.
"Rebalance Workload on vSAN File Service Hosts", VMWare Docs; retrieved from: https://docs.vmware.com/en/VMware-vSphere/7.0/com.vmware,vsphere.vsan.doc/GUID-6D9184A4-23BB-411B-983B-D2A9BC6A33E6.html, Jul. 21, 2020.
"Tech TopX: AHV One Click Upgrade", Screen captures from YouTube video clip, 13 pages, uploaded on Dec. 8, 2015 by user "Nutanix University". Retrieved from Internet: https://www.youtube.com/watch?v=3dALdzw6qZM, Dec. 8, 2015, pp. all.
"Technical Overview and Best Practices", VMware vSphere VMFS ; a VMware Technical White Paper updated for VMware vSphere 5.1, Version 3.0, Nov. 27, 2012, pp. all.
"The Architecture of VMware ESXi", VMWare White Paper; retrieved from: https://www.vmware.com/content/dam/digitalmarketing/vmware/en/pdf/techpaper/ESXi_architecture.pdf, Oct. 24, 2008.
"The Complete Guide to VMware Administration—VMware vSAN", retrieved from: https://www.cloudbolt.io/vmware-administration/vmware-vsan/, retrieved Aug. 11, 2023.
"The Evolution of Content Library", VMware vSphere Blog; retrieved from: https://blogs.vmware.com/vsphere/2019/12/the-evolution-of-content-library.html, Dec. 3, 2019.
"The Open Virtual Machine Format Whitepaper for OVF Specification", VMWare; retrieved from https://www.vmware.com/pdf/ovf_whitepaper_specification.pdf, Sep. 9, 2007.
"Top-3 New Features in vSAN 7: #2—vSAN File Services", VMware Virtual Blocks Blog; retrieved from https://blogs.vmware.com/virtualblocks/2020/03/25/part-2-top-new-features-vsan-7-vsan-file-services/, Mar. 25, 2020.
"Understanding Clones in VMware vSphere 7", Performance Study; VMWare; retrieved from: https://www.vmware.com/content/dam/digitalmarketing/vmware/en/pdf/techpaper/performance/cloning-vSphere7-perf.pdf, May 27, 2021.
"Understanding Multipathing and Failover", vSphere Storage; VMware vSphere 7.0; VMware ESXi 7.0; vCenter Server 7.0 https://docs.vmware.com/en/VMware-vSphere/7.0/vsphere-esxi-vcenter-server-702-storage-guide.pdf, Jun. 25, 2021, pp. 234-268.
"Upgrade File Service", VMWare Docs; obtained from https://docs.vmware.com/en/VMware-vSphere/7.0/com.vmware.vsphere.vsan.doc/GUID-184C4D32-216E-4504-A873-5CCC627C115E.html, Feb. 2, 2021.
"User Guide for VMware and vSphere: Veeam Backup & Replication", Veeam Help Center; Step 5. Finish Working with the Wizard; retrieved: https://helpcenter.veeam.com/docs/backup/vsphere/restore_entire_file_share_summary.html?ver=120, Mar. 6, 2023.
"User Guide for VMware vSphere: Veeam Backup & Replication—", Veeam Help Center; Step 1. Launch Instant File Share Recovery Wizard; retrieved: https://helpcenter.veeam.com/docs/backup/vsphere/instant_nas_recovery_launch.html?ver=120, Mar. 6, 2023.
"User Lifecycle Management", https://www.tenfold-security.com/en/user-lifecycle-management/, Retrieved Aug. 9, 2023, pp. 1-10.
"User permissions and permission levels in SharePoint Server", https://learn.microsoft.com/en-us/sharepoint/sites/user-permissions-and-permission-levels, Jan. 20, 2023, pp. 1-9.
"Using Content Libraries", VMWare Docs; retrieved from: https://web.archive.org/web/20230206073442/https://docs.vmware.com/en/VMware-vSphere/8.0/vsphere-vm-administration/GUID-254B2CE8-20A8-43F0-90E8-3F6776C2C896.html, Aug. 23, 2021.
"Using IAM to control file system data access", https://docs.aws.amazon.com/efs/latest/ug/iam-access-control-nfs-efs.html, Retrieved Aug. 10, 2023, pp. 1-3.
"Using Linked Clones", VMWare Docs; retrieved: https://docs.vmware.com/en/VMware-Fusion/13/com.vmware.fusion.using.doc/GUID-96D07E71-FF5D-4E82-A5BD-0B15586432E4.html, May 31, 2019.
"Using vSAN File Service to Provision File Volumes", VMware Docs; https://docs.vmware.com/en/VMware-vSphere/8.0/vsphere-storage/GUID-C3C722F2-02E0-45BB-B005-E3A8AB03FFA7.html, Nov. 16, 2022.
"View vSAN Datastore", VMware Docs; retrieved from: https://docs.vmware.com/en/VMware-vSphere/7.0/com.vmware.vsphere.vsan-planning.doc/GUID-66BFA39F-C3D8-4DE0-806F-58A756E77399.html, Jul. 21, 2022.
"Virtual Disk Manager User's Guide: Virtual Disk Development Kit", vmware.com; https://www.vmware.com/pdf/VirtualDiskManager.pdf, 2008, 1-12.
"Virtual Machine Backup Guide", ESX Server 3.0 and VirtualCenter 2.0; VMware; https://www.vmware.com/pdf/vi3_30_20_vm_backup.pdf, 2006.
"Virtual Machine Files", VMware Docs; https://docs.vmware.com/en/VMware-vSphere/7.0/com.vmware.vsphere.vm_admin.doc/GUID-CEFF6D89-8C19-4143-8C26-4B6D6734D2CB.html, Jul. 16, 2021.
"Virtual Volumes and Replication Groups", VMWare Docs; retrieved from: https://web.archive.org/web/20220324234540/https://docs.vmware.com/en/VMware-vSphere/7.0/com.vmware.vsphere.storage.doc/GUID-365225BE-A87B-46F0-9112-53D7B2ED5028.html, Sep. 26, 2019.
"VMWare Clones", MacStadium; retrieved: https://docs.macstadium.com/docs/linked-vs-instant-clones, Jun. 2020.
"VMWare High Availability & Data Recovery Configuration Guide v1", IBM; https://www.IBM.com/support/pages/vmware-high-availability-data-recovery-configuration-guide-v1, Nov. 2015.
"VMware Horizon on VMware vSAN Best Practices—Technical White Paper", VMWare; retrieved from: https://www.vmware.com/content/dam/digitalmarketing/vmware/en/pdf/products/vsan/vmware-horizon-7-on-vmware-vsan-best-practices.pdf, Dec. 2020.
"VMware Snapshots CoW or ROW?", Reddit.com; retrieved from: https://www.reddit.com/r/sysadmin/comments/latbt3/vmware_snapshots_cow_or_row/, Feb. 2, 2021.
"VMware vCenter Server: Centrally Mananged Virtual Infrastructure Delivered with Confidence", VMWare Datasheet; https://www.vmware.com/content/dam/digitalmarketing/vmware/en/pdf/products/vCenter/vmware-vcenter-server-datasheet.pdf, captured Aug. 20, 2021, 2015, 2015, pp. 1-2.
"VMware vSAN", SapientCode Blog; retrieved from: https://www.sapientcode.com/blog/VMware/vSphere/vSAN, Mar. 30, 2023.
"VMware VSAN 7.0 Release Notes", VMware; https://docs.vmware.com/en/VMware-vSphere/7.0/rn/vmware-vsan-70-release-notes.html, Mar. 8, 2021, pp. 1-12.
"VMware vSAN Beta Native Data Protection Feature with NextGen Snapshots", https://www.virtualizationhowto.com/2018/11/vmware-vsan-beta-native-data-protection-feature-with-nextgen-snapshots/, Nov. 7, 2018.
"VMware vSAN Design Guide", VMware—The Cloud Platform Tech Zone; retrieved from: https://web.archive.org/web/20230130182939/https://core.vmware.com/resource/vmware-vsan-design-guide, retrieved Jan. 31, 2023.
"VMware vSAN Documentation", VMWare Docs; retrieved from: https://docs.vmware.com/en/VMware-vSAN/index.html, Mar. 1, 2023.
"VMware vSAN file service introduces NFS, SMB file shares", Tech Target; https://www.techtarget.com/searchvmware/tip/VMware-vSAN-file-service-introduces-NFS-SMB-file-shares, Aug. 23, 2021.
"VMware vSAN file services", Techgaga; retrieved from: https://www.techgaga.net/post/vmware-vsan-file-services, Aug. 14, 2021.
"VMware vSAN Technology Overview", VMwareStorage, VMware, retrieved from https://core.vmware.com/resource/vmware-vsan-technology-overview, Sep. 2020.
"VMware vSAN™ Features—Proof of Concept (PoC) Guide", Technical White Paper; retrieved from: https://core.vmware.com/resource/vsan-proof-concept-vsan-features#introduction, Feb. 2024.
"VMware vSphere: Handy tips on working with Content Libraries", StarWind blog; retrieved from: https://www.starwindsoftware.com/blog/working-with-content-libraries-in-vsphere-6-5, Jul. 18, 2018.
"VSAN—encryption, checksum and data reduction features in I/O flow", retrieved from: https://web.archive.org/web/20230202181958/https://vconfig.pl/2022/11/09/vsan-encryption-checksum-and-data-reduction-features-in-i-o-flow/, Nov. 9, 2022.

(56) References Cited

OTHER PUBLICATIONS

"VSAN—File Services", Cloud Architecture blog, retrieved from: https://agmalanco.com/2021/05/07/vsan-file-services/; English Translation, May 7, 2021.
"VSAN—internal components and mechanisms", vconfig blog; https://vconfig.pl/2022/10/30/vsan-internal-components-and-mechanisms/, Oct. 30, 2022.
"VSAN File Service", retrieved from https://docs.vmware.com/en/VMware-vSphere/8.0/vsan-administration/GUID-82565B82-C911-42F7-85B1-E9EF973EE90C.html, Jul. 10, 2023.
"VSan File Service", VMware Docs; https://web.archive.org/web/20221016062406/https://docs.vmware.com/en/VMware-vSphere/8.0/vsan-administration/GUID-82565B82-C911-42F7-85B1-E9EF973EE90C.html, Aug. 15, 2022.
"VSAN File Service", WMware Docs; https://docs.vmware.com/en/VMware-vSphere/8.0/vsan-administration/GUID-82565B82-C911-42F7-85B1-E9EF973EE90C.html, Dec. 1, 2022.
"VSan File Service", VMware Docs; https://docs.vmware.com/en/VMware-vSphere/7.0/com.vmware.vsphere.vsan.doc/GUID-82565B82-C911-42F7-85B1-E9EF973EE90C.html, Dec. 5, 2022.
"VSAN File Services", VMwareStorage; https://core.vmware.com/resource/vsan-file-services, May 2020.
"VSAN File Services and the different communication layers", Yellowbricks.com blog; retrieved from: https://www.yellow-bricks.com/2020/04/21/vsan-file-services-communication-layers/, Apr. 21, 2020.
"VSAN File Services considerations", Yellow-Brick.com blog; retrieved from: https://www.yellow-bricks.com/2020/04/15/vsan-file-services-considerations, Apr. 15, 2020.
"VSAN File Services Tech Note", VMware; https://cdn-prod.scdn6.secure.raxcdn.com/static/media/8e656fe9-d4d2-4974-91df-2accc2abb7fd.pdf, May 26, 2020.
"VSAN File Services Tech Note | VMware", Aug. 2021, 1-7.
"VSAN File Services with vCloud Director", Tom Fojta's Blog; https://fojta.wordpress.com/2020/04/06/vsan-file-services-with-vcloud-director/, Apr. 6, 2020.
"VSAN File Services: Seeing an imbalance between protocol stack containers and FS VMs", https://www.yellow-bricks.com/2020/04/22/vsan-file-services-seeing-an-imbalance-between-protocol-stack-containers-and-fs-vms/, Apr. 22, 2020.
"VSAN File Share with vSAN File Service Configuration and Setup", https://www.virtualizationhowto.com/2022/04/vsan-file-share-with-vsan-file-service-configuration-and-setup/, Apr. 5, 2022.
"VSAN Frequently Asked Questions—vSan File Services", Obtained from: https://web.archive.org/web/20230610015509/https://core.vmware.com/resource/vsan-frequently-asked-questions-faq#section7, Jun. 10, 2023.
"VSAN Frequently Asked Questions (FAQ)", VMware—The Cloud Platform Tech Zone; https://core.vmware.com/resource/vsan-frequently-asked-questions-faq, Retrieved Apr. 4, 2023.
"VSAN Frequently Asked Questions (FAQ)—vSAN File Services", VMware—The Cloud Platform Tech Zone; https://core.vmware.com/resource/vsan-frequently-asked-questions-faq#section7, retrieved Aug. 11, 2023.
"VSAN Health Service—Cluster Health—vSAN Health service installation (2109874)", https://kb.vmware.com/s/article/2109874, Jun. 3, 2021.
"VSan Specialist: Stretched Clusters & Two-Node Clusters—Part 1", vCallaway; http://vcallaway.com/vsan-specialist-stretched-clusters-two-node-clusters/, Sep. 26, 2021.
"VSAN Stretched Cluster Guide", VMware The Cloud Platform Tech Zone; retrieved from: https://core.vmware.com/resource/vsan-stretched-cluster-guide, Dec. 2023.
"VSAN Stretched Cluster Guide", VMwareStorage; https://core.vmware.com/resource/vsan-stretched-cluster-guide, Mar. 2023, 1-202.
"VSan Stretched Cluster Guide", VMwareStorage; https://images.core.vmware.com/sites/default/files/resource/vsan_stretched_cluster_guide_noindex.pdf, printed Jun. 24, 2021, Jun. 2020, pp. 1-62.

"VSAN: What is VMWare VSAN?", Code Notary Blog; obtained at: https://web.archive.org/web/20210919083830/https://codenotary.com/blog/vsan-what-is-vmware-vsan/, Sep. 2021.
"VsanFileServiceDomain Structure", Retrieved from:, https://developer.vmware.com/docs/powercli/latest/vmware.vimautomation.storage/structures/vmware.vimautomation.storage.types.v1.vsan.fileservice.vsanfileservicedomain/, Retrieved Nov. 16, 2023.
"VsanFileShare Structure", retrieved from: https://developer.vmware.com/docs/powercli/latest/vmware.vimautomation.storage/structures/vmware.vimautomation.storage.types.v1.vsan.fileservice.vsanfileshare/, Retrieved Nov. 16, 2023.
"VsanFileShareSnapshot Structure", retrieved from: https://developer.vmware.com/docs/powercli/latest/vmware.vimautomation.storage/structures/vmware.vimautomation.storage.types.v1.vsan.fileservice.vsanfilesharesnapshot/, Retrieved Nov. 16, 2023.
"VSphere 7 Content libraries—Part 1: Concept and creating a library?", Virtual Maestro blog; https://blogs.virtualmaestro.in/2020/04/29/vsphere-7-content-libraries-part-1-how-do-they-work, Apr. 2020.
"VSphere Storage—VMware vSphere 6.7", https://docs.vmware.com/, Jan. 4, 2021, 1-382.
"VSphere Virtual Machine Administration", VMWare; update 3; VMware vSphere 7.0, VMware ESXi 7.0, vCenter Server 7.0; retrieved from: https://docs.vmware.com/en/VMware-vSphere/7.0/vsphere-esxi-vcenter-server-703-virtual-machine-admin-guide.pdf, Jul. 4, 2022.
"Welcome to ADManager Plus", https://www.manageengine.com/products/ad-manager/help/introduction/introduction.html, Retrieved Aug. 11, 2023, pp. 1-2.
"What is Amazon S3 File Gateway", https://docs.aws.amazon.com/filegateway/latest/files3/what-is-file-s3.html, Retrieved Aug. 10, 2023, pp. 1-2.
"What Is Snapshot? How does It Work? What Are the Type of It?", MiniTool; retrieved from: https://www.minitool.com/lib/what-is-snapshot.html, Feb. 25, 2022.
"What is vSan", VMWare Docs; retrieved from: https://docs.vmware.com/en/VMware-vSphere/8.0/vsan-administration/GUID-18F531E9-FF08-49F5-9879-8E46583D4C70.html, Feb. 8, 2023.
"Workload Tenancy", VMware Tanzu Developer Center; https://tanzu.vmware.com/developer/guides/workload-tenancy/, Retrieved Apr. 12, 2023.
"WSFC with Native Shared Disks on vSAN", Virtually Sensei; retrieved from: https://virtuallysensei.com/vsan-6-7-u3-native-shared-disks/, Dec. 8, 2019.
Bergamasco, Davide , "Content Library Performance Tuning", VMware VROOM! Performance Blog; received from: https://blogs.vmware.com/performance/2015/09/content-library-performance-tuning.html, Sep. 15, 2015.
Bergamasco, Davide , "How to Efficiently Synchronize, Import and Export Content in VMware vSphere Content Library", VMware VROOM! Performance Blog; retrieved from: https://blogs.vmware.com/performance/2015/09/efficiently-synchronize-import-export-content-vmware-vsphere-content-library.html, Sep. 3, 2015.
Bhardwaj, Rishi , "The Wonderful World of Distributed Systems and the Art of Metadata Management", Nutanix, Inc., https://www.nutanix.com/blog/the-wonderful-world-of-distributed-systems-and-metadata-management; captured Aug. 19, 2021, Sep. 24, 2015, pp. 1-8.
Birk, Ryan , "How it Works: Understanding vSAN Architecture Components", altaro.com, Feb. 28, 2018, 1-10.
Bounds, Jay , "High-Availability (HA) Pair Controller Configuration Overview and Best Practices", NetApp, Feb. 2016, pp. all.
Cano, Ignacio et al., "Curator: Self-Managing Storage for Enterprise Clusters", University of Washington, Mar. 2017, pp. all.
Cormac, , "Native File Services for vSAN 7", CormacHogan.com; https://cormachogan.com/2020/03/11/native-file-services-for-vsan-7/, Mar. 11, 2020, 1-23.
Cormac, , "vSAN File Service & Kubernetes PVs with an implicit quota", https://cormachogan.com/2021/07/08/vsan-file-service-kubernetes-pvs-with-an-implicit-quota/, Jun. 8, 2021.
Costa, Jorge , "High Availability Setup Using Veritas Cluster Server and NetApp Synchronous SnapMirror—One button Failover/Failback with SnapMirror Sync and Veritas Cluster Server", NetApp Community, Nov. 18, 2010, pp. all.

(56) References Cited

OTHER PUBLICATIONS

Fojta, Tomas , "vSAN File Services with vCloud Director—Tom Fojta's Blog", (wordpress.com) ("Fojta Blog"), Feb. 11, 2021, pp. 1-8.
Gillis, , "VMware ESXi", TechTarget; retrieved from: https://www.techtarget.com/searchvmware/definition/VMware-ESXi, 2022.
Hickey, Nigel , "Creating and Using Content Library", VMware—VMware vSphere Blog; retrieved from: https://blogs.vmware.com/vsphere/2020/01/creating-and-using-content-library.html, Jan. 22, 2020.
Hickey, Nigel , "The Evolution of Content Library", VMware VMware vSphere Blog; retrieved from: https://blogs.vmware.com/vsphere/2019/12/the-evolution-of-content-library.html, Dec. 3, 2019.
Hogan, Cormac , "New updates from Nutanix—NOS 3.0 and NX-3000", https://cormachogan.com/2012/12/20/new-from-nutanix-nos-3-0-nx-3000/, Dec. 20, 2012, pp. 1-7.
Jeffrey, Hemmes et al., "Cacheable Decentralized Groups for Grid Resource Access Control", 2006 7th IEEE/ACM International Conference on Grid Computing Department of Computer Science and Engineering, University of Notre Dame, doi: 10.1109/ICGRID.2006.311015, Sep. 2006, pp. 192-199.
Jung, Young-Woo et al., "Standard-Based Vitrual Infrastructure Resource Management for Distributed and Heterogeneous Servers", ICACT, Feb. 15, 2009, pp. all.
Kaam, Bas V. , "New in AOS 5.0: Nutanix Acropolis File Services", basvankaam.com, Jan. 5, 2017, pp. all.
Kemp, Erik , "NetApp SolidFire SnapMirror Architecture and Configuration", Technical Report, NetApp, Dec. 2017, pp. all.
Kleyman, Bill , "How Cloud Computing Changes Storage Tiering", https://www.datacenterknowledge.com ; captured Jun. 4, 2019, Nov. 12, 2015, pp. all.
Koehler, , "Options in scalability with vSAN", VMWare; Virtual Blocks Blog; retrieved from: https://blogs.vmware.com/virtualblocks/2016/09/15/options-scalability-virtual-san/, Sep. 15, 2016.
Koehler, , "vSAN Objects and Components Revisited", VMWare; The Cloud Platform Tech Zone; retrieved from: https://core.vmware.com/blog/vsan-objects-and-components-revisited, Jun. 30, 2022.
Lee, Brandon , "VMware vSAN Beta Native Data Protection Feature with NextGen Snapshots", retrieved from: https://www.virtualizationhowto.com/2018/11/vmware-vsan-beta-native-data-protection-feature-with-nextgen-snapshots/, updated Jan. 11, 2021.
Lee, Brandon , "vSAN File Share with vSAN File Service Configuration and Setup", retrieved from: https://www.virtualizationhowto.com/2022/04/vsan-file-share-with-vsan-file-service-configuration-and-setup/, updated Apr. 17, 2024.
Leibovici, Andre , "Nutanix One-Click Upgrade now takes care of Firmware and Hypervisor too!", myvirtualcloud.net https://myvirtualcloud.net/nutanix-one-click-upgrade-now-takes-care-of-firmware-and-hypervisor-too/, Jul. 31, 2014, pp. 1-4.
Lüke, , "Interaction Between the User and Kernel Space in Linux", retrieved from: https://pothos.github.io/papers/linux_userspace_kernel_interaction.pdf, 2018.
Lye, Ben , "Implementing Windows Server 2008 FileSystem Quotas", Nov. 19, 2009, pp. 1-17.
Oberacher, Peter , "vSAN: A Glance Behind the Curtain", VMware by Broadcom Livefire Solutions; retrieved from: https://www.livefire.solutions/vsan/vsan-a-glance-behind-the-curtain/, Aug. 6, 2019.
Patrao, , "How to convert a VMware Virtual Machine to Hyper-V—Part III", retrieved from: https://www.bdrsuite.com/blog/convert-vmware-hyper-v-by-exporting-ovf-file/, Jun. 27, 2023.
Poitras, Stevens et al., "The Nutanix Bible", https://nutanixbible.com, May 21, 2024, pp. 268.
Poitras, Stevens , "The Nutanix Bible", https://nutanixbible.com/, Dec. 23, 2023, pp. 282.
Rajendran, Cedric , "Working with vSAN Health Checks", VMware vSan Virtual Blocks Blog; https://blogs.vmware.com/virtualblocks/2019/07/18/working-with-vsan-health-checks/, Jul. 18, 2019, pp. 1-6.
Ruth, Paul , "Autonomic Live Adaption of Virtual Computational Environments in a Multi-Domain Infrastructure", 2006 IEEE International Conference on Autonomic Computing, 2006, pp. 5-14.
Seget, Vladan , "VMware vSAN 7 now with native file services and quotas", 4sysops; https://4sysops.com/archives/vmware-vsan-7-now-with-native-file-services-and-quotas/, May 1, 2020.
Seget, Vladan , "VMware vSAN 7 U1: Configure vSAN File Service", retrieved from: https://4sysops.com/archives/vmware-vsan-7-u1-configure-vsan-file-service/, Nov. 11, 2020.
Seget, Vladan , "VMware vSphere 7.0 and vSAN storage improvements", retrieved from: https://4sysops.com/archives/vmware-vsphere-7-0-and-vsan-storage-improvements/, Apr. 1, 2020, pp. 1-12.
Sturniolo, Andy , "VMware vSAN File Services and Veeam", Veeam Blog, https://www.veeam.com/blog/veeam-backup-vsan-file-services.html, Jul. 22, 2020, 1-9.
USPTO, , Non-Final Office Action received in U.S. Appl. No. 17/302,343 dated Sep. 23, 2022.
Vaghani, Satyam , "Virtual machine file system", https://dl.acm.org/doi/abs/10.1145/1899928.1899935, Retrieved Jun. 15, 2023, pp. 57-70.
Widmer, , "How to remove a host from a vSAN cluster", Driftar's blog; retrieved from: https://www.driftar.ch/2023/08/15/how-to-remove-a-host- from-a-vsan-cluster/, Aug. 15, 2023.

\* cited by examiner

DURABLE HANDLE MANAGEMENT FOR FAILOVER IN DISTRIBUTED FILE SERVERS

CROSS-REFERENCE TO RELATED APPLICATION(S)

This application claims priority to India Application No. 202311064865 filed Sep. 27, 2023, which is incorporated herein by reference, in its entirety, for any purpose.

TECHNICAL FIELD

Examples described herein relate generally to virtualized environments. Examples of virtualized file servers are provided that may manage durable handles to facilitate failover when a computing node has an outage.

BACKGROUND

Enterprises increasingly utilize distributed file servers to manage enterprise data. Complex distributed systems may provide access to one or more file shares. It may be difficult to coordinate outage of one or more computing nodes while maintaining usability of the system.

Planned outages may be beneficial for distributed and/or virtualized systems. For example, it may be advantageous to take a computing node down for upgrade. It may be advantageous to upgrade a component of the node and/or any software resident on the node. However, it may be complex to ensure non-disruptive operation of the system even during a time when one or more nodes are down for a planned outage.

DETAILED DESCRIPTION

Figure 1:
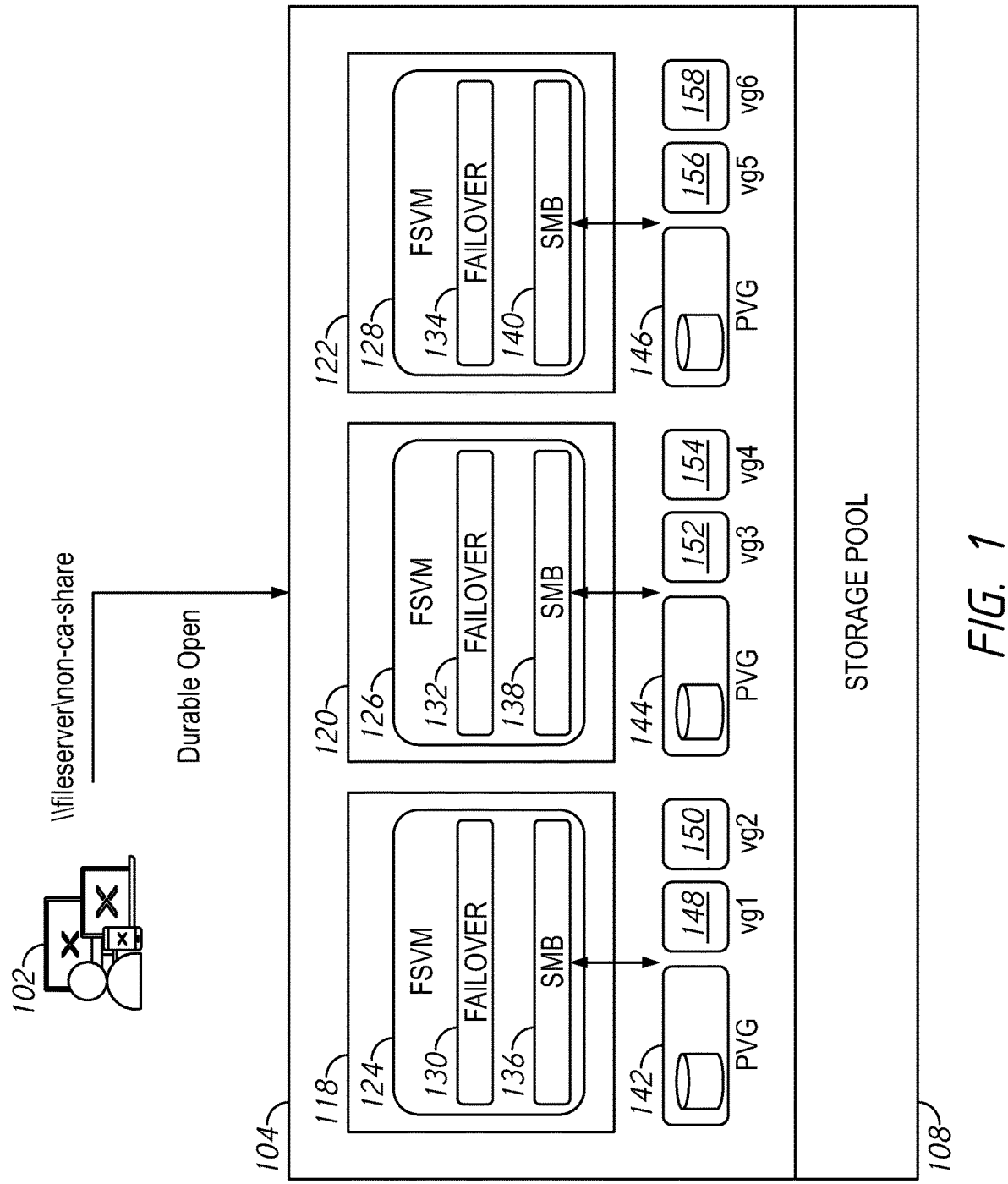
FIG. 1 is a schematic illustration of a system arranged in accordance with examples described herein.

Certain details are set forth herein to provide an understanding of described embodiments of technology. However, other examples may be practiced without various of these particular details. In some instances, well-known computing system components, virtualization technology or operations, and/or software operations have not been shown in detail in order to avoid unnecessarily obscuring the described embodiments. Other embodiments may be utilized, and other changes may be made, without departing from the spirit or scope of the subject matter presented herein.

Distributed file servers may need to upgrade or otherwise failover nodes while users are connected. Sometimes, the file system protocol itself may provide for seamless reconnection. For example, server message block (SMB) shares may have a continuous availability (CA) feature that provides a seamless reconnect experience for existing SMB connections during upgrade. However, CA shares may have a performance penalty. For example, CA shares may require synchronous write operations be used. All write input/output (I/O) may be required to be synchronized to stable storage before responding to clients. Accordingly, examples described herein address a seamless reconnect experience during upgrade even when the CA feature is not enabled. Examples of non-disruptive upgrade are described. Examples may provide for some assurance of a seamless reconnect experience while not incurring the performance penalty associated with CA shares, such as synchronous write operations.

For planned failures, write operations may be synchronized for a period of time prior to a planned failure. Responsive to an indication of a planned failure, examples of computing nodes described herein may flush write operations to disk. During normal operation of the file share, asynchronous writes may be used. Asynchronous write operations may be stored in memory in some examples. Storing the write operations in memory, rather than on a disk, may achieve improved performance during normal operation. However, in response to a planned failure (e.g., upgrade and/or maintenance), write operations may be flushed (e.g., copied) to a disk. In this manner, the performance impact of storing write operations in disk may be reserved for planned failure scenarios, reducing a performance impact. In some examples, write operations are synchronized for a period of time before the planned failure.

In SMB connections to non-CA shares, files are opened by requesting durable handles. The durable handles facilitate reconnections by a client following disruption, such as network glitches, to the server. These durable handles are generally volatile, stored local to a node, and may be cleaned up or removed when the server node is taken down.

Generally, a durable handle for a file or other storage item allows the client to attempt to preserve and reestablish the open after a short disconnect (e.g., network disconnect). Durable handles generally allow seamless (e.g., transparent to the application) reconnection by a client if the connection breaks, while keeping locks/oplocks/share modes intact.

In examples described herein, the durable handles (e.g., durable open state) may be persisted before a planned outage. Additionally, other lock states may be persisted prior to a planned outage. The durable handles and/or states may be restored during node failover. Durable handles are accordingly stored in a persistent volume group that may be provided on each node of a distributed file server. When one node fails over to another, the persistent volume group moves to the destination node.

During high availability operation, when a failover is to begin, the SMB listening port may be blocked so a TCP reset is not sent back to the client, allowing the client to retry the connection. The server going down may stop the SMB server process, and flush the in-memory durable handles (e.g., durable handle state) to a database on the persistent volume group. During high availability takeover, the persistent volume group is transferred to the target node (e.g., the replacement node). The target node's SMB process may read the database on the persistent volume group and prepare to accept the durable handle reconnects.

This solution may provide for seamless reconnects for outages within a threshold time (e.g., within 60 seconds). This threshold time may be related to the length of time the durable handle database on the persistent volume group is present. In some examples, the database is cleaned up (e.g., deleted) after the threshold time. Accordingly, examples described herein may provide a "best efforts" reconnection solution, not necessarily a guarantee.

Examples described herein accordingly facilitate seamless reconnect experiences to file shares during planned failovers. An example of such a planned failover is an upgrade operation. During upgrade, one computing node and/or SMB process may be taken down for upgrade. During the upgrade of that computing node and/or SMB process, another computing node and/or SMB process in the distributed computing system may be used to access the file share or portions thereof previously accessed through the down computing node and/or SMB process. Advantageously, the outage for upgrade may occur seamlessly, even without using a CA feature.

Durable handles are typically available for shorter outages, like network glitches. After a threshold time, the durable handle may be deleted or unavailable, and the reconnect will not be effective using the durable handle. Generally, this threshold time may be as long as 70 seconds, although other threshold times may be used in other examples. Other threshold times that may be used for length of a viable durable handle include 10 seconds, 20 seconds, 30 seconds, 40 seconds, 50 seconds, and/or 60 seconds. Other thresholds may also be used. During the time the durable handle is valid, and the server-acknowledged writes are preserved, examples described herein may support reconnects after failover.

For planned failovers, such as upgrade, the durable handles (e.g., durable open state or durable handle state) may be stored in a persistent volume group before failover. The durable handles (e.g., open state information) may be stored in a persistent volume group prior to unmounting the disk including the persistent volume group from the SMB process and/or host computing node.

During failover, when the target SMB process is started, the target computing node may read the durable handles (e.g., persisted open global state) in the persistent volume group and rebuild the lock state before accepting the incoming traffic. In some examples, if the flushing and/or transfer of asynchronous write operations or the threshold time is exceeded, the durable handles may be cleaned up (e.g., deleted) prior to restarting the SMB process on the target computing node. This may compromise behavior of the reconnects; however, it may help ensure the data is accurate on the failover node.

Accordingly, examples of systems described herein may manage durable handles for seamless failover. Durable handles may be stored in a persistent volume group. The persistent volume group may be moved, together with all or a portion of file share data, to another computing node responsive to an indication of a failure event. To accommodate asynchronous write shares, asynchronous write operations may also be provided to the target computing node. The asynchronous write operations may be processed before reconnecting clients to the file share.

FIG. 1 is a schematic illustration of a system arranged in accordance with examples described herein. FIG. 1 depicts client 102 and system 104. The system 104 may include storage pool 108. The system 104 may include a virtualized file server. The virtualized file server may include computing node 118, computing node 120, and computing node 122. The computing node 118 may include a file server virtual machine (FSVM) 124. The computing node 120 may include FSVM 126. The computing node 122 may include FSVM 128. The FSVM 124 may include failover process 130 and SMB process 136. The FSVM 126 may include failover process 132 and SMB process 138. The FSVM 128 may include failover process 134 and SMB process 140. The FSVM 124 may manage persistent volume group 142, volume group (VG) VG1 148, and VG2 150. The FSVM 126 may manage persistent volume group 144, VG3 152, and VG4 154. The FSVM 128 may manage persistent volume group 146, VG5 156, and VG6 158.

The components shown in FIG. 1 are exemplary only. Additional, fewer, and/or different components may be present in other examples. For example, while three computing nodes with corresponding FSVMs are shown in FIG. 1, any number of computing nodes may be used. Generally at least three nodes may be used to provide a robust computing node cluster; however, two-node clusters may be used in some examples. Moreover, while FSVMs are shown in FIG. 1, any of a variety of virtualization technologies may be used to provide the failover processes and/or SMB processes shown, including one or more virtual machines (VMs) and/or one or more containers.

Examples of systems described herein may accordingly include one or more virtualized file servers, such as included in the system 104 of FIG. 1. A VFS may represent a logical entity in the system. Virtualized file servers described herein may be hosted in generally any virtualization environment (e.g., on generally any virtualization platform). The virtualization environment and/or platform generally refers to the storage resources that have been virtualized by the virtualized file server and the compute resources (e.g., computing nodes with processor(s)) used to manage storage. Examples of virtualization environments include, for example, on premises installations of one or more computing nodes and storage devices. Examples of virtualization environments include one or more cloud computing systems (e.g., Amazon Web Services, Microsoft Azure). Although not shown explicitly in FIG. 1, virtualization environments and/or virtualized file servers may include additional components including, but not limited to, one or more hypervisors, storage controllers, operating systems, containers, and/or container orchestrators (e.g., Kubernetes).

A virtualized file server may include multiple computing nodes, such as computing node 118, computing node 120, and computing node 122 of FIG. 1. Each computing node may include one or more processor(s) and computer readable media encoded with executable instructions which, when executed by the one or more processor(s), cause the computing node to perform operations described herein, including to provide one or more FSVMs, SMB processes, failover processes, and/or other components. The virtualized file server may include a cluster of VMs and/or other virtualized entities (e.g., containers), which may be referred to as file server virtual machines (FSVMs). In some examples, each of the FSVMs of a cluster may be implemented on different computing nodes forming a computing node cluster. For example, the FSVM 124, FSVM 126, and SMB process 138 of the virtualized file server of FIG. 1 may each be implemented on separate computing nodes of a computing node cluster used by the virtualized file server. In some examples, multiple FSVMs may be implemented on a cloud computing system.

In the example of FIG. 1 each FSVM is shown as providing an SMB process. For example, FSVM 124 provides SMB process 136. FSVM 126 provides SMB process 138. FSVM 128 provides SMB process 140. The SMB process refers to software (e.g., one or more non-transitory computer readable media encoded with instructions which, when executed by the computing node, cause the computing node to perform operations described herein as performed by the SMB process). The SMB processes, such as SMB process 136, may be provided in a virtualization technology, such as a virtual machine and/or a container. In the example of FIG. 1, the SMB processes are shown being provided by FSVMs. The SMB processes provide a protocol stack for accessing storage utilizing a file system protocol. One or more SMB processes may be implemented using an SMB server, for example.

The FSVMs may operate to provide a file system on the storage resources of the virtualized file server (e.g., the storage pool 108). The file system may have a single namespace and may store data in accordance with filenames and/or directories. The FSVMs may accordingly support one or more file system protocols, such as network file system (NFS) and/or SMB. In the example of FIG. 1, the FSVMs support SMB using SMB processes, such as SMB process 136, SMB process 138, and SMB process 140. A virtualized file server may translate file system protocol requests for one or more files and/or directories (e.g., a file path) into one or more storage requests to access the data corresponding to the file, directory, and/or file path. Any of a variety of components of the virtualized file server may be used to perform the translation (e.g., one or more FSVMs, one or more hypervisors, and/or one or more storage controllers). The translation may be performed using a map (e.g., a shard map) relating the location of the data to the file name, share, directory, and/or file path. The map may be maintained by the computing nodes used to form the virtualized file server.

Virtualized file servers described herein may be used to access a storage pool. For example, the virtualized file server of FIG. 1 may access storage pool 108. The storage pool may generally include any number or kind of storage devices—for example, network-attached storage, local storage of one or more computing nodes forming the virtualized file server, and/or cloud storage. Storage devices may be implemented using, for example one or more local storage devices, hard disk drives, solid state drives, network-attached storage, and/or cloud storage. The storage for a particular virtualized file server may be referred to as a storage pool. The storage may be arranged in one or more shares. In some examples, each file server virtual machine (FSVM) may manage (e.g., host) a corresponding share or portion of a share. A shard map may store associations between shares and files, directories, and/or file paths.

Examples of file server managers and virtualized file servers that may be used to implement systems described herein are further described in U.S. Published Application No. 2023/0056425, published Feb. 23, 2023, and entitled "File server managers and systems for managing virtualized file servers," which publication is hereby incorporated by reference in its entirety for any purpose.

Examples of virtualized file servers described herein may utilize volume groups for storage of storage items, such as storage items in a file system (e.g., files, folders, directories). In some examples, the storage items may be arranged into one or more file shares. A file share may generally refer to a set of files having a particular folder and file hierarchy (e.g., directory structure and/or path).

Virtual disks (or "vDisks") may be structured from the physical storage devices in the storage pool. A vDisk generally refers to a storage abstraction exposed by a component of a virtualization platform, such as a storage controller, hypervisor, and/or virtual machine. The vDisk is exposed for use by a client (e.g., a user, application, or service). vDisks may be mounted as a virtual disk on one or more VMs or other virtualization technology components (e.g., FSVM 124, FSVM 126, and/or FSVM 128 of FIG. 1). vDisks may be organized into one or more volume groups. For example, the SMB process 136 of FIG. 1 may access a mounted vDisk including VG1 148 and VG2 150. The SMB process 138 may access a mounted vDisk including VG3 152 and VG4 154. The SMB process 140 may access a mounted vDisk including VG5 156 and VG6 158. The volume groups may store all or a portion of a file share. In this manner, the FSVMs of FIG. 1 may provide access to all or portions of file shares included on the volume groups. The volume groups shown in FIG. 1 may be provided utilizing a storage controller present on each of the computing nodes. For example, although not shown explicitly in FIG. 1, a storage controller and hypervisor may be present on computing node 118. The storage controller and hypervisor may provide VG1 148, VG2 150, and persistent volume group 142. Storage controllers and hypervisors may be provided in an analogous manner on computing node 120 and computing node 122 of FIG. 1 to provide persistent volume group 144, VG3 152, VG4 154, persistent volume group 146, VG5 156, and VG6 158.

Examples of virtualized file servers described herein may utilize one or more persistent volume groups. The persistent volume groups may be utilized to persist certain data regarding a file share following a failover event. For example, the FSVM 124 may access a mounted persistent volume group 142. The FSVM 126 may access a mounted persistent volume group 144. The FSVM 128 may access a mounted persistent volume group 146. The persistent volume group may be used to store durable handles, other state information, and/or write operations. By storing some or all of that information in a persistent volume group, the persistent volume group can be moved to another computing node (e.g., another FSVM) as part of a failover procedure. The target computing node receiving the persistent volume group may accordingly utilize the persistently stored data for operation during or after failover. Accordingly, the persistent volume group 142 may store durable handles, other state information, and/or write operations for file shares or portions of file shares located on VG1 148 and/or VG2 150. In this manner, a persistent volume group mounted to processes at a computing node may store durable handles, other state information, and/or write operations for the file shares or portions of file shares whose input/output (I/O) access is managed by that computing node and/or by FSVMs or SMB processes on that computing node. The persistent volume group 144 may store durable handles, other state information, and/or write operations for file shares or portions of file shares stored on VG3 152 and/or VG4 154. The persistent volume group 146 may store durable handles, other state information, and/or write operations for file shares or portions of file shares stored on VG5 156 and/or VG6 158.

Examples of virtualized file servers described herein may include one or more failover processes. The failover process may be software (e.g., executable instructions encoded on a computer readable medium which, when executed by one or more processors, perform the failover actions described herein). For example, the failover process 130 may include executable instructions encoded on one or more computer readable media (e.g., memory) accessible to the computing node 118. When executed by a processor of the computing node 118, the executable instructions may cause the computing node 118 (e.g., the FSVM 124 or another component of the computing node 118) to perform the failover operations described herein.

Failover processes may provide high availability for file servers described herein. For example, failover processes may ensure that a computing node of a virtualized file server is available and configured to service I/O for each file share stored by the virtualized file server. The failover process 130 of FIG. 1 is provided on computing node 118. The failover process 132 is provided on computing node 120. The failover process 134 is provided on computing node 122. In the example of FIG. 1, the failover processes are included in the FSVMs. The FSVM 124 includes failover process 130. The FSVM 126 includes failover process 132. The FSVM 128 includes failover process 134. However, the failover processes in other examples may be present in other VMs, their own VMs, and/or containers or other components of the computing nodes. Moreover, the FSVMs of FIG. 1 each include a failover process and an SMB process. In some examples, these processes may be provided in separate or different VMs and/or containers.

Examples of systems described herein may be utilized (e.g., communicated with) by one or more clients, such as client 102 of FIG. 1. A client may be a human user and/or a software process (e.g., an application). The client 102 of FIG. 1 is shown utilizing a computing system which may be in communication with the system 104 (e.g., with a leader computing node of the computing nodes of the virtualized file server). In some examples, however, a client may be hosted by one or more of the computing nodes in a virtualized file server, such as computing node 118, computing node 120, and/or computing node 122 of FIG. 1. The client may be provided, for example, in one or more user VMs or containers on computing node 118, computing node 120, and/or computing node 122.

During operation, virtualized file servers described herein may service requests from one or multiple users for access to the one or more file shares stored in the virtualized file server. For example, the client 102 may provide a request (e.g., a read and/or write request) for a file share. The request may specify, for example, a pathname of a share and/or a file within a share. In the example of FIG. 1, the client 102 may request the share "\\fileserver\non-ca-share." Other names, shares, and/or files may be used in other examples. The requested share is a non-CA share in that a "continuous availability" feature is not offered by the share. The request for the share generates a durable handle for the share and/or for the requested file of the share. The durable handle, which may also be referred to as a durable open, may be stored in a persistent volume group. The durable handle may be represented by data (e.g., metadata) that includes one or more fields and/or flags to indicate the presence of a durable handle for a share, file, and/or other storage item. Accordingly, the client 102 may provide a request for a share. As an example, the client 102 may request a share stored on VG1 148. The request may be received by any one of the computing nodes of the virtualized file server. In some examples, a leader node may receive the request. The request may be provided to a particular computing node (e.g., a particular FSVM) that manages the requested share and/or file or other storage item. For example, a request from client 102 for "\\fileserver\non-ca-share" may be received by computing node 120, which may be a leader node. The request may be received by FSVM 126 in some examples. The computing nodes may communicate with one another and/or the client to identify an appropriate computing node and/or FSVM to service the request. For example, the computing node 120 and/or FSVM 126 may access one or more maps to determine which FSVM and/or computing node should service the request. In the example of FIG. 1, the requested share may be present on VG1 148. Accordingly, the request may be provided to FSVM 124 in some examples. The durable open may be stored in a persistent volume group mounted to the process and/or computing node used to service the request. Accordingly, the durable handle in the example of FIG. 1 may be stored in persistent volume group 142.

The durable handles may be stored as they are created in the persistent volume group in some examples. Generally, the durable handle may refer to the durable open state for all or a portion of a file share. In some examples the durable handles may be stored during normal operation in a memory of a computing node, such as the computing node 118, computing node 120, and/or computing node 122. Responsive to an indication that a failover operation is to occur, the durable handles may be written to the persistent volume group. In some examples, storing the durable handles in the persistent volume group only responsive to an indication that a failover event is to occur may provide a performance improvement as it may avoid or reduce a need to write to the persistent volume group during normal operation.

In an analogous manner, other lock state information (e.g., lock states) may be stored in persistent volume groups described herein. Lock states for a file share may be stored in one or more persistent volume groups described herein. Examples of lock state may include shared mode, lease, and byte-range lock states.

During operation, one or more failover events may be planned. A failover event may include, for example, an upgrade or maintenance of a computing node and/or of an SMB process or a virtualization technology (e.g., a container or a virtual machine) including the SMB process. In examples described herein, systems may process durable handle and/or other lock state information in a manner that facilitates reconnect following a planned failover. Accordingly, a computing node and/or FSVM and/or failover process described herein may receive an indication of a planned failover. For example, the failover process 130 of FIG. 1 and/or the computing node 118 of FIG. 1 may receive an indication of a failover event. The failover process 130, for example, may receive an indication from a lead computing node and/or a client that an upgrade or maintenance event may occur at a particular time. Responsive to the indication of a failover event, the failover process 130 may in some examples flush asynchronous writes to disk. Recall that file shares maintained by systems described herein may be provided without a continuous available feature, and accordingly may support asynchronous write operations. The asynchronous write operations (e.g., the write operations acknowledged by the server) may be stored in memory of the computing node to which they are directed. For example, the computing node 118 may store asynchronous write operations for a file share stored in VG1 148 and/or VG2 150 in memory of the computing node 118. Responsive to an indication of a failover event, the failover process 130 may flush the write operations to a disk, such as to persistent volume group 142 and/or other storage in storage pool 108.

Responsive to an indication of a failover event, failover processes described herein may ensure that durable handles and/or other lock state information are present in a persistent volume group for a node to be taken down for the failover event.

Figure 2:
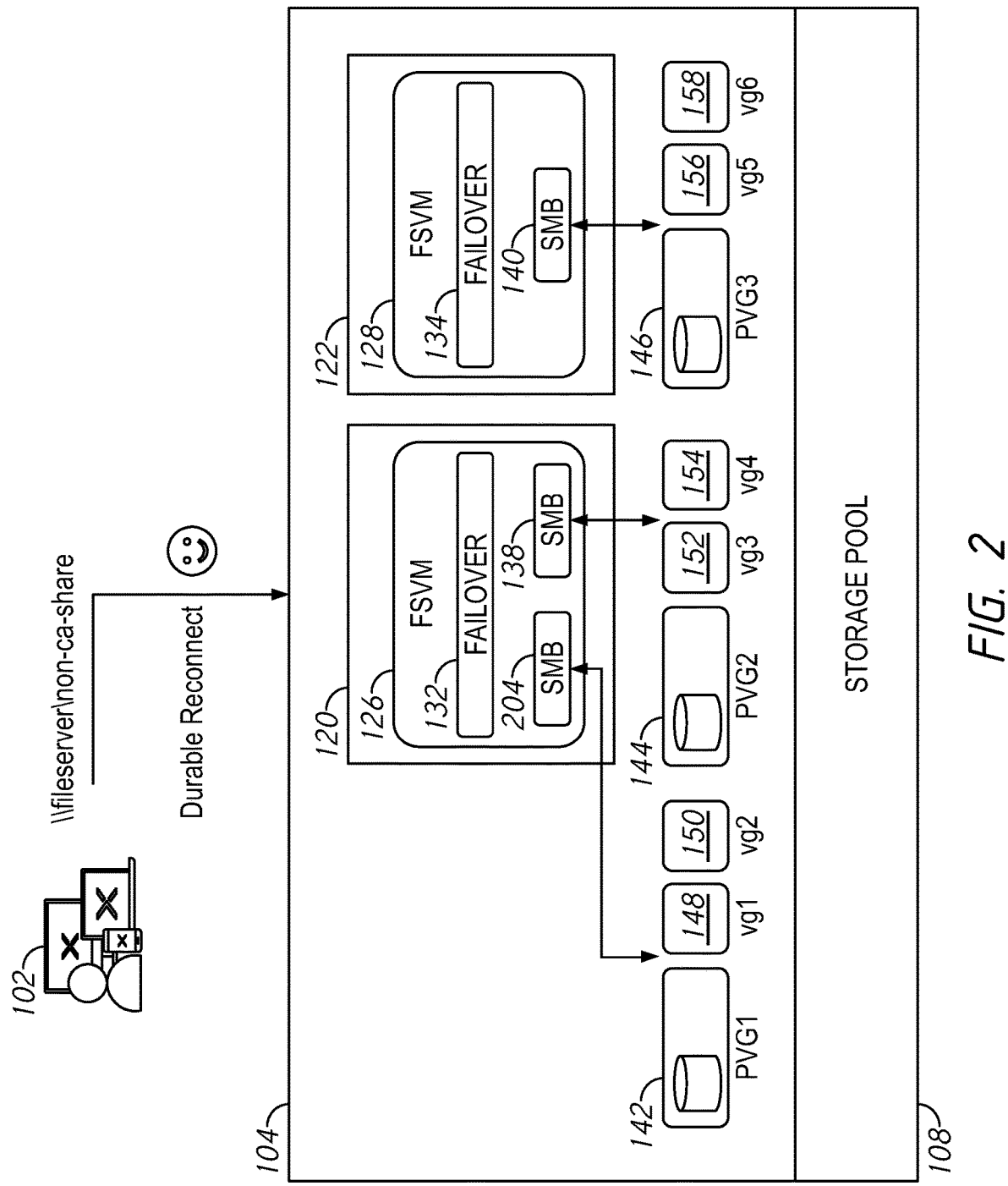
FIG. 2 is a schematic illustration of the system of FIG. 1 during a failover event.

FIG. 2 is a schematic illustration of the system of FIG. 1 during a failover event. FIG. 2 utilizes the same reference numbers for the same components shown in FIG. 1. FIG. 2 depicts client 102 and system 104. The system 104 may include storage pool 108. The system 104 may include a virtualized file server. The virtualized file server shown in FIG. 2 may include computing node 120 and computing node 122. In the example of FIG. 2, the computing node 118 may be down for upgrade, maintenance, or other failover event. The computing node 120 may include FSVM 126. The computing node 122 may include FSVM 128. The FSVM 126 may include failover process 132 and SMB process 138. The FSVM 126 of FIG. 2 may additionally include SMB process 204. The FSVM 128 may include failover process 134 and SMB process 140. The FSVM 126 may manage persistent volume group 144, VG3 152, and VG4 154. The FSVM 126 may additionally manage persistent volume group 142, VG1 148, and VG2 150. Note that the persistent volume group 142, VG1 148, and VG2 150 may have been moved to computing node 120 and/or FSVM 126 from computing node 118 and/or FSVM 124 of FIG. 1. The FSVM 128 may manage persistent volume group 146, VG5 156, and VG6 158.

The components shown in FIG. 2 are exemplary only. Additional, fewer, and/or different components may be present in other examples. For example, while two computing nodes with corresponding FSVMs are shown in FIG. 2, any number of computing nodes may be used. Moreover, while FSVMs are shown in FIG. 2, any of a variety of virtualization technologies may be used to provide the failover processes and/or SMB processes shown, including one or more VMs and/or one or more containers. Still further, one computing node (computing node 120) is illustrated as hosting multiple SMB processes in FIG. 2. In other examples, another computing node (not shown in FIG. 2) may be used as a target to receive the persistent volume group 142, VG1 148, and VG2 150 from computing node 118 of FIG. 1.

Responsive to an indication of a failover event, one or more failover processes described herein may be utilized to move one or more volume groups from a computing node to be taken down to another target computing node. In the example of FIG. 1 and FIG. 2, the failover process 130, which may operate in coordination with failover process 132 and/or failover process 134, may move the persistent volume group 142, VG1 148, and VG2 150 to computing node 120 (e.g., to FSVM 126). Responsive to an indication of a failover event, an SMB process may be started on the target computing node to service requests formerly directed toward an SMB process that may be down due to the failover event. For example, the failover process 130, which may operate in coordination with failover process 132 and/or failover process 134, may start SMB process 204 on computing node 120.

In this manner, during a time that computing node 118 is down for a failover event, the computing node 120 may service the I/O requests formerly handled by the computing node 118. For example, the FSVM 126 may service I/O requests for file share(s) provided on VG1 148 and/or VG2 150 in an analogous manner to how those requests were serviced by FSVM 124 prior to the failover event.

Note that the persistent volume group 142 was also moved to the computing node 120 (e.g., to the FSVM 126). Data in persistent volume group 142 may be used to facilitate reconnect requests to one or more file shares, or portions of file shares, on VG1 148 and/or VG2 150. For example, the computing node 120 and/or FSVM 126 and/or SMB process 204 may access the durable handles in persistent volume group 142. The durable handles may be used by computing node 120 and/or FSVM 126 and/or SMB process 204 to respond to a durable reconnect request sent by a client, such as client 102. For example, the client 102 may determine that a request had not been fulfilled and/or had been interrupted. Accordingly, the computing node 120 may send a reconnect request. The reconnect request may be processed by the computing node 120 using durable handle information in the persistent volume group 142.

In some examples, prior to servicing reconnect requests or other requests for the file share or portions of file shares stored in VG1 148 and/or VG2 150, the computing node 120 (e.g., the FSVM 126 and/or SMB process 204) may process any asynchronous write operations provided from the computing node having gone down. For example, the asynchronous write operations may be stored in persistent volume group 142. The asynchronous write operations may be accessed by SMB process 204 and processed prior to servicing requests for the file share or portions thereof. In this manner, data consistency can be improved during or after failover. Further, in some examples, prior to servicing reconnect requests or other requests for the file share or portions of file shares stored in VG1 148 and/or VG2 150, the computing node 120 (e.g., the FSVM 126 and/or SMB process 204) may read any lock state information stored in persistent volume group 142 and may implement the stored lock states.

In this manner, an SMB process may be failed over from one computing node to another while allowing for durable reconnect requests. In an analogous manner, when the failover event is complete (e.g., when computing node 118 has been upgraded and/or maintained and has returned to communication with computing node 120 and/or computing node 122), the SMB process 204 may be returned from computing node 120 to computing node 118. The failover process 132 may store durable handles, lock state information, and/or asynchronous write operations to persistent volume group 142 and the persistent volume group 142 returned to computing node 120 (e.g., to FSVM 124). The SMB process 136 may be restarted on computing node 118 and may process the asynchronous writes and utilize the durable handles and lock state information to service I/O requests for VG1 148 and/or VG2 150.

Figure 3:
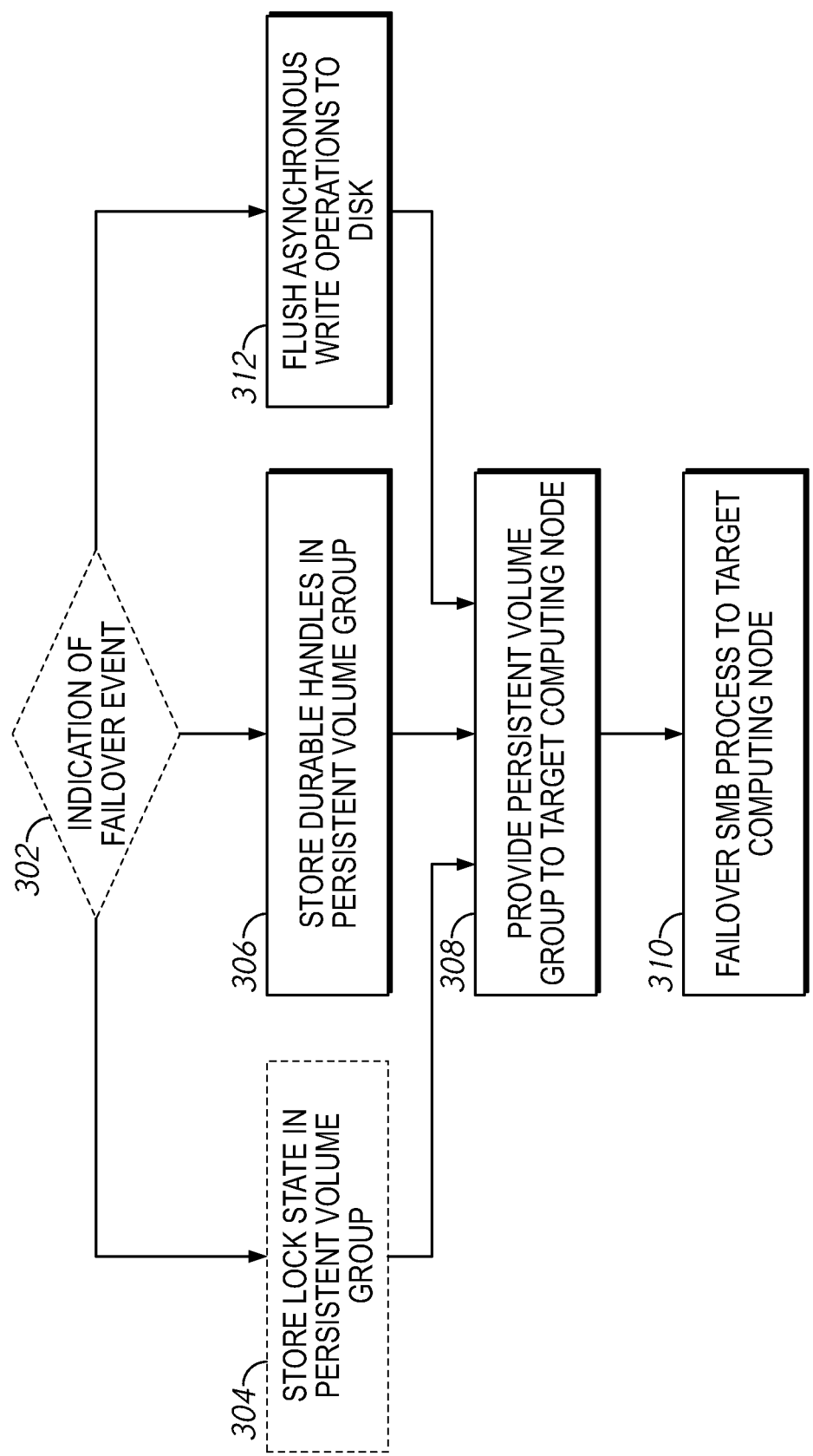
FIG. 3 is a flowchart for failover operations in accordance with examples described herein.

FIG. 3 is a flowchart for failover operations in accordance with examples described herein. According to some examples, the operations include receipt of an indication of failover event at block 302. According to some examples, block 304 may follow block 302. The operations include storing lock state in a persistent volume group at block 304. Block 306 may follow block 302. The operations include storing durable handles in the persistent volume group in block 306. Block 312 may follow block 302. According to some examples, the operations include flushing asynchronous write operations to disk at block 312. Block 308 may follow block 304, block 306, and/or block 312. According to some examples, the operations include providing the persistent volume group to a target computing node at block 308. Block 310 may follow block 308. According to some examples, the operations include failing over an SMB process to the target computing node at block 310.

The operations shown in FIG. 3 are shown by way of example. Additional, fewer, and/or different operations may be used in other examples. The operations of FIG. 3 may be performed by one or more systems described herein. For example, the system 104 of FIG. 1 and FIG. 2 may be used to perform the operations shown in FIG. 3. The operations of FIG. 3 may be implemented using executable instructions stored on one or more computer readable media which, when executed by one or more processors, may cause a system to perform the described operations. For example, the operations shown in FIG. 3 may be performed in some examples by computing node 118 of FIG. 1. Accordingly, the computing node 118 may include one or more computer readable media encoded with instructions which, when executed by a processor of the computing node 118, cause the computing node 118 to perform the operations of FIG. 3.

In block 302, an indication of a failover event may be provided. For example, the failover event may be a planned failover event, such as an upgrade or a maintenance event. The failover event may be an event which may cause a computing node and/or a portion of a computing node to go down, which may affect availability of a file share. The indication of a failover event may be provided, for example, by client 102 of FIG. 1 and/or one or more failover processes shown in FIG. 1, including failover process 130, failover process 132, and/or failover process 134. The failover indication may come from another component in other examples.

In order to handle the failover event, a variety of operations may occur that may support servicing reconnects for a file share. In some examples, durable handles may be stored in a persistent volume group in block 306. The failover process 130 and/or SMB process 136 and/or another component of the computing node 118 may store the durable handles to persistent volume group 142. The durable handles may be stored, for example, in persistent volume group 142 of FIG. 1 and FIG. 2. In some examples, the durable handles may be stored in persistent volume group 142 during normal operation. In some examples, the durable handles may be moved to persistent volume group 142 responsive to an indication of a failover event, such as the indication received in block 302.

In some examples, asynchronous write operations may be flushed to disk in block 312. For example, the failover process 130 of FIG. 1 may flush asynchronous write operations from a memory of the computing node 118 to storage in storage pool 108 and/or to persistent volume group 142.

In some examples, lock state information may be stored in a persistent volume group in block 304. The lock state information may be stored, for example, in persistent volume group 142 of FIG. 1 and FIG. 2. The failover process 130 and/or SMB process 136 and/or another component of computing node 118 may store the lock state information to persistent volume group 142.

To fail over, the persistent volume group may be provided to the target computing node in block 308. For example, the persistent volume group may be mounted to one or more VMs or made available to one or more other components of the target computing node. For example, the persistent volume group 142 of FIG. 1 may be mounted to FSVM 126 of computing node 120. The failover process 130 and/or failover process 132, and/or both of those processes together, may manage the movement of persistent volume group 142. In this manner, the target computing node (e.g., computing node 120 of FIG. 1) may have access to the durable handles, other state information, and/or asynchronous write operations.

In block 310 an SMB process may be failed over the target computing node. For example, the SMB process 136 of FIG. 1 may be failed over to SMB process 204 of FIG. 2. The failover process 130 and/or failover process 132 may manage the failover. The SMB process 204 may be started and may be configured to service I/O requests previously handled by the SMB process 136. For example, an internet protocol (IP) address or other identification of the SMB process 204 and/or FSVM 126 may be replaced for the IP address or other identification of the SMB process 136 and/or FSVM 124 such that requests previously directed toward SMB process 136 and/or FSVM 124 may be directed toward FSVM 126 and/or SMB process 204.

In some examples, failover processes described herein may defer opening of one or more ports (e.g., SMB ports) on a target computing node until the SMB process to provide failover is started. For example, the failover process 132 may defer opening a port used to access SMB process 204 until SMB process 204 is running. In some examples, if the port is opened prior to SMB process 204 being operational, a reconnect request may arrive before SMB process 204 is operational and may affect an overall amount of time the client attempts to send reconnects. In some examples, deferring opening of the port may increase the chance that the reconnect will be successful. For example, failover process 132 may defer opening one or more ports on the computing node 120 until SMB process 204 is started and/or the system lock state has been restored and/or asynchronous writes have been processed.

In an analogous manner, when failing over an SMB process, one or more ports may first be closed. This may block traffic to the SMB process that may be stopped. In this manner, traffic may be blocked from clients before stopping the SMB process. In some examples, this may also block immediate resets from a server. Accordingly, clients may be kept waiting longer and not immediately give up. For example, the computing node 118 (e.g., failover process 130) may block one or more ports of the computing node 118 (e.g., a network port used to receive a request from client 102) prior to stopping SMB process 136 for failover.

Figure 4:
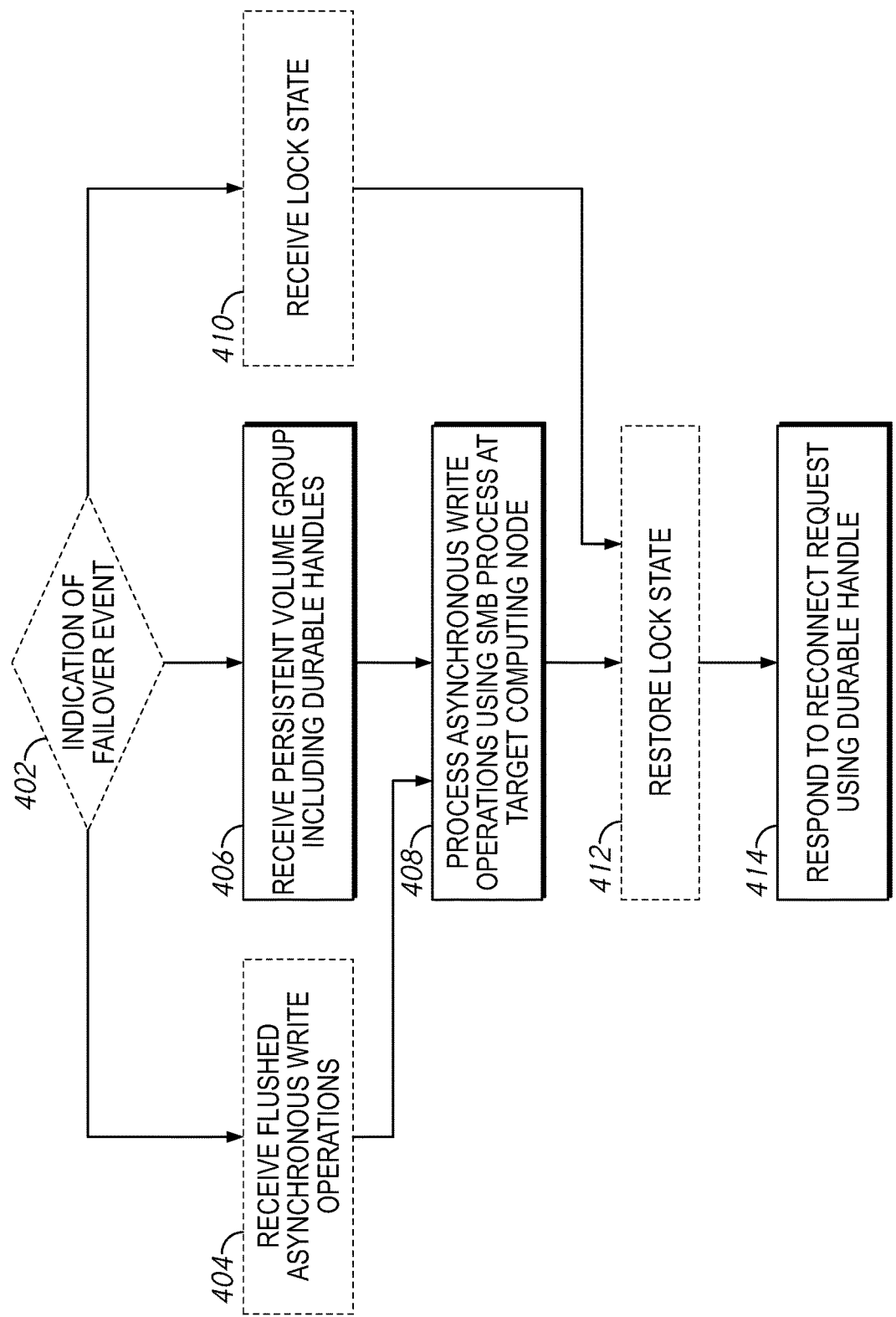
FIG. 4 is a flowchart for failover operations arranged in accordance with examples described herein.

FIG. 4 is a flowchart for failover operations arranged in accordance with examples described herein. According to some examples, the operations include indication of a failover event at block 402. Block 404 may follow block 402. According to some examples, the operations include receiving flushed asynchronous write operations at block 404. Block 406 may follow block 402. According to some examples, the operations include receiving persistent volume group including durable handles at block 406. Block 410 may follow block 402. According to some examples, the operations include receiving lock state at block 410. Block 408 may follow block 404, block 406, and/or block 410. According to some examples, the operations include processing asynchronous write operations using an SMB process at the target computing node at block 408. Block 412 may follow block 408. According to some examples, the operations include restoring lock state at block 412. Block 414 may follow block 412 and/or block 408. According to some examples, the operations include responding to a reconnect request using a durable handle at block 414.

The operations shown in FIG. 4 are shown by way of example. Additional, fewer, and/or different operations may be used in other examples. The operations of FIG. 4 may be performed by one or more systems described herein. For example, the system 104 of FIG. 1 and FIG. 2 may be used to perform the operations shown in FIG. 4. The operations of FIG. 4 may be implemented using executable instructions stored on one or more computer readable media which, when executed by one or more processors, may cause a system to perform the described operations. For example, the operations shown in FIG. 4 may be performed in some examples by computing node 120 of FIG. 1 and/or FIG. 2. Accordingly, the computing node 120 may include one or more computer readable media encoded with instructions which, when executed by a processor of the computing node 120, cause the computing node 120 to perform the operations of FIG. 3.

In block 402, an indication of a failover event may be provided. For example, the failover event may be a planned failover event, such as an upgrade or a maintenance event. The failover event may be an event which may cause a computing node and/or a portion of a computing node to go down, which may affect availability of a file share. The indication of a failover event may be provided, for example, by client 102 of FIG. 1 and/or one or more failover processes shown in FIG. 1, including failover process 130, failover process 132, and/or failover process 134. The failover indication may come from another component in other examples.

As described herein and, for example, with regard to FIG. 3, examples of failovers described herein may include providing a persistent volume group to a target computing node. The persistent volume group may include durable handles, lock state information, and/or asynchronous write operations.

In block 406, a persistent volume group including durable handles may be received. For example, the computing node 120 of FIG. 1 may receive persistent volume group 142 from computing node 118. The persistent volume group may store durable handles relating to the file share, file shares, and/or portions of file shares stored in VG1 148 and/or VG2 150 whose management may be failed over from computing node 118 when computing node 118 goes down. The persistent volume group 142 may, for example, be mounted to FSVM 126 and/or otherwise made accessible to computing node 120. In addition to receiving persistent volume group 142, the target computing node may receive one or more volume groups that store the file share, file shares, or portions of a file share whose management is being failed over to the target computing node.

In examples described herein, in addition to receiving durable handles from the failing over computing node, target computing nodes may receive lock state information and/or flushed asynchronous write operations. In block 404, the target computing node may receive flushed asynchronous write operations. These may be, for example, asynchronous write operations that have been acknowledged by a server (e.g., by SMB process 136 and/or computing node 118), but not yet processed (e.g., the data has not yet been written). In some examples, the asynchronous write operations may have been flushed to a disk, such as to storage in storage pool 108 of FIG. 1 and/or to persistent volume group 142. The target computing node (e.g., computing node 120) may receive the asynchronous write operations from computing node 118, for example, by mounting persistent volume group 142.

In block 410, the target computing node may receive lock state information. In some examples, the lock state information may be included in a persistent volume group moved to the target computing node during failover (e.g., persistent volume group 142 of FIG. 1 and FIG. 2).

Accordingly, target computing nodes that may be used to failover from a down computing node may be able to access a variety of information that may be used to facilitate an efficient and accurate failover. In block 408, the target computing node may process asynchronous write operations. For example, the asynchronous write operations received from the computing node being taken down for failure may be processed. For example, the computing node 120 may process asynchronous write operations received from computing node 118 during failover. In some examples, an SMB process started on the target computing node, such as SMB process 204 on computing node 120 of FIG. 2, may be used to process the asynchronous write operations.

In block 412, lock state may be restored. The computing node 120 may, for example, restore lock state relating to VG1 148 and/or VG2 150 by accessing lock state information stored in persistent volume group 142. Accordingly, lock state information associated with a file share, file shares, and/or one or more portions of file shares stored on VG1 148 and/or VG2 150 may be restored prior to accepting further requests for the data.

In block 414, the target computing node may respond to one or more reconnect requests using the durable handles. For example, a reconnect request may be provided by client 102 of FIG. 1 for a particular file share or portion of a file share that had been subject of a durable open. Once the file share become unavailable, the client 102 may have an opportunity to request to reconnect. The reconnect request may be received by the target computing node, such as computing node 120 in the example of FIG. 2. The durable handle information stored in persistent volume group 142 may allow the SMB process 204 to respond accurately and timely to the reconnect request. In some examples, the target computing node may not service requests for the file share, file shares, and/or portion of file share failed over from another computing node until the asynchronous writes had been processed in block 408. For example, the SMB process 204 and/or FSVM 126 may not provide responses and/or may not forward requests for VG1 148 and/or VG2 150 until block 408 has been completed. This may aid in ensuring the accuracy of the data during and/or after failover. Similarly, the target computing node may not service requests for the file share, file shares, and/or portion of file share failed over from another computing node until the lock state has been implemented from block 410.

In some examples, the target computing node may prioritize reconnect requests for the failed over file share over new requests for the file share. For example, the computing node 120 of FIG. 2 may receive a reconnect request from client 102 for a share, and the computing node 120 may receive additional requests for the share from the same and/or other clients. The computing node 120 (e.g., the FSVM 126 and/or SMB process 204) may process the reconnect request prior to servicing new I/O requests for the file share. Prioritization of reconnect requests may be made in order to reduce or minimize a chance of reconnect requests being received after a threshold time in which the durable handles are available.

The operations of FIG. 3 and FIG. 4 have described operations involved in a failover of a file share from one computing node to another computing node. The failover may occur, for example, responsive to an upgrade or maintenance event. Once the upgrade or maintenance event is complete, the computing node may be brought back up and may become again available. For example, an upgrade may be performed (e.g., by an administrator or administrator system) on the computing node 118. The FSVM 124, SMB process 136, hypervisor, and/or other component of the computing node 118 may be upgraded while the share is failed over to computing node 120. Once an upgrade at computing node 118 is complete, the share may be failed back from computing node 120 to computing node 118.

Analogous operations may be performed to fail back the file share from the target computing node to the original computing node (e.g., from computing node 120 to computing node 118 in the examples of FIG. 1 and FIG. 2).

Although not explicitly shown in FIG. 4, in some examples, the durable handles may be cleaned up (e.g., deleted) after a threshold time. In some examples, the threshold time may be 70 seconds. In some examples, the threshold time may be 60 seconds. Other threshold times may be used. The computing node 120 may delete the durable handles from persistent volume group 142 after the threshold time. For example, the failover process 134 and/or SMB process 204 may delete the durable handles.

Examples of systems and methods described herein may include a file server manager in communication with one or more virtualized file servers. Examples of virtualized file servers which may be used to implement virtualized file servers are described in, for example, U.S. Published Patent Application 2017/0235760, entitled "Virtualized file server," published Aug. 17, 2017 on U.S. application Ser. No. 15/422,420, filed Feb. 1, 2017, both of which documents are hereby incorporated by reference in their entirety for any purpose.

Figure 5:
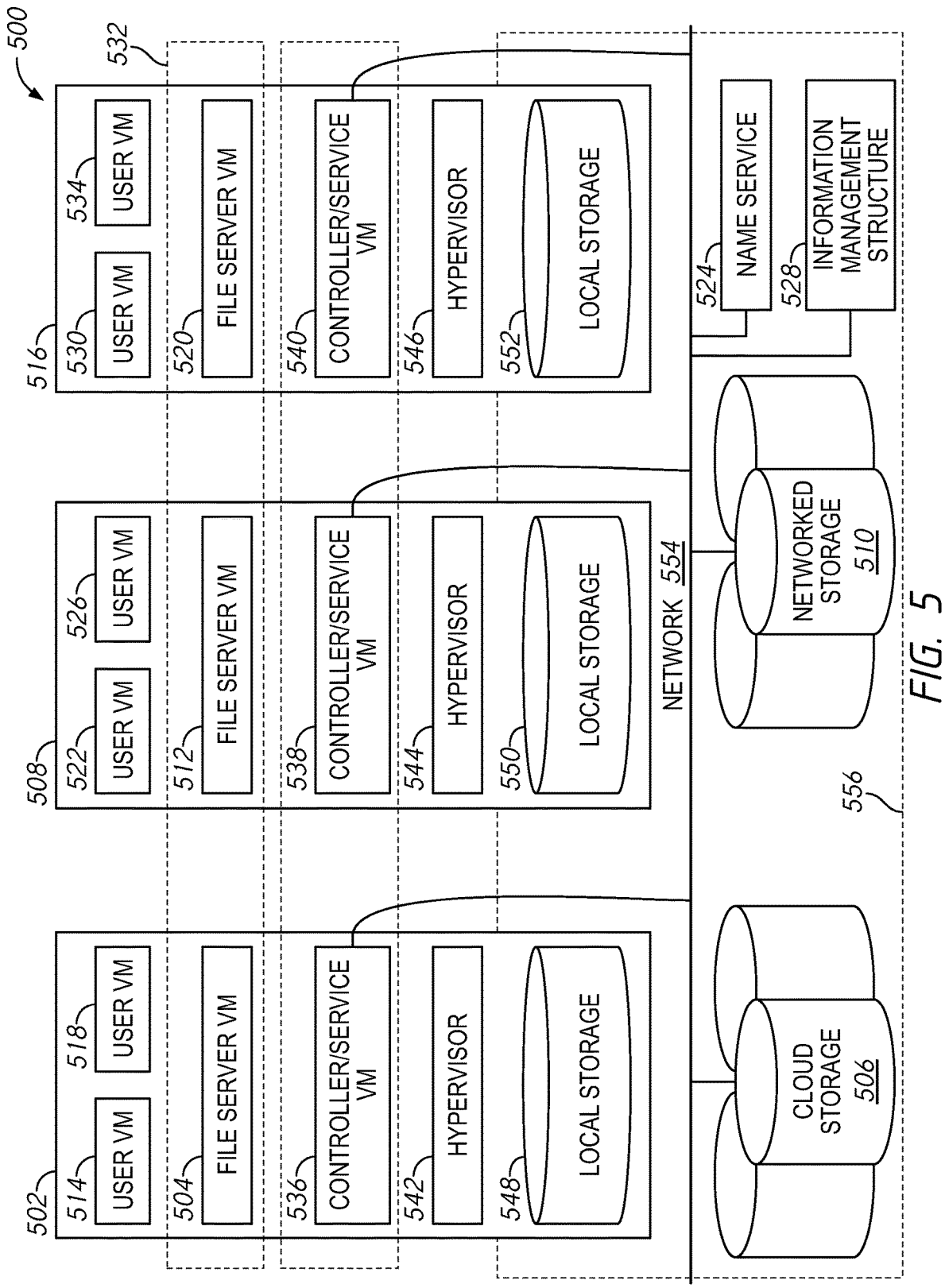
FIG. 5 is a schematic illustration of a clustered virtualization environment 500 implementing a virtualized file server (VFS) in accordance with examples described herein.

FIG. 5 is a schematic illustration of a clustered virtualization environment 500 implementing a VFS 532 according to particular embodiments. In particular embodiments, the VFS 532 provides file services to user VMs 514, 518, 522, 526, 530, and 534. Each user VM may be a client as used herein and/or a user. The file services may include storing and retrieving data persistently, reliably, and efficiently. The user VMs may execute user processes, such as office applications or the like, on host machines 502, 508, and 516. The stored data may be represented as a set of storage items, such as files organized in a hierarchical structure of folders (also known as directories), which can contain files and other folders, and shares, which can also contain files and folders.

The clustered virtualization environment 500 and/or VFS 532 may be used to implement one or more virtualization platforms and/or virtualized file servers described herein, such as the system 104 of FIG. 1 and/or any other virtualized file server described herein.

The architectures of FIG. 5 can be implemented for a distributed platform that contains multiple host machines 502, 516, and 508 that manage multiple tiers of storage. The multiple tiers of storage may include storage that is accessible through network 554, such as, by way of example and not limitation, cloud storage 506 (e.g., which may be accessible through the internet), network-attached storage 510 (NAS) (e.g., which may be accessible through a local area network (LAN), or a storage area network (SAN). Examples described herein also permit local storage 548, 550, and 552 that is incorporated into or directly attached to the host machine and/or appliance to be managed as part of storage pool 556. Examples of such local storage include solid state drives (SSDs), hard disk drives (HDDs or "spindle drives"), optical disk drives, external drives (e.g., a storage device connected to a host machine via a native drive interface or a serial attached small computer systems interface (SCSI)), or any other direct-attached storage. These storage devices, both direct-attached and network-accessible, collectively form storage pool 556. Virtual disks (or "vDisks") may be structured from the physical storage devices in storage pool 556. As used herein, the term vDisk refers to the storage abstraction that is exposed by a component of the virtualization platform, such as a controller/service VM (CVM) (e.g., CVM 536) and/or a hypervisor or other storage controller to be used by a user VM (e.g., user VM 514). In particular embodiments, the vDisk may be exposed via iSCSI (internet small computer system interface) or NFS and is mounted as a virtual disk on the user VM. In particular embodiments, vDisks may be organized into one or more VGs.

Each host machine 502, 516, 508 may run virtualization software, such as VMWARE ESX(I), MICROSOFT HYPER-V, or REDHAT KVM. The virtualization software includes hypervisors 542, 544, and 546 to create, manage, and destroy user VMs, as well as managing the interactions between the underlying hardware and user VMs. User VMs may run one or more applications that may operate as "clients" with respect to other elements within clustered virtualization environment 500. A hypervisor may connect to network 554. In particular embodiments, a host machine 502, 508, or 516 may be a physical hardware computing device; in particular embodiments, a host machine 502, 508, or 516 may be a virtual machine.

CVMs 536, 538, and 540 are used to manage storage and input/output (I/O) activities according to particular embodiments. These special VMs act as the storage controller in the currently described architecture. While CVMs are described, in other examples, a different storage controller may be used. Multiple such storage controllers may coordinate within a cluster to form a unified storage controller system. CVMs may run as virtual machines on the various host machines, and work together to form a distributed system that manages all the storage resources, including local storage, NAS 510, and cloud storage 506. The CVMs may connect to network 554 directly, or via a hypervisor. Since the CVMs run independent of hypervisors 542, 544, 546, this means that the current approach can be used and implemented within any virtual machine architecture, since the CVMs of particular embodiments can be used in conjunction with any hypervisor from any virtualization vendor. In some examples, CVMs may not be used and one or more hypervisors (e.g., hypervisors 542, 544, and/or 546) may perform the functions described with respect to the CVMs. In some examples, one or more CVMs may not be present, and the hypervisor and/or other component hosted on the computing nodes may provide the functions attributed to the CVM herein.

A host machine may be designated as a leader node within a cluster of host machines. For example, host machine 508 may be a leader node. A leader node may have a software component designated to perform operations of the leader. For example, CVM 538 on host machine 508 may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node and/or in communication with the leader node or virtual machines or containers on the leader node. For example, file server managers described herein may be in communication with the leader node in some examples.

Each CVM 536, 538, and 540 exports one or more block devices or NFS server targets that appear as disks to user VMs 514, 518, 522, 526, 530, and 534. These disks are virtual, since they are implemented by the software running inside CVMs 536, 538, and 540. Thus, to user VMs, CVMs appear to be exporting a clustered storage appliance that contains some disks. All user data (including the operating system) in the user VMs may reside on these virtual disks.

Significant performance advantages can be gained by allowing the virtualization system to access and utilize local storage 548, 550, and 552 as disclosed herein. This is because I/O performance is typically much faster when performing access to local storage as compared to performing access to NAS 510 across a network 554. This faster performance for locally attached storage can be increased even further by using certain types of optimized local storage devices, such as SSDs. Further details regarding methods and mechanisms for implementing the virtualization environment illustrated in FIG. 5 are described in U.S. Pat. No. 8,601,473, which is hereby incorporated by reference in its entirety for any purpose.

As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command, and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 556. Additionally or alternatively, CVMs 536, 538, 540 may present an emulated storage controller either to the hypervisor or to user VMs to facilitate I/O operations. CVMs 536, 538, and 540 may be connected to storage within storage pool 556. CVM 536 may have the ability to perform I/O operations using local storage 548 within the same host machine 502, by connecting via network 554 to cloud storage 506 or NAS 510, or by connecting via network 554 to local storage 550 or 552 within another host machine 508 or 516 (e.g., via connecting to another CVM 538 or 540). In particular embodiments, any suitable computing system may be used to implement a host machine.

In particular embodiments, the VFS 532 may include a set of FSVMs 504, 512, and 520 that execute on host machines 502, 508, and 516 and process storage item access operations requested by user VMs executing on the host machines 502, 508, and 516. While described as VMs, it is to be understood that the FSVMs may be implemented using containers in some examples, and/or that containers may be used instead of FSVMs. The containers used instead of an FSVM may implement one or more protocol stacks for file systems (e.g., NFS and/or SMB). The FSVMs 504, 512, and 520 may communicate with storage controllers provided by CVMs 536, 538, 540 and/or hypervisors executing on the host machines 502, 508, 516 to store and retrieve files, folders, SMB shares, or other storage items on local storage 548, 550, 552 associated with, e.g., local to, the host machines 502, 508, 516. The FSVMs 504, 512, 520 may store and retrieve block-level data on the host machines 502, 508, 516, e.g., on the local storage 548, 550, 552 of the host machines 502, 508, 516. The block-level data may include block-level representations of the storage items (e.g., files, shares). The network protocol used for communication between user VMs, FSVMs, and CVMs via the network 554 may be Internet Small Computer System Interface (iSCSI), SMB, NFS, pNFS (parallel NFS), or another appropriate protocol.

For the purposes of VFS 532, host machine 516 may be designated as a leader node within a cluster of host machines. In this case, FSVM 520 on host machine 516 may be designated to perform such operations. A leader may be responsible for monitoring or handling requests from FSVMs on other host machines throughout the virtualized environment. If FSVM 520 fails, a new leader may be designated for VFS 532.

In particular embodiments, the user VMs may send data to the VFS 532 (e.g., to the FSVMs) using write requests, and may receive data from it using read requests. The read and write requests, and their associated parameters, data, and results, may be sent between a user VM and one or more FSVMs located on the same host machine as the user VM or on different host machines from the user VM. The read and write requests may be sent between host machines 502, 508, 516 via network 554, e.g., using a network communication protocol such as iSCSI, CIFS, SMB, TCP, IP, or the like. When a read or write request is sent between two VMs located on the same one of the host machines 502, 508, 516 (e.g., between the user VM 514 and the FSVM 504 located on the host machine 502), the request may be sent using local communication within the host machine 502 instead of via the network 554. As described above, such local communication may be substantially faster than communication via the network 554. The local communication may be performed by, e.g., writing to and reading from shared memory accessible by the user VM 514 and the FSVM 504, sending and receiving data via a local "loopback" network interface, local stream communication, or the like.

In particular embodiments, the storage items stored by the VFS 532, such as files and folders, may be distributed amongst multiple FSVMs 504, 512, 520. In particular embodiments, when storage access requests are received from the user VMs, the VFS 532 identifies FSVMs 504, 512, 520 at which requested storage items, e.g., folders, files, or portions thereof, are stored, and directs the user VMs to the locations of the storage items. The FSVMs 504, 512, 520 may maintain a storage map, such as a sharding map, that maps names or identifiers of storage items to their corresponding locations. The storage map may be a distributed data structure of which copies are maintained at each FSVM 504, 512, 520 and accessed using distributed locks or other storage item access operations. Alternatively, the storage map may be maintained by an FSVM at a leader node such as the FSVM 520, and the other FSVMs 504 and 512 may send requests to query and update the storage map to the leader FSVM 520. Other implementations of the storage map are possible using appropriate techniques to provide asynchronous data access to a shared resource by multiple readers and writers. The storage map may map names or identifiers of storage items in the form of text strings or numeric identifiers, such as folder names, files names, and/or identifiers of portions of folders or files (e.g., numeric start offset positions and counts in bytes or other units) to locations of the files, folders, or portions thereof. Locations may be represented as names of FSVMs, e.g., "FSVM-1," as network addresses of host machines on which FSVMs are located (e.g., "ip-addr1" or "128.1.1.10"), or as other types of location identifiers.

When a user application executing in a user VM 514 on one of the host machines 502 initiates a storage access operation, such as reading or writing data, the user VM 514 may send the storage access operation in a request to one of the FSVMs 504, 512, 520 on one of the host machines 502, 508, 516. An FSVM 512 executing on a host machine 508 that receives a storage access request may use the storage map to determine whether the requested file or folder is located on the FSVM 512. If the requested file or folder is located on the FSVM 512, the FSVM 512 executes the requested storage access operation. Otherwise, the FSVM 512 responds to the request with an indication that the data is not on the FSVM 512, and may redirect the requesting user VM 514 to the FSVM on which the storage map indicates the file or folder is located. The client may cache the address of the FSVM on which the file or folder is located, so that it may send subsequent requests for the file or folder directly to that FSVM.

As an example and not by way of limitation, the location of a file or a folder may be pinned to a particular FSVM 504 by sending a file service operation that creates the file or folder to a CVM 536 and/or hypervisor 542 associated with (e.g., located on the same host machine as) the FSVM 504. The CVM 536 subsequently processes file service commands for that file for the FSVM 504 and sends corresponding storage access operations to storage devices associated with the file. The CVM 536 may associate local storage 548 with the file if there is sufficient free space on local storage 548. Alternatively, the CVM 536 may associate a storage device located on another host machine 502, e.g., in local storage 550, with the file under certain conditions, e.g., if there is insufficient free space on the local storage 548, or if storage access operations between the CVM 536 and the file are expected to be infrequent. Files and folders, or portions thereof, may also be stored on other storage devices, such as the NAS 510 or the cloud storage 506 of the storage pool 556.

In particular embodiments, a name service 524, such as that specified by the Domain Name System (DNS) IP, may communicate with the host machines 502, 508, 516 via the network 554 and may store a database of domain name (e.g., host name) to IP address mappings. The domain names may correspond to FSVMs, e.g., fsvm1.domain.com or ip-addr1.domain.com for an FSVM named "FSVM-1." The name service 524 may be queried by the user VMs to determine the IP address of a particular host machine 502, 508, 516 given a name of the host machine, e.g., to determine the IP address of the host name ip-addr1 for the host machine 502. The name service 524 may be located on a separate server computer system or on one or more of the host machines 502, 508, 516. The names and IP addresses of the host machines of the VFS 532, e.g., the host machines 502, 508, 516, may be stored in the name service 524 so that the user VMs may determine the IP address of each of the host machines 502, 508, 516, or FSVMs 504, 512, 520. The name of each VFS instance, e.g., each file system such as FS1, FS2, or the like, may be stored in the name service 524 in association with a set of one or more names that contains the name(s) of the host machines 502, 508, 516 or FSVMs 504, 512, 520 of the VFS instance VFS 532. The FSVMs 504, 512, 520 may be associated with the host names ip-addr1, ip-addr2, and ip-addr3, respectively. For example, the file server instance name FS1.domain.com may be associated with the host names ip-addr1, ip-addr2, and ip-addr3 in the name service 524, so that a query of the name service 524 for the server instance name "FS1" or "FS1.domain.com" returns the names ip-addr1, ip-addr2, and ip-addr3. As another example, the file server instance name FS1.domain.com may be associated with the host names fsvm-1, fsvm-2, and fsvm-3. Further, the name service 524 may return the names in a different order for each name lookup request, e.g., using round-robin ordering, so that the sequence of names (or addresses) returned by the name service for a file server instance name is a different permutation for each query until all the permutations have been returned in response to requests, at which point the permutation cycle starts again, e.g., with the first permutation. In this way, storage access requests from user VMs may be balanced across the host machines, since the user VMs submit requests to the name service 524 for the address of the VFS instance for storage items for which the user VMs do not have a record or cache entry, as described below.

In particular embodiments, each FSVM may have two IP addresses: an external IP address and an internal IP address. The external IP addresses may be used by SMB/CIFS clients, such as user VMs, to connect to the FSVMs. The external IP addresses may be stored in a name service. The IP addresses ip-addr1, ip-addr2, and ip-addr3 described above are examples of external IP addresses. The internal IP addresses may be used for iSCSI communication to CVMs and/or hypervisors, e.g., between the FSVMs 504, 512, 520 and the CVMs 536, 544, 540 and/or hypervisors 542, 544, and/or 546. Other internal communications may be sent via the internal IP addresses as well, e.g., file server configuration information may be sent from the CVMs to the FSVMs using the internal IP addresses, and the CVMs may get file server statistics from the FSVMs via internal communication as needed.

Since the VFS 532 is provided by a distributed set of FSVMs 504, 512, 520, the user VMs that access particular requested storage items, such as files or folders, do not necessarily know the locations of the requested storage items when the request is received. A distributed file system protocol, e.g., MICROSOFT Distributed File System (DFS) or the like, is therefore used, in which a user VM 514 may request the addresses of FSVMs 504, 512, 520 from a name service 524 (e.g., DNS). The name service 524 may send one or more network addresses of FSVMs 504, 512, 520 to the user VM 514, in an order that changes for each subsequent request. These network addresses are not necessarily the addresses of the FSVM 512 on which the storage item requested by the user VM 514 is located, since the name service 524 does not necessarily have information about the mapping between storage items and FSVMs 504, 512, 520. Next, the user VM 514 may send an access request to one of the network addresses provided by the name service, e.g., the address of FSVM 512. The FSVM 512 may receive the access request and determine whether the storage item identified by the request is located on the FSVM 512. If so, the FSVM 512 may process the request and send the results to the requesting user VM 514. However, if the identified storage item is located on a different FSVM 520, then the FSVM 512 may redirect the user VM 514 to the FSVM 520 on which the requested storage item is located by sending a "redirect" response referencing FSVM 520 to the user VM 514. The user VM 514 may then send the access request to FSVM 520, which may perform the requested operation for the identified storage item.

A particular virtualized file server, such as VFS 532, including the items it stores, e.g., files and folders, may be referred to herein as a VFS "instance" and/or a file system and may have an associated name, e.g., FS1, as described above. Although a VFS instance may have multiple FSVMs distributed across different host machines, with different files being stored on FSVMs, the VFS instance may present a single name space to its clients such as the user VMs. The single name space may include, for example, a set of named "shares" and each share may have an associated folder hierarchy in which files are stored. Storage items such as files and folders may have associated names and metadata such as permissions, access control information, size quota limits, file types, files sizes, and so on. As another example, the name space may be a single folder hierarchy, e.g., a single root directory that contains files and other folders. User VMs may access the data stored on a distributed VFS instance via storage access operations, such as operations to list folders and files in a specified folder, create a new file or folder, open an existing file for reading or writing, and read data from or write data to a file, as well as storage item manipulation operations to rename, delete, copy, or get details, such as metadata, of files or folders. Note that folders may also be referred to herein as "directories."

In particular embodiments, storage items such as files and folders in a file server namespace may be accessed by clients such as user VMs by name, e.g., "\Folder-1\File-1" and "\Folder-2\File-2" for two different files named "File-1" and "File-2" in the folders Folder-1 and Folder-2, respectively (where Folder-1 and Folder-2 are sub-folders of the root folder). Names that identify files in the namespace using folder names and file names may be referred to as "path names." Client systems may access the storage items stored on the VFS instance by specifying the file names or path names, e.g., the path name "\Folder-1\File-1", in storage access operations. If the storage items are stored on a share (e.g., a shared drive), then the share name may be used to access the storage items, e.g., via the path name "\\Share-1\Folder-1\File-1" to access File-1 in folder Folder-1 on a share named "Share-1."

In particular embodiments, although the VFS instance may store different folders, files, or portions thereof at different locations, e.g., on different FSVMs, the use of different FSVMs or other elements of storage pool 556 to store the folders and files may be hidden from the accessing clients. The share name is not necessarily a name of a location such as an FSVM or host machine. For example, the name Share-1 does not identify a particular FSVM on which storage items of the share are located. The share Share-1 may have portions of storage items stored on three host machines, but a user may simply access Share-1, e.g., by mapping Share-1 to a client computer, to gain access to the storage items on Share-1 as if they were located on the client computer. Names of storage items, such as file names and folder names, are similarly location-independent. Thus, although storage items, such as files and their containing folders and shares, may be stored at different locations, such as different host machines, the files may be accessed in a location-transparent manner by clients (such as the user VMs). Thus, users at client systems need not specify or know the locations of each storage item being accessed. The VFS may automatically map the file names, folder names, or full path names to the locations at which the storage items are stored. As an example and not by way of limitation, a storage item's location may be specified by the name, address, or identity of the FSVM that provides access to the storage item on the host machine on which the storage item is located. A storage item such as a file may be divided into multiple parts that may be located on different FSVMs, in which case access requests for a particular portion of the file may be automatically mapped to the location of the portion of the file based on the portion of the file being accessed (e.g., the offset from the beginning of the file and the number of bytes being accessed).

In particular embodiments, VFS 532 determines the location, e.g., FSVM, at which to store a storage item when the storage item is created. For example, an FSVM 504 may attempt to create a file or folder using a CVM 536 on the same host machine 502 as the user VM 518 that requested creation of the file, so that the CVM 536 that controls access operations to the file folder is co-located with the user VM 518. In this way, since the user VM 518 is known to be associated with the file or folder and is thus likely to access the file again, e.g., in the near future or on behalf of the same user, access operations may use local communication or short-distance communication to improve performance, e.g., by reducing access times or increasing access throughput. If there is a local CVM on the same host machine as the FSVM, the FSVM may identify it and use it by default. If there is no local CVM on the same host machine as the FSVM, a delay may be incurred for communication between the FSVM and a CVM on a different host machine. Further, the VFS 532 may also attempt to store the file on a storage device that is local to the CVM being used to create the file, such as local storage, so that storage access operations between the CVM and local storage may use local or short-distance communication.

In particular embodiments, if a CVM is unable to store the storage item in local storage of a host machine on which an FSVM resides, e.g., because local storage does not have sufficient available free space, then the file may be stored in local storage of a different host machine. In this case, the stored file is not physically local to the host machine, but storage access operations for the file are performed by the locally-associated CVM and FSVM, and the CVM may communicate with local storage on the remote host machine using a network file sharing protocol, e.g., iSCSI, SAMBA, or the like.

In particular embodiments, if a virtual machine, such as a user VM 514, CVM 536, or FSVM 504, moves from a host machine 502 to a destination host machine 508, e.g., because of resource availability changes, and data items such as files or folders associated with the VM are not locally accessible on the destination host machine 508, then data migration may be performed for the data items associated with the moved VM to migrate them to the new host machine 508, so that they are local to the moved VM on the new host machine 508. FSVMs may detect removal and addition of CVMs (as may occur, for example, when a CVM fails or is shut down) via the iSCSI protocol or other technique, such as heartbeat messages. As another example, an FSVM may determine that a particular file's location is to be changed, e.g., because a disk on which the file is stored is becoming full, because changing the file's location is likely to reduce network communication delays and therefore improve performance, or for other reasons. Upon determining that a file is to be moved, VFS 532 may change the location of the file by, for example, copying the file from its existing location(s), such as local storage 548 of a host machine 502, to its new location(s), such as local storage 550 of host machine 508 (and to or from other host machines, such as local storage 552 of host machine 516 if appropriate), and deleting the file from its existing location(s). Write operations on the file may be blocked or queued while the file is being copied, so that the copy is consistent. The VFS 532 may also redirect storage access requests for the file from an FSVM at the file's existing location to an FSVM at the file's new location.

In particular embodiments, VFS 532 includes at least three FSVMs 504, 512, 520 located on three respective host machines 502, 508, 516. To provide high availability, there may be in some examples a maximum of one FSVM per host machine in a cluster. If two FSVMs are detected on a single host machine, then one of the FSVMs may be moved to another host machine automatically, or the user (e.g., system administrator and/or file server manager) may be notified to move the FSVM to another host machine. The user and/or file server manager may move an FSVM to another host machine using an administrative interface that provides commands for starting, stopping, and moving FSVMs between host machines.

In particular embodiments, two FSVMs of different VFS instances may reside on the same host machine. If the host machine fails, the FSVMs on the host machine become unavailable, at least until the host machine recovers. Thus, if there is at most one FSVM for each VFS instance on each host machine, then at most one of the FSVMs may be lost per VFS per failed host machine. As an example, if more than one FSVM for a particular VFS instance were to reside on a host machine, and the VFS instance includes three host machines and three FSVMs, then loss of one host machine may result in loss of two-thirds of the FSVMs for the VFS instance, which would be more disruptive and more difficult to recover from than the loss of one-third of the FSVMs for the VFS instance.

In particular embodiments, users, such as system administrators or other users of the user VMs, may expand the cluster of FSVMs by adding additional FSVMs. Each FSVM may be associated with at least one network address, such as an IP address of the host machine on which the FSVM resides. There may be multiple clusters, and all FSVMs of a particular VFS instance are ordinarily in the same cluster. The VFS instance may be a member of a Microsoft Active Directory domain, which may provide authentication and other services such as name service.

Figure 6:
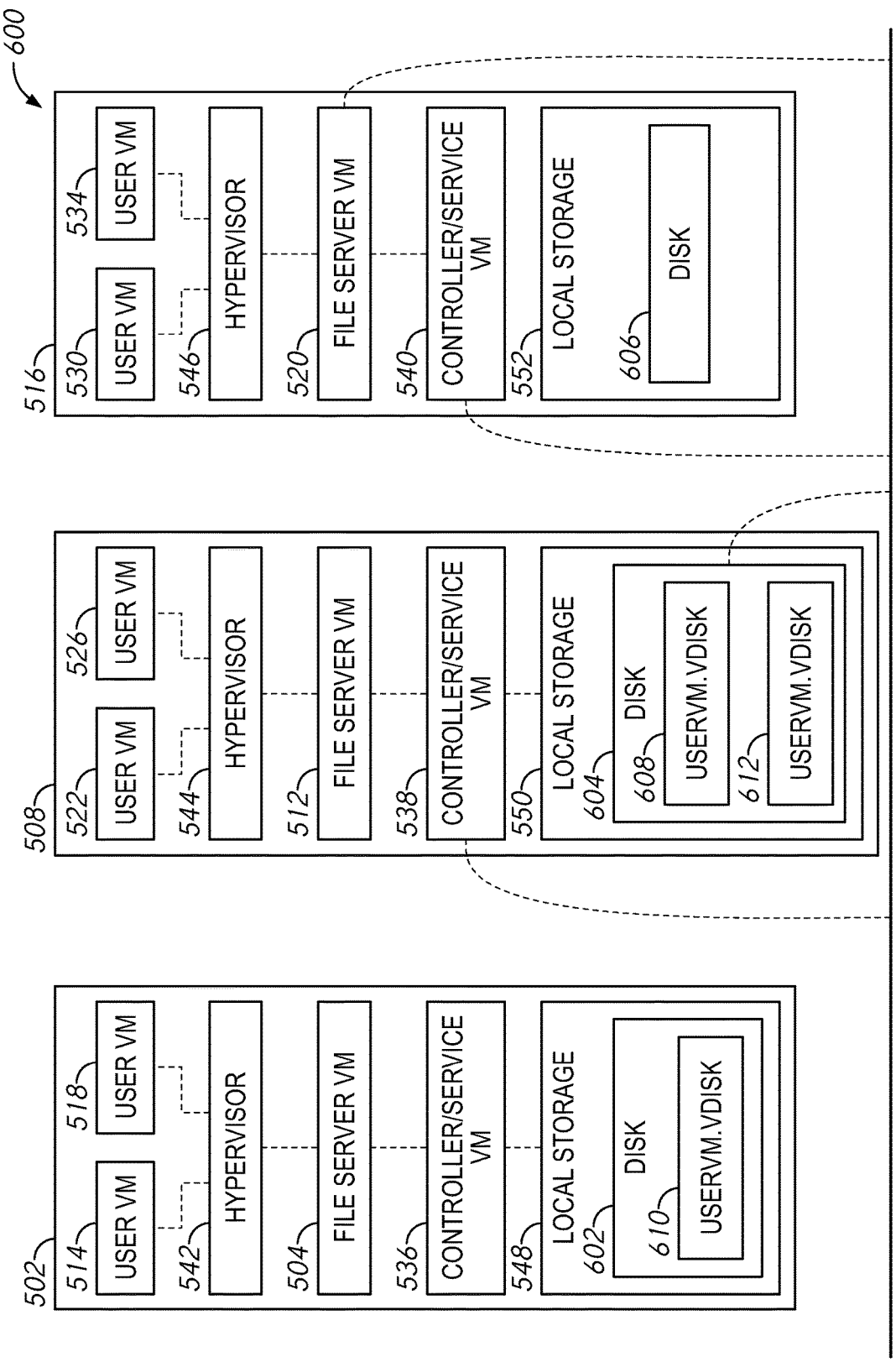
FIG. 6 is a schematic illustration of a clustered virtualization environment 600 arranged in accordance with examples described herein.

FIG. 6 illustrates data flow within a clustered virtualization environment 600 implementing a VFS instance (e.g., VFS 532) in which stored items such as files and folders used by user VMs are stored locally on the same host machines as the user VMs according to particular embodiments. As described above, one or more user VMs and a CVM and/or hypervisor may run on each host machine. As a user VM processes I/O commands (e.g., a read or write operation), the I/O commands may be sent to the hypervisor on the same server or host machine as the user VM. For example, the hypervisor may present to the user VMs a VFS instance, receive an I/O command, and facilitate the performance of the I/O command by passing the command to an FSVM that performs the operation specified by the command. The VFS may facilitate I/O operations between a user VM and a virtualized file system. The virtualized file system may appear to the user VM as a namespace of mappable shared drives or mountable network file systems of files and directories. The namespace of the virtualized file system may be implemented using storage devices in the local storage, such as disks, onto which the shared drives or network file systems, files, and folders, or portions thereof, may be distributed as determined by the FSVMs. The VFS may thus provide features disclosed herein, such as efficient use of the disks, high availability, scalability, and others. The implementation of these features may be transparent to the user VMs. The FSVMs may present the storage capacity of the disks of the host machines as an efficient, highly-available, and scalable namespace in which the user VMs may create and access shares, files, folders, and the like.

As an example, a network share may be presented to a user VM as one or more discrete virtual disks, but each virtual disk may correspond to any part of one or more virtual or physical disks within a storage pool. Additionally or alternatively, the FSVMs may present a VFS either to the hypervisor or to user VMs of a host machine to facilitate I/O operations. The FSVMs may access the local storage via CVMs, other storage controllers, hypervisors, or other components of the host machine. As described herein, a CVM 536 may have the ability to perform I/O operations using local storage 548 within the same host machine 502 by connecting via the network 554 to cloud storage or NAS, or by connecting via the network 554 to local storage 550, 552 within another host machine 508, 516 (e.g., by connecting to another CVM 538, 540).

In particular embodiments, each user VM may access one or more virtual disk images stored on one or more disks of the local storage, the cloud storage, and/or the NAS. The virtual disk images may contain data used by the user VMs, such as operating system images, application software, and user data, e.g., user home folders and user profile folders. For example, FIG. 6 illustrates three virtual machine images 610, 608, 612. The virtual machine image 610 may be a file named "UserVM.vdisk" (or the like) stored on disk 602 of local storage 548 of host machine 502. The virtual machine image 610 may store the contents of the user VM 514's hard drive. The disk 602 on which the virtual machine image 610 is "local to" the user VM 514 on host machine 502 because the disk 602 is in local storage 548 of the host machine 502 on which the user VM 514 is located. Thus, the user VM 514 may use local (intra-host machine) communication to access the virtual machine image 610 more efficiently, e.g., with less latency and higher throughput, than would be the case if the virtual machine image 610 were stored on disk 604 of local storage 550 of a different host machine 508, because inter-host machine communication across the network 554 would be used in the latter case. Similarly, a virtual machine image 608, which may be a file named "UserVM.vdisk" (or the like), is stored on disk 604 of local storage 550 of host machine 508, and the image 608 is local to the user VM 522 located on host machine 508. Thus, the user VM 522 may access the virtual machine image 608 more efficiently than the virtual machine 518 on host machine 502, for example. In another example, the CVM 540 may be located on the same host machine 516 as the user VM 530 that accesses a virtual machine image 612 (UserVM.vdisk) of the user VM 530, with the virtual machine image 612 being stored on a different host machine 508 than the user VM 530 and the CVM 540. In this example, communication between the user VM 530 and the CVM 540 may still be local, e.g., more efficient than communication between the user VM 530 and a CVM 538 on a different host machine 508, but communication between the CVM 540 and the disk 604 on which the virtual machine image 612 is stored is via the network 554, as shown by the dashed lines between CVM 540 and the network 554 and between the network 554 and local storage 550. The communication between CVM 540 and the disk 604 is not local, and thus may be less efficient than local communication such as may occur between the CVM 540 and a disk 606 in local storage 552 of host machine 516. Further, a user VM 530 on host machine 516 may access data such as the virtual machine image 612 stored on a remote (e.g., non-local) disk 604 via network communication with a CVM 538 located on the remote host machine 508. This case may occur if CVM 540 is not present on host machine 516, e.g., because CVM 540 has failed, or if the FSVM 520 has been configured to communicate with local storage 550 on host machine 508 via the CVM 538 on host machine 508, e.g., to reduce computational load on host machine 516.

In particular embodiments, since local communication is expected to be more efficient than remote communication, the FSVMs may store storage items, such as files or folders, e.g., the virtual disk images, as block-level data on local storage of the host machine on which the user VM that is expected to access the files is located. A user VM may be expected to access particular storage items if, for example, the storage items are associated with the user VM, such as by configuration information. For example, the virtual disk image 610 may be associated with the user VM 514 by configuration information of the user VM 514. Storage items may also be associated with a user VM via the identity of a user of the user VM. For example, files and folders owned by the same user ID as the user who is logged into the user VM 514 may be associated with the user VM 514. If the storage items expected to be accessed by a user VM 514 are not stored on the same host machine 502 as the user VM 514, e.g., because of insufficient available storage capacity in local storage 548 of the host machine 502, or because the storage items are expected to be accessed to a greater degree (e.g., more frequently or by more users) by a user VM 522 on a different host machine 508, then the user VM 514 may still communicate with a local CVM 536 to access the storage items located on the remote host machine 508, and the local CVM 536 may communicate with local storage 550 on the remote host machine 508 to access the storage items located on the remote host machine 508. If the user VM 514 on a host machine 502 does not or cannot use a local CVM 536 to access the storage items located on the remote host machine 508, e.g., because the local CVM 536 has crashed or the user VM 514 has been configured to use a remote CVM 538, then communication between the user VM 514 and local storage 550 on which the storage items are stored may be via a remote CVM 538 using the network 554, and the remote CVM 538 may access local storage 550 using local communication on host machine 508. As another example, a user VM 514 on a host machine 502 may access storage items located on a disk 606 of local storage 552 on another host machine 516 via a CVM 538 on an intermediary host machine 508 using network communication between the host machines 502 and 508 and between the host machines 508 and 516.

Figure 7:
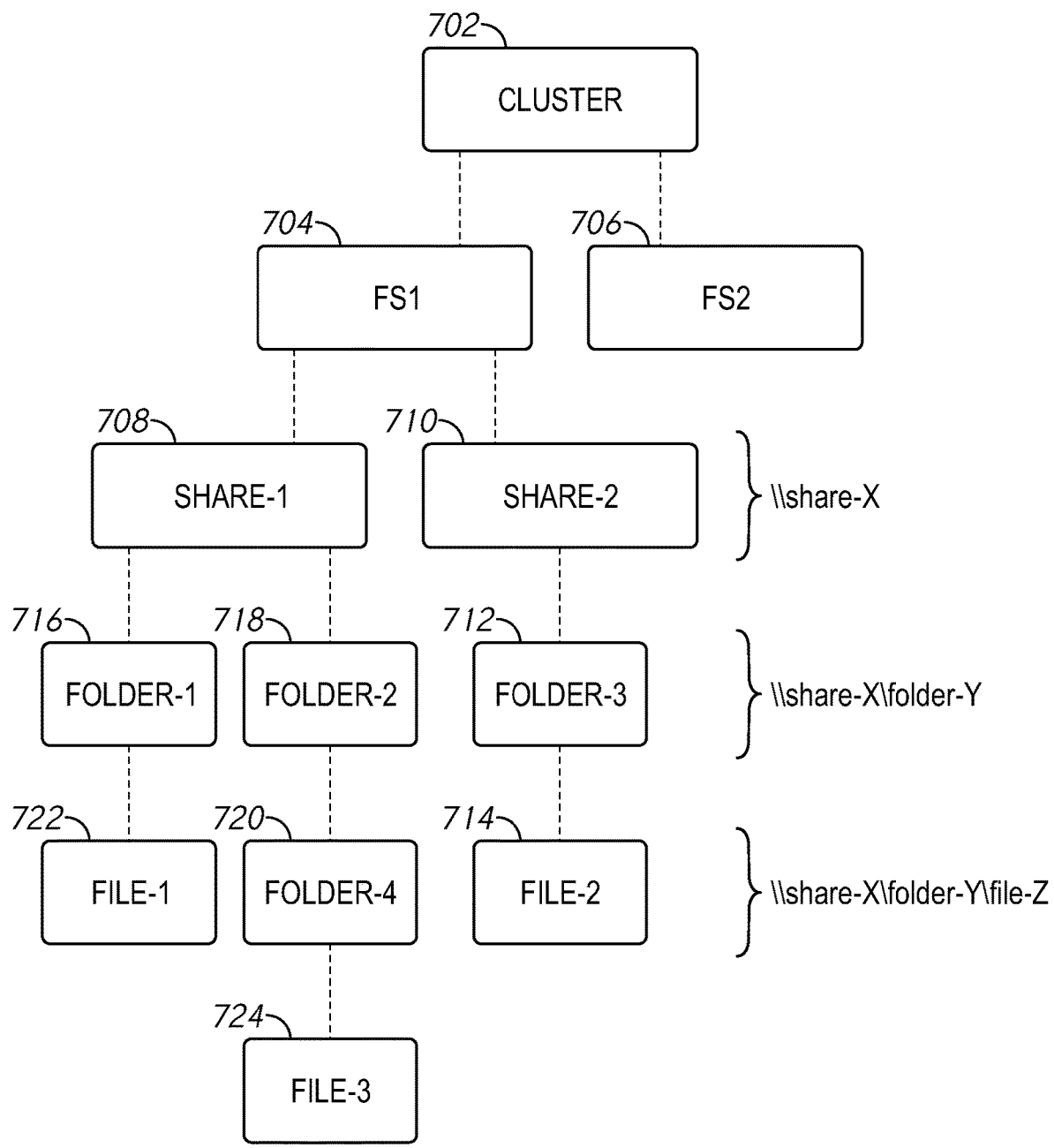
FIG. 7 illustrates an example hierarchical structure of a VFS instance in a cluster according to particular embodiments.

FIG. 7 illustrates an example hierarchical structure of a VFS instance (e.g., a file system) in a cluster (such as a virtualized file server) according to particular embodiments. A cluster 702 contains two VFS instances, FS1 704 and FS2 706. For example, the cluster 702 may be used to implement and/or may be implemented by a virtualized file server described herein, such as virtualized file server of FIG. 1 and/or FIG. 2. Each VFS instance as shown in FIG. 7 may be identified by a name such as "\\instance", e.g., "\\FS1" for Windows file systems, or a name such as "instance", e.g., "FS1" for UNIX-type file systems. The VFS instance FS1 704 contains shares, including Share-1 708 and Share-2 710. Shares may have names such as "Users" for a share that stores user home directories, or the like. Each share may have a path name such as "\\FS1\Share-1" or "\\FS1\Users". As an example and not by way of limitation, a share may correspond to a disk partition or a pool of file system blocks on Windows and UNIX-type file systems. As another example and not by way of limitation, a share may correspond to a folder or directory on a VFS instance. Shares may appear in the file system instance as folders or directories to users of user VMs. Share-1 708 includes two folders, Folder-1 716, and Folder-2 718, and may also include one or more files (e.g., files not in folders). Each folder Folder-1 716, Folder-2 718 may include one or more files 722, 724. Share-2 710 includes a folder Folder-3 712, which includes a file File-2 714. Each folder has a folder name such as "Folder-1", "Users", or "Sam" and a path name such as "\\FS1\Share-1\Folder-1" (in Windows) or "share-1:/fs1/Users/Sam" (in UNIX). Similarly, each file has a file name such as "File-1" or "Forecast.xls" and a path name such as "\\FS1\Share-1\Folder-1\File-1" or "share-1:/fs1/Users/Sam/Forecast.xls".

Figure 8:
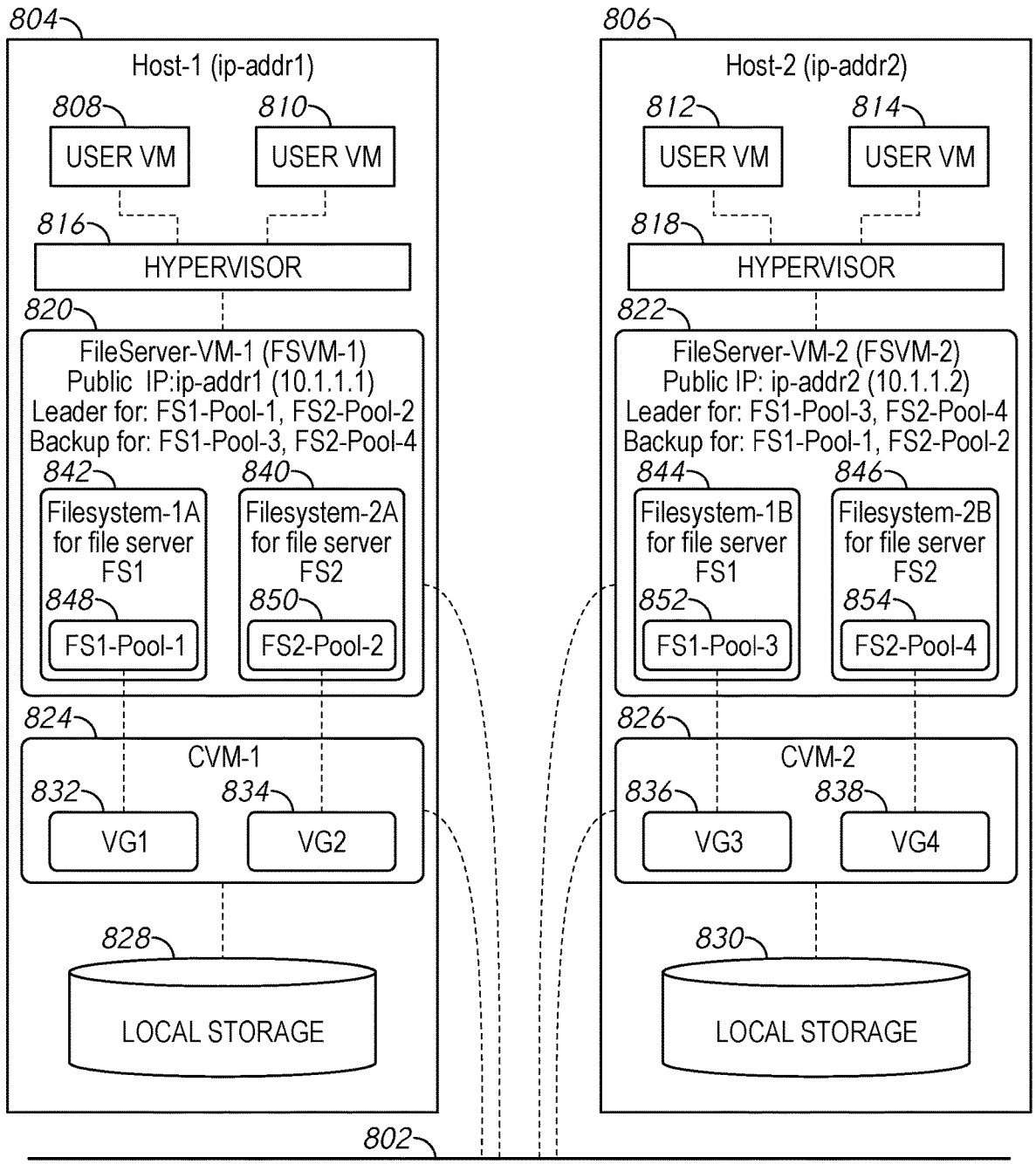
FIG. 8 illustrates two example host machines, each providing file storage services for portions of two VFS instances FS1 and FS2 according to particular embodiments.

FIG. 8 illustrates two example host machines 804 and 806, each providing file storage services for portions of two VFS instances FS1 and FS2 according to particular embodiments. The first host machine, Host-1 804, includes two user VMs 808, 810, a hypervisor 816, an FSVM named "File-Server-VM-1" (abbreviated "FSVM-1") 820, a Controller/Service VM named "CVM-1" 824, and local storage 828. Host-1 804's FSVM-1 820 has an IP network address of 10.1.1.1, which is an address of a network interface on Host-1 804. Host-1 804 has a hostname ip-addr1, which may correspond to Host-1 804's IP address 10.1.1.1. The second host machine, Host-2 806, includes two user VMs 812, 814, a hypervisor 818, a File Server VM named "FileServer-VM-2" (abbreviated "FSVM-2") 822, a CVM named "CVM-2" 826, and local storage 830. Host-2 806's FSVM-2 822 has an IP network address of 10.1.1.2, which is an address of a network interface on Host-2 806.

In particular embodiments, file systems FileSystem-1A 842 and FileSystem-2A 840 implement the structure of files and folders for portions of the FS1 and FS2 file server instances, respectively, that are located on (e.g., served by) FSVM-1 820 on Host-1 804. Other file systems on other host machines may implement other portions of the FS1 and FS2 file server instances. The file systems FileSystem-1A 842 and FileSystem-2A 840 may implement the structure of at least a portion of a file server instance by translating file system operations, such as opening a file, writing data to or reading data from the file, deleting a file, and so on, to disk I/O operations such as seeking to a portion of the disk, reading or writing an index of file information, writing data to or reading data from blocks of the disk, allocating or de-allocating the blocks, and so on. The file systems FileSystem-1A 842 and FileSystem-2A 840 may thus store their file system data, including the structure of the folder and file hierarchy, the names of the storage items (e.g., folders and files), and the contents of the storage items on one or more storage devices, such as local storage 828. The particular storage device or devices on which the file system data for each file system are stored may be specified by an associated file system pool (e.g., FS1-Pool-1 848 and FS2-Pool-2 850). For example, the storage device(s) on which data for FileSystem-1A 842 and FileSystem-2A 840 are stored may be specified by respective file system pools FS1-Pool-1 848 and FS2-Pool-2 850. The storage devices for the pool may be selected from volume groups provided by CVM-1 824, such as volume group VG1 832 and volume group VG2 834. Each volume group VG1 832, VG2 834 may include a group of one or more available storage devices that are present in local storage 828 associated with (e.g., by iSCSI communication) the CVM-1 824. The CVM-1 824 may be associated with a local storage 828 on the same host machine Host-1 804 as the CVM-1 824, or with a local storage 830 on a different host machine Host-2 806. The CVM-1 824 may also be associated with other types of storage, such as cloud storage, networked storage or the like. Although the examples described herein include particular host machines, virtual machines, file servers, file server instances, file server pools, CVMs, VGs, and associations there between, any number of host machines, virtual machines, file servers, file server instances, file server pools, CVMs, VGs, and any associations there between are possible and contemplated.

In particular embodiments, the file system pool FS1-Pool-1 848 may associate any storage device in one of the volume groups VG1 832, VG2 834 of storage devices that are available in local storage 828 with the file system FileSystem-1A 842. For example, the file system pool FS1-Pool-1 848 may specify that a disk device named hd1 in the volume group VG1 832 of local storage 828 is a storage device for FileSystem-1A 842 for file server FS1 on FSVM-1 820. A file system pool FS2-Pool-2 850 may specify a storage device FileSystem-2A 840 for file server FS2 on FSVM-1 820. The storage device for FileSystem-2A 840 may be, e.g., the disk device hd1, or a different device in one of the volume groups VG1 832, VG2 834, such as a disk device named "hd2" in volume group VG2 834. Each of the file systems FileSystem-1A 842, FileSystem-2A 840 may be, e.g., an instance of the NTFS file system used by the Windows operating system, of the UFS UNIX file system, or the like. The term "file system" may also be used herein to refer to an instance of a type of file system, e.g., a particular structure of folders and files with particular names and content.

In one example, referring to FIG. 7 and FIG. 8, an FS1 hierarchy rooted at VFS instance FS1 704 may be located on FSVM-1 820 and stored in file system instance FileSystem-1A 842. That is, the file system instance FileSystem-1A 842 may store the names of the shares and storage items (such as folders and files), as well as the contents of the storage items, shown in the hierarchy at and below File Server FS1 704. A portion of the FS1 hierarchy shown in FIG. 7, such as the portion rooted at Folder-2 718, may be located on File-Server-VM-2 822 on Host-2 806 instead of FileServer-VM-1 820, in which case the file system instance FileSystem-1B 844 may store the portion of the FS1 hierarchy rooted at Folder-2 718, including Folder-3 712, Folder-4 720 and File-3 724. Similarly, an FS2 hierarchy rooted at File Server FS2 706 in FIG. 7 may be located on FileServer-VM-1 820 and stored in file system instance FileSystem-2A 840. The FS2 hierarchy may be split into multiple portions (not shown), such that one portion is located on FileServer-VM-1 820 on Host-1 804, and another portion is located on FileServer-VM-2 822 on Host-2 806 and stored in file system instance FileSystem-2B 846.

In particular embodiments, FileServer-VM-1 (abbreviated FSVM-1) 820 on Host-1 804 is a leader for a portion of file server instance FS1 and a portion of FS2, and is a backup for another portion of FS1 and another portion of FS2. The portion of FS1 for which FileServer-VM-1 820 is a leader corresponds to a storage pool labeled FS1-Pool-1 848. FileServer-VM-1 is also a leader for FS2-Pool-2 850, and is a backup (e.g., is prepared to become a leader upon request, such as in response to a failure of another FSVM) for FS1-Pool-3 852 and FS2-Pool-4 854 on Host-2 806. In particular embodiments, FileServer-VM-2 (abbreviated FSVM-2) 822 is a leader for a portion of file server instance FS1 and a portion of FS2, and is a backup for another portion of FS1 and another portion of FS2. The portion of FS1 for which FSVM-2 822 is a leader corresponds to a storage pool labeled FS1-Pool-3 852. FSVM-2 822 is also a leader for FS2-Pool-4 854, and is a backup for FS1-Pool-1 848 and FS2-Pool-2 850 on Host-1 804.

In particular embodiments, the file server instances FS1, FS2 provided by the FSVMs 820 and 822 may be accessed by user VMs 808, 810, 812 and 814 via a network file system protocol such as SMB, CIFS, NFS, or the like. Each FSVM 820 and 822 may provide what appears to client applications on user VMs 808, 810, 812 and 814 to be a single file system instance, e.g., a single namespace of shares, files and folders, for each file server instance. However, the shares, files, and folders in a file server instance such as FS1 may actually be distributed across multiple FSVMs 820 and 822. For example, different folders in the same file server instance may be associated with different corresponding FSVMs 820 and 822 and CVMs 824 and 826 on different host machines Host-1 804 and Host-2 806.

The example file server instance FS1 704 shown in FIG. 7 has two shares, Share-1 708 and Share-2 710. Share-1 708 may be located on FSVM-1 820, CVM-1 824, and local storage 828. NFS protocol requests from user VMs to read or write data on file server instance FS1 704 and any share, folder, or file in the instance may be sent to FSVM-1 820. FSVM-1 820 (or another component, such as a hypervisor in some examples) may determine whether the requested data, e.g., the share, folder, file, or a portion thereof, referenced in the request, is located on FSVM-1 820, and FSVM-1 820 is a leader for the requested data. If not, FSVM-1 820 may respond to the requesting user VM with an indication that the requested data is not covered by (e.g., is not located on or served by) FSVM-1 820. Otherwise, the requested data is covered by (e.g., is located on or served by) FSVM-1 820, so FSVM-1 820 may send iSCSI protocol requests to a CVM that is associated with the requested data. Note that the CVM associated with the requested data may be the CVM-1 824 on the same host machine as the FSVM-1 820, or a different CVM on a different host machine 806, depending on the configuration of the VFS. In this example, the requested Share-1 is located on FSVM-1 820, so FSVM-1 820 processes the request. To provide for path availability, multipath I/O (MPIO) may be used for communication with the FSVM, e.g., for communication between FSVM-1 820 and CVM-1 824. The active path may be set to the CVM that is local to the FSVM (e.g., on the same host machine) by default. The active path may be set to a remote CVM instead of the local CVM, e.g., when a failover occurs.

Continuing with the data request example, the associated CVM is CVM-1 824, which may in turn access the storage device associated with the requested data as specified in the request, e.g., to write specified data to the storage device or read requested data from a specified location on the storage device. In this example, the associated storage device is in local storage 828, and may be an HDD or SSD. CVM-1 824 may access the HDD or SSD via an appropriate protocol, e.g., iSCSI, SCSI, SATA, or the like. CVM-1 824 may send the results of accessing local storage 828, e.g., data that has been read, or the status of a data write operation, to CVM-1 824 via, e.g., SATA, which may in turn send the results to FSVM-1 820 via, e.g., iSCSI. FSVM-1 820 may then send the results to the user VM via SMB through the hypervisor 816.

Share-2 710 may be located on FSVM-2 822, on Host-2. Network file service protocol requests from user VMs to read or write data on Share-2 may be directed to FSVM-2 822 on Host-2 by other FSVMs. Alternatively, user VMs may send such requests directly to FSVM-2 822 on Host-2, which may process the requests using CVM-2 826 and local storage 830 on Host-2 as described above for FSVM-1 820 on Host-1.

A file server instance such as FS1 704 in FIG. 7 may appear as a single file system instance (e.g., a single namespace of folders and files that are accessible by their names or pathnames without regard for their physical locations), even though portions of the file system are stored on different host machines. Since each FSVM may provide a portion of a file server instance, each FSVM may have one or more "local" file systems that provide the portion of the file server instance (e.g., the portion of the namespace of files and folders) associated with the FSVM.

Figure 9:
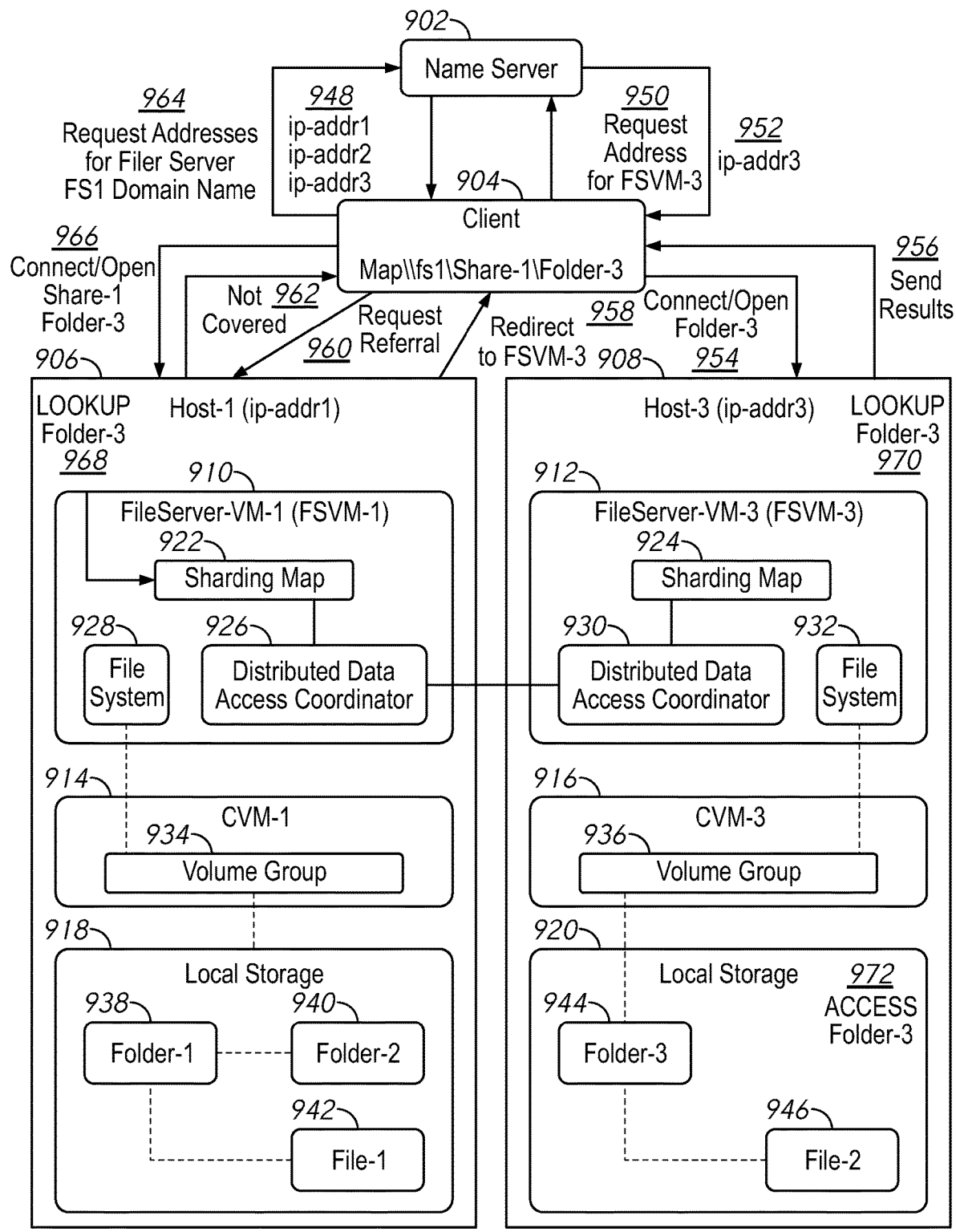
FIG. 9 illustrates example interactions between a client and host machines on which different portions of a VFS instance are stored according to particular embodiments.

FIG. 9 illustrates example interactions between a client 904 and host machines 906 and 908 on which different portions of a VFS instance are stored according to particular embodiments. A client 904, e.g., an application program executing in one of the user VMs and on the host machines of a virtualized file server described herein requests access to a folder \\FS1.domain.name\Share-1\Folder-3. The request may be in response to an attempt to map \FS1.domain.name\Share-1 to a network drive in the operating system executing in the user VM followed by an attempt to access the contents of Share-1 or to access the contents of Folder-3, such as listing the files in Folder-3.

FIG. 9 shows interactions that occur between the client 904, FSVMs 910 and 912 on host machines 906 and 908, and a name server 902 when a storage item is mapped or otherwise accessed. The name server 902 may be provided by a server computer system, such as one or more of the host machines 906, 908 or a server computer system separate from the host machines 906, 908. In one example, the name server 902 may be provided by an active directory service executing on one or more computer systems and accessible via the network. The interactions are shown as arrows that represent communications, e.g., messages sent via the network. Note that the client 904 may be executing in a user VM, which may be co-located with one of the FSVMs 910 and 912. In such a co-located case, the arrows between the client 904 and the host machine on which the FSVM is located may represent communication within the host machine, and such intra-host machine communication may be performed using a mechanism different from communication over the network, e.g., shared memory or inter-process communication.

In particular embodiments, when the client 904 requests access to Folder-3, a VFS client component executing in the user VM may use a distributed file system protocol such as Microsoft DFS, or the like, to send the storage access request to one or more of the FSVMs described herein. To access the requested file or folder, the client determines the location of the requested file or folder, e.g., the identity and/or network address of the FSVM on which the file or folder is located. The client may query a domain cache of FSVM network addresses that the client has previously identified (e.g., looked up). If the domain cache contains the network address of an FSVM associated with the requested folder name \\FS1.domain.name\Share-1\Folder-3, then the client retrieves the associated network address from the domain cache and sends the access request to the network address, starting at step 964 as described below.

In particular embodiments, at step 964, the client may send a request for a list of addresses of FSVMs to a name server 902. The name server 902 may be, e.g., a DNS server or other type of server, such as a Microsoft domain controller (not shown), that has a database of FSVM addresses. At step 948, the name server 902 may send a reply that contains a list of FSVM network addresses, e.g., ip-addr1, ip-addr2, and ip-addr3, which correspond to the FSVMs in this example. At step 966, the client 904 may send an access request to one of the network addresses, e.g., the first network address in the list (ip-addr1 in this example), requesting the contents of Folder-3 of Share-1. By selecting the first network address in the list, the particular FSVM to which the access request is sent may be varied, e.g., in a round-robin manner by enabling round-robin DNS (or the like) on the name server 902. The access request may be, e.g., an SMB connect request, an NFS open request, and/or appropriate request(s) to traverse the hierarchy of Share-1 to reach the desired folder or file, e.g., Folder-3 in this example.

At step 968, FileServer-VM-1 (FSVM-1) 910 may process the request received at step 966 by searching a mapping or lookup table, such as a sharding map 922, for the desired folder or file. The map 922 maps stored objects, such as shares, folders, or files, to their corresponding locations, e.g., the names or addresses of FSVMs. The map 922 may have the same contents on each host machine, with the contents on different host machines being synchronized using a distributed data store as described below. For example, the map 922 may contain entries that map Share-1 and Folder-1 to the file server FSVM-1 910, and Folder-3 to the file server FSVM-3 912. An example map is shown in Table 1 below. While the example of FIG. 9 is depicted and described with respect to the FSVM processing the request, in some examples, one or more other components of a virtualized system may additionally or instead process the request (e.g., a CVM and/or a hypervisor).

| Stored Object | Location |
|---|---|
| Folder-1 | FSVM-1 |
| Folder-2 | FSVM-1 |
| File-1 | FSVM-1 |
| Folder-3 | FSVM-3 |
| File-2 | FSVM-3 |

In particular embodiments, the map 922 or 924 may be accessible on each of the host machines. The maps may be copies of a distributed data structure that are maintained and accessed at each FSVM using distributed data access coordinators 926 and 930. The distributed data access coordinators 926 and 930 may be implemented based on distributed locks or other storage item access operations. Alternatively, the distributed data access coordinators 926 and 930 may be implemented by maintaining a master copy of the maps 922 and 924 at a leader node such as the host machine 908, and using distributed locks to access the master copy from each of FSVM-1 910 and FSVM-3 912. The distributed data access coordinators 926 and 930 may be implemented using distributed locking, leader election, or related features provided by a centralized coordination service for maintaining configuration information, naming, providing distributed synchronization, and/or providing group services (e.g., APACHE ZOOKEEPER or other distributed coordination software). Since the map 922 indicates that Folder-3 is located at FSVM-3 912 on Host-3 908, the lookup operation at step 968 determines that Folder-3 is not located at FSVM-1 910 on Host-1 906. Thus, at step 962 the FSVM-1 910 (or other component of the virtualized system) sends a response, e.g., a "Not Covered" DFS response, to the client 904 indicating that the requested folder is not located at FSVM-1 910. At step 960, the client 904 sends a request to FSVM-1 910 for a referral to the FSVM on which Folder-3 is located. FSVM-1 910 uses the map 922 to determine that Folder-3 is located at FSVM-3 912 on Host-3 908, and at step 958 returns a response, e.g., a "Redirect" DFS response, redirecting the client 904 to FSVM-3 912. The client 904 may then determine the network address for FSVM-3 912, which is ip-addr3 (e.g., a host name "ip-addr3.domain name" or an IP address "10.1.1.3"). The client 904 may determine the network address for FSVM-3 912 by searching a cache stored in memory of the client 904, which may contain a mapping from FSVM-3 912 to ip-addr3 cached in a previous operation. If the cache does not contain a network address for FSVM-3 912, then at step 950 the client 904 may send a request to the name server 902 to resolve the name for FSVM-3 912. The name server may respond with the resolved address, ip-addr3, at step 952. The client 904 may then store the association between FSVM-3 912 and ip-addr3 in the client 904's cache.

In particular embodiments, failure of FSVMs may be detected using the centralized coordination service. For example, using the centralized coordination service, each FSVM may create a lock on the host machine on which the FSVM is located using ephemeral nodes of the centralized coordination service (which are different from host machines but may correspond to host machines). Other FSVMs may volunteer for leadership of resources of remote FSVMs on other host machines, e.g., by requesting a lock on the other host machines. The locks requested by the other nodes are not granted unless communication to the leader host machine is lost, in which case the centralized coordination service deletes the ephemeral node and grants the lock to one of the volunteer host machines, which becomes the new leader. For example, the volunteer host machines may be ordered by the time at which the centralized coordination service received their requests, and the lock may be granted to the first host machine on the ordered list. The first host machine on the list may thus be selected as the new leader. The FSVM on the new leader has ownership of the resources that were associated with the failed leader FSVM until the failed leader FSVM is restored, at which point the restored FSVM may reclaim the local resources of the host machine on which it is located.

At step 954, the client 904 may send an access request to FSVM-3 912 at ip-addr3 on Host-3 908 requesting the contents of Folder-3 of Share-1. At step 970, FSVM-3 912 queries FSVM-3's copy of the map 924 using FSVM-3's instance of the distributed data access coordinator 930. The map 924 indicates that Folder-3 is located on FSVM-3, so at step 972 FSVM-3 accesses the file system 932 to retrieve information about Folder-3 944 and its contents (e.g., a list of files in the folder, which includes File-2 946) that are stored on the local storage 920. FSVM-3 may access local storage 920 via CVM-3 916, which provides access to local storage 920 via a volume group 936 that contains one or more volumes stored on one or more storage devices in local storage 920. At step 956, FSVM-3 may then send the information about Folder-3 and its contents to the client 904. Optionally, FSVM-3 may retrieve the contents of File-2 and send them to the client 904, or the client 904 may send a subsequent request to retrieve File-2 as needed.

Figure 10:
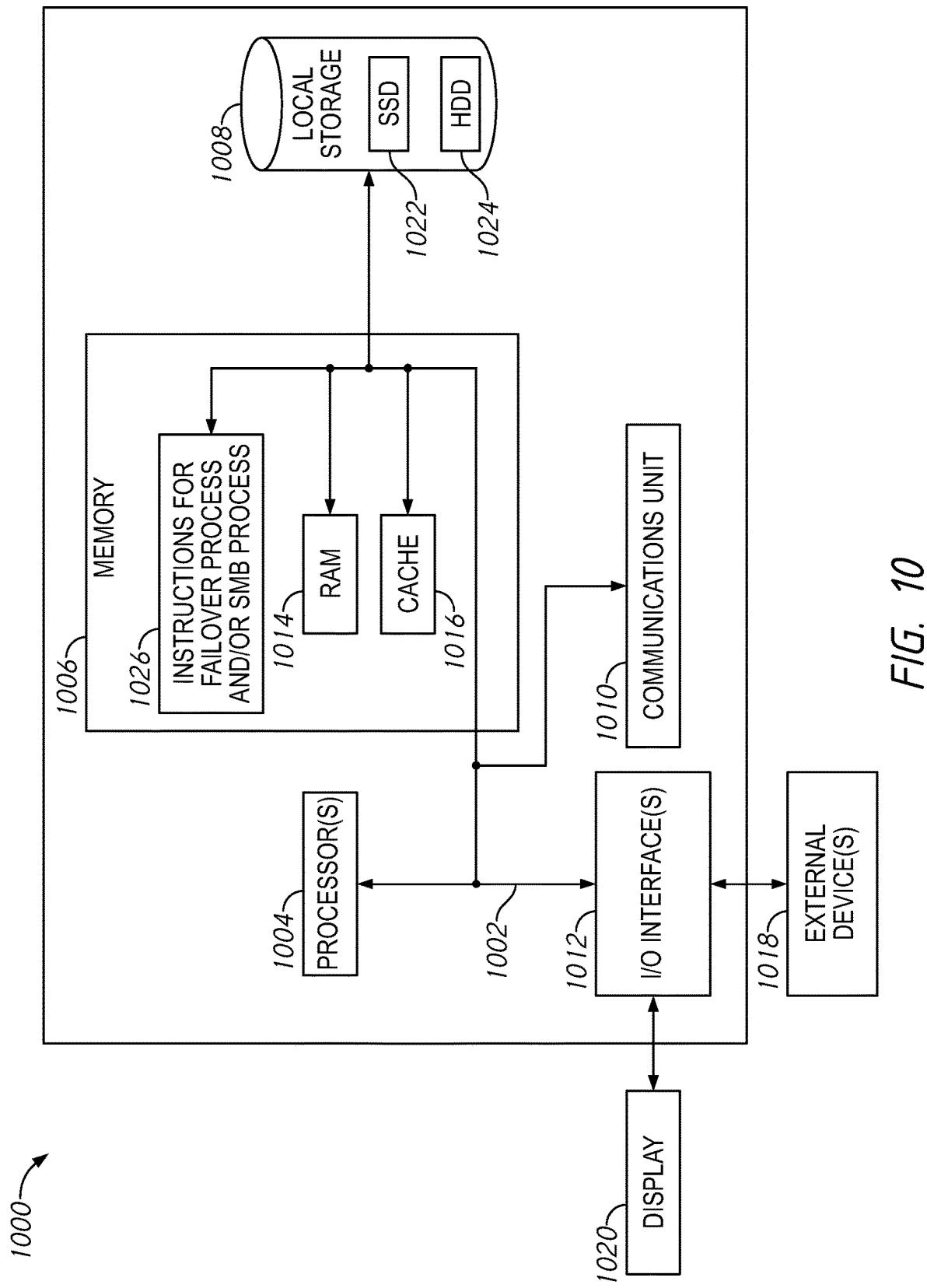
FIG. 10 is a schematic illustration of a computing system arranged in accordance with examples described herein.

FIG. 10 depicts a block diagram of components of a computing system in accordance with examples described herein. It should be appreciated that FIG. 10 provides only an illustration of one implementation and does not imply any limitations with regard to the environments in which different embodiments may be implemented. Many modifications to the depicted environment may be made. The computing system may be used to implement and/or may be implemented by the one or more computing nodes of a virtualized file server, such as in the system of FIG. 1, for example. The components shown in FIG. 10 are exemplary only, and it is to be understood that additional, fewer, and/or different components may be used in other examples.

The computing node 1000 includes one or more communications fabric(s) 1002, which provide communications between one or more processor(s) 1004, memory 1006, local storage 1008, communications unit 1010, and/or I/O interface(s) 1012. The communications fabric(s) 1002 can be implemented with any architecture designed for passing data and/or control information between processors (such as microprocessors, communications and network processors, etc.), system memory, peripheral devices, and any other hardware components within a system. For example, the communications fabric(s) 1002 can be implemented with one or more buses.

The memory 1006 and the local storage 1008 may be computer-readable storage media. In the example of FIG. 10, the memory 1006 includes random access memory (RAM) 1014 and cache 1016. In general, the memory 1006 can include any suitable volatile or non-volatile computer-readable storage media. In this embodiment, the local storage 1008 includes an SSD 1022 and an HDD 1024. The memory 1006 may include executable instructions for providing a an FSVM and/or a failover process and/or an SMB process 1026. The instructions may include instructions for providing a failover process and/or SMB process 1026. The instructions for providing a failover process and/or SMB process 1026 may be used to implement FSVMs, failover processes, and/or SMB processes described herein, including those described with reference to FIG. 1 and FIG. 2.

Various computer instructions, programs, files, images, etc., may be stored in local storage 1008 and/or memory 1006 for execution by one or more of the respective processor(s) 1004 via one or more memories of memory 1006. In some examples, local storage 1008 includes a magnetic HDD 1024. Alternatively, or in addition to a magnetic HDD, local storage 1008 can include the SSD 1022, a semiconductor storage device, a read-only memory (ROM), an erasable programmable read-only memory (EPROM), a flash memory, or any other computer readable storage media that is capable of storing program instructions or digital information.

The media used by local storage 1008 may also be removable. For example, a removable hard drive may be used for local storage 1008. Other examples include optical and magnetic disks, thumb drives, and smart cards that are inserted into a drive for transfer onto another computer readable storage medium that is also part of local storage 1008.

Communications unit 1010, in some examples, provides for communications with other data processing systems or devices. For example, communications unit 1010 may include one or more network interface cards. Communications unit 1010 may provide communications through the use of either or both physical and wireless communications links.

I/O interface(s) 1012 may allow for input and output of data with other devices that may be connected to computing node 1000. For example, I/O interface(s) 1012 may provide a connection to external device(s) 1018 such as a keyboard, a keypad, a touch screen, and/or some other suitable input device. External device(s) can also include portable computer readable storage media such as, for example, thumb drives, portable optical or magnetic disks, and memory cards. Software and data used to practice embodiments of the present invention can be stored on such portable computer readable storage media and can be loaded onto and/or encoded in memory 1006 and/or local storage 1008 via I/O interface(s) 1012 in some examples. I/O interface(s) 1012 may connect to a display 1020. Display 1020 may provide a mechanism to display data to a user and may be, for example, a computer monitor.

From the foregoing it will be appreciated that, although specific embodiments have been described herein for purposes of illustration, various modifications may be made while remaining within the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. A system comprising:
   a first computing node configured to host:
      a first server message block (SMB) process configured to provide access to a file share, the file share configured to receive asynchronous writes;
      a failover process;
   a persistent volume group coupled to the first computing node, the persistent volume group configured to store durable handle state for the file share; and
   a second computing node configured to host a second SMB process;
   wherein the failover process is configured to move the persistent volume group to the second computing node in advance of an outage of the first SMB process, and the failover process is further configured to flush the asynchronous writes to disk in advance of the outage; and
   wherein the second SMB process is configured to read a durable handle for the file share from the persistent volume group and respond to reconnect requests for the file share.

2. The system of claim 1, wherein the file share comprises a non-continuous availability (CA) file share.

3. The system of claim 1, wherein the failover process is configured to cause the second SMB process to service access requests for the file share responsive to the outage of the first SMB process.

4. The system of claim 1, wherein the second computing node is configured to prioritize reconnect requests for the file share over other requests for the file share.

5. The system of claim 1, wherein the persistent volume group is further configured to store lock information for the file share.

6. The system of claim 5, wherein the second computing node is further configured to access the lock information from the persistent volume group and provide lock states indicated by the lock information.

7. The system of claim 6, wherein the second computing node is configured to provide the lock states prior to responding to requests for the file share.

8. The system of claim 1, wherein the second computing node is configured to receive the asynchronous writes flushed to disk, and wherein the second computing node is configured to process the asynchronous writes for the file share prior to responding to requests for access to the file share.

9. At least one non-transitory computer readable medium encoded with instructions which, when executed, cause a system to perform operations responsive to an indication of a failover event, the operations comprising:
   flush asynchronous write operations for a file share to disk at a first computing node;
   move a persistent volume group to a second computing node, the persistent volume group storing durable handles for the file share; and
   failover an SMB process from the first computing node to the second computing node, wherein the SMB process is configured to provide access to the file share.

10. The non-transitory computer readable medium of claim 9, wherein the operations further comprise:
    store the durable handles for the file share to the persistent volume group.

11. The non-transitory computer readable medium of claim 9, wherein the operations further comprise:
    move the persistent volume group to the second computing node, the persistent volume group storing lock state for the file share.

12. The non-transitory computer readable medium of claim 11, wherein the operations further comprise:
    read and implement the lock state.

13. The non-transitory computer readable medium of claim 9, the operations further comprising:
    receive the indication of the failover event.

14. The non-transitory computer readable medium of claim 9, wherein the operations further comprise:
    provide the asynchronous write operations to the second computing node.

15. The non-transitory computer readable medium of claim 9, wherein the failover event comprises an upgrade.

16. At least one non-transitory computer readable medium encoded with instructions which, when executed, cause a system to perform operations responsive to an indication of a failover event, the operations comprising:
    receive, at a second computing node, from a first computing node, a persistent volume group, the persistent volume group storing durable handles for a file share;
    receive, from the first computing node, asynchronous write operations for the file share;
    process the asynchronous write operations for the file share utilizing an SMB process at the second computing node; and
    respond to a reconnect request for the file share at the second computing node, including accessing the durable handles for the file share.

17. The non-transitory computer readable medium of claim 16, wherein the operations further comprise:
    prioritize the reconnect request for the file share over another request for the file share.

18. The non-transitory computer readable medium of claim 16, wherein the persistent volume group further is configured to store lock state for the file share.

19. The non-transitory computer readable medium of claim 18, wherein the operations further comprise:
    restore the lock state from the persistent volume group.

20. The non-transitory computer readable medium of claim 18, wherein the operations further comprise:
    delete the durable handles after a threshold time.

21. The non-transitory computer readable medium of claim 18, wherein the operations further comprise:
    receive an indication of a failover event;
    wherein the asynchronous write operations and the persistent volume group are responsive to the indication of the failover event.

22. The non-transitory computer readable medium of claim 21, wherein the failover event comprises an upgrade of the first computing node.

* * * * *